United States Patent
Torres et al.

(10) Patent No.: US 12,450,329 B1
(45) Date of Patent: Oct. 21, 2025

(54) ANONYMIZATION IN A LOW POWER PHYSICAL ASSET TRACKING SYSTEM

(71) Applicant: Samsara Inc., San Francisco, CA (US)

(72) Inventors: Gabriel Torres, Boulder, CO (US); Ernie Aguilar, Austin, TX (US); Wael Barakat, San Francisco, CA (US); Eli Peer, San Carlos, CA (US); David Gal, Oakland, CA (US); Pierre Gavaret, Novato, CA (US); Matthew Basham, Oakland, CA (US)

(73) Assignee: Samsara Inc., San Francisco, CA (US)

( * ) Notice: Subject to any disclaimer, the term of this patent is extended or adjusted under 35 U.S.C. 154(b) by 0 days.

(21) Appl. No.: 18/753,250

(22) Filed: Jun. 25, 2024

Related U.S. Application Data

(63) Continuation of application No. 18/752,000, filed on Jun. 24, 2024, now Pat. No. 12,256,021.

(60) Provisional application No. 63/631,353, filed on Apr. 8, 2024.

(51) Int. Cl.
 *G06F 21/44* (2013.01)
 *G06F 8/65* (2018.01)
 *G06F 13/10* (2006.01)

(52) U.S. Cl.
 CPC .............. *G06F 21/44* (2013.01); *G06F 8/65* (2013.01); *G06F 13/10* (2013.01)

(58) Field of Classification Search
 CPC ............. G06F 21/44; G06F 8/65; G06F 13/10
 USPC .......................................................... 726/17
 See application file for complete search history.

(56) References Cited

U.S. PATENT DOCUMENTS

| | | | |
|---|---|---|---|
| 4,671,111 | A | 6/1987 | Lemelson |
| 5,825,283 | A | 10/1998 | Camhi |
| 5,910,987 | A | 6/1999 | Ginter et al. |
| 5,917,433 | A | 6/1999 | Keillor et al. |
| 6,064,299 | A | 5/2000 | Lesesky et al. |

(Continued)

FOREIGN PATENT DOCUMENTS

| | | |
|---|---|---|
| CN | 111047179 A | 4/2020 |
| DE | 10 2004 015 221 A1 | 10/2005 |

(Continued)

OTHER PUBLICATIONS

US 11,450,210 B2, 09/2022, Tsai et al. (withdrawn)

(Continued)

*Primary Examiner* — Amare F Tabor
(74) *Attorney, Agent, or Firm* — Knobbe, Martens, Olson & Bear, LLP

(57) ABSTRACT

Systems and methods are described for transmitting broadcasts by Peripherals, receiving the broadcasts by Centrals, and communicating with a Backend by Centrals. Specifically, a Peripheral may generate and transmit an encrypted broadcast packet to a Central, the Central may transmit the encrypted observation information to the Backend, which may decrypt the broadcast packet. Additionally, a Central may transmit a request for authorization to connect to a Peripheral to the Backend. If authorized by the Backend, the Central may connect to the Peripheral. Further, a Central may receive a plurality of broadcasts over a period of time. The Central may store information about the broadcasts and, at the conclusion of the period of time, transmit the information about the broadcasts and the last-received broadcast to the Backend.

16 Claims, 41 Drawing Sheets

(56) References Cited

U.S. PATENT DOCUMENTS

| | | |
|---|---|---|
| 6,098,048 A | 8/2000 | Dashefsky et al. |
| 6,157,864 A | 12/2000 | Schwenke et al. |
| 6,253,129 B1 | 6/2001 | Jenkins et al. |
| 6,317,668 B1 | 11/2001 | Thibault et al. |
| 6,411,203 B1 | 6/2002 | Lesesky et al. |
| 6,421,590 B2 | 7/2002 | Thibault |
| 6,452,487 B1 | 9/2002 | Krupinski |
| 6,505,106 B1 | 1/2003 | Lawrence et al. |
| 6,651,063 B1 | 11/2003 | Vorobiev |
| 6,714,894 B1 | 3/2004 | Tobey et al. |
| 6,718,239 B2 | 4/2004 | Rayner |
| 6,741,165 B1 | 5/2004 | Langfahl et al. |
| 6,801,920 B1 | 10/2004 | Wischinski |
| 6,977,612 B1 | 12/2005 | Bennett |
| 7,117,075 B1 | 10/2006 | Larschan et al. |
| 7,139,780 B2 | 11/2006 | Lee et al. |
| 7,209,959 B1 | 4/2007 | Campbell et al. |
| 7,233,684 B2 | 6/2007 | Fedorovskaya et al. |
| 7,243,371 B1 | 7/2007 | Kasper et al. |
| 7,386,376 B2 | 6/2008 | Basir et al. |
| 7,389,178 B2 | 6/2008 | Raz et al. |
| 7,398,298 B2 | 7/2008 | Koch |
| 7,492,938 B2 | 2/2009 | Brinson, Jr. et al. |
| 7,526,103 B2 | 4/2009 | Schofield et al. |
| 7,555,378 B2 | 6/2009 | Larschan et al. |
| 7,596,417 B2 | 9/2009 | Fister et al. |
| 7,606,779 B2 | 10/2009 | Brinson, Jr. et al. |
| 7,715,961 B1 | 5/2010 | Kargupta |
| 7,769,499 B2 | 8/2010 | McQuade et al. |
| 7,844,088 B2 | 11/2010 | Brinson, Jr. et al. |
| 7,859,392 B2 | 12/2010 | Mcclellan et al. |
| 7,877,198 B2 | 1/2011 | Tenzer et al. |
| 7,881,838 B2 | 2/2011 | Larschan et al. |
| 7,891,012 B1 | 2/2011 | Kiel et al. |
| 7,904,714 B2 | 3/2011 | Lee et al. |
| 7,933,840 B2 | 4/2011 | Zank |
| 7,957,936 B2 | 6/2011 | Eryurek et al. |
| 8,019,581 B2 | 9/2011 | Sheha et al. |
| 8,024,311 B2 | 9/2011 | Wood et al. |
| 8,032,277 B2 | 10/2011 | Larschan et al. |
| 8,037,313 B2 | 10/2011 | Hamalainen et al. |
| 8,140,358 B1 | 3/2012 | Ling et al. |
| 8,156,108 B2 | 4/2012 | Middleton et al. |
| 8,156,499 B2 | 4/2012 | Foulger et al. |
| 8,169,343 B2 | 5/2012 | Sheha et al. |
| 8,175,992 B2 | 5/2012 | Bass, II et al. |
| 8,230,272 B2 | 7/2012 | Middleton et al. |
| 8,260,489 B2 | 9/2012 | Nielsen et al. |
| 8,417,402 B2 | 4/2013 | Basir |
| 8,442,508 B2 | 5/2013 | Harter et al. |
| 8,457,395 B2 | 6/2013 | Boncyk et al. |
| 8,509,412 B2 | 8/2013 | Sheha et al. |
| 8,543,625 B2 | 9/2013 | Middleton et al. |
| 8,560,164 B2 | 10/2013 | Nielsen et al. |
| 8,615,555 B2 | 12/2013 | Koch |
| 8,621,576 B2 * | 12/2013 | Jureczki ............ H04N 21/4112 713/168 |
| 8,625,885 B2 | 1/2014 | Brinson, Jr. et al. |
| 8,626,568 B2 | 1/2014 | Warkentin et al. |
| 8,633,672 B2 | 1/2014 | Jung et al. |
| 8,669,857 B2 | 3/2014 | Sun et al. |
| 8,682,572 B2 | 3/2014 | Raz et al. |
| 8,706,409 B2 | 4/2014 | Mason et al. |
| 8,831,825 B2 | 9/2014 | Shah et al. |
| 8,836,784 B2 | 9/2014 | Erhardt et al. |
| 8,918,229 B2 | 12/2014 | Hunt et al. |
| 8,953,228 B1 | 2/2015 | Mehers |
| 8,989,914 B1 | 3/2015 | Nemat-Nasser et al. |
| 8,989,959 B2 | 3/2015 | Plante et al. |
| 8,996,240 B2 | 3/2015 | Plante |
| 9,024,744 B2 | 5/2015 | Klose et al. |
| 9,053,590 B1 | 6/2015 | Kator et al. |
| 9,137,498 B1 | 9/2015 | L'Heureux et al. |
| 9,147,335 B2 | 9/2015 | Raghunathan et al. |
| 9,152,609 B2 | 10/2015 | Schwartz et al. |
| 9,165,196 B2 | 10/2015 | Kesavan et al. |
| 9,170,913 B2 | 10/2015 | Hunt et al. |
| 9,172,713 B2 | 10/2015 | Joffe et al. |
| 9,189,895 B2 | 11/2015 | Phelan et al. |
| 9,230,250 B1 | 1/2016 | Parker et al. |
| 9,230,437 B2 | 1/2016 | Brinton et al. |
| 9,280,435 B2 | 3/2016 | Hunt et al. |
| 9,311,271 B2 | 4/2016 | Wright |
| 9,344,683 B1 | 5/2016 | Nemat-Nasser et al. |
| 9,349,228 B2 | 5/2016 | Ochsendorf et al. |
| 9,384,111 B2 | 7/2016 | Hunt et al. |
| 9,389,147 B1 | 7/2016 | Lambert et al. |
| 9,402,060 B2 | 7/2016 | Plante |
| 9,412,282 B2 | 8/2016 | Hunt et al. |
| 9,439,280 B2 | 9/2016 | Chang et al. |
| 9,445,270 B1 | 9/2016 | Bicket et al. |
| 9,477,639 B2 | 10/2016 | Fischer et al. |
| 9,477,989 B2 | 10/2016 | Grimm et al. |
| 9,527,515 B2 | 12/2016 | Hunt et al. |
| 9,535,857 B2 * | 1/2017 | Dabbiere ............ G07G 1/0045 |
| 9,594,725 B1 | 3/2017 | Cook et al. |
| 9,672,667 B2 | 6/2017 | Mason et al. |
| 9,688,282 B2 | 6/2017 | Cook et al. |
| 9,728,015 B2 | 8/2017 | Kwak |
| 9,761,063 B2 | 9/2017 | Lambert et al. |
| 9,761,067 B2 | 9/2017 | Plante et al. |
| 9,811,536 B2 | 11/2017 | Morris et al. |
| 9,818,088 B2 | 11/2017 | Penilla et al. |
| 9,846,979 B1 | 12/2017 | Sainaney et al. |
| 9,849,834 B2 | 12/2017 | Reed et al. |
| 9,852,625 B2 | 12/2017 | Victor et al. |
| 9,892,376 B2 | 2/2018 | Pfeiffer et al. |
| 9,922,567 B2 | 3/2018 | Molin et al. |
| 9,934,628 B2 | 4/2018 | Kreiner et al. |
| 9,996,980 B1 | 6/2018 | Gonzalez et al. |
| 10,015,452 B1 | 7/2018 | Schofield et al. |
| 10,033,706 B2 | 7/2018 | Bicket et al. |
| 10,034,130 B2 | 7/2018 | DeLuca et al. |
| 10,040,459 B1 | 8/2018 | Kukreja |
| 10,065,652 B2 | 9/2018 | Shenoy et al. |
| 10,068,392 B2 | 9/2018 | Cook et al. |
| 10,075,669 B2 | 9/2018 | Vanman et al. |
| 10,083,547 B1 | 9/2018 | Tomatsu |
| 10,085,149 B2 | 9/2018 | Bicket et al. |
| 10,094,308 B2 | 10/2018 | Kolhouse et al. |
| 10,102,495 B1 | 10/2018 | Zhang et al. |
| 10,121,118 B1 | 11/2018 | Kim et al. |
| 10,127,810 B2 | 11/2018 | Durie, Jr. et al. |
| 10,157,321 B2 | 12/2018 | Becker et al. |
| 10,163,107 B1 | 12/2018 | White et al. |
| 10,173,486 B1 | 1/2019 | Lee et al. |
| 10,173,544 B2 | 1/2019 | Hendrix et al. |
| 10,196,071 B1 | 2/2019 | Rowson et al. |
| 10,206,107 B2 | 2/2019 | Bicket et al. |
| 10,223,935 B2 | 3/2019 | Sweany et al. |
| 10,275,959 B2 | 4/2019 | Ricci |
| 10,277,455 B2 | 4/2019 | Erdmann |
| 10,286,875 B2 | 5/2019 | Penilla et al. |
| 10,290,036 B1 | 5/2019 | Gella et al. |
| 10,311,749 B1 | 6/2019 | Kypri et al. |
| 10,336,190 B2 | 7/2019 | Yokochi et al. |
| 10,382,897 B1 | 8/2019 | Lanes et al. |
| 10,388,075 B2 | 8/2019 | Schmirler et al. |
| 10,389,739 B2 | 8/2019 | Solotorevsky |
| 10,390,227 B2 | 8/2019 | Bicket et al. |
| 10,444,949 B2 | 10/2019 | Scott et al. |
| 10,445,559 B2 | 10/2019 | Joseph et al. |
| 10,459,444 B1 | 10/2019 | Kentley-Klay |
| 10,460,183 B2 | 10/2019 | Welland et al. |
| 10,460,600 B2 | 10/2019 | Julian et al. |
| 10,471,955 B2 | 11/2019 | Kouri et al. |
| 10,486,709 B1 | 11/2019 | Mezaael |
| 10,489,222 B2 | 11/2019 | Sathyanarayana et al. |
| 10,523,904 B2 | 12/2019 | Mahmoud et al. |
| 10,567,387 B1 * | 2/2020 | Trinh ................. H04L 63/101 |
| 10,573,183 B1 | 2/2020 | Li et al. |
| 10,579,123 B2 | 3/2020 | Tuan et al. |
| 10,609,114 B1 | 3/2020 | Bicket et al. |
| 10,621,873 B1 | 4/2020 | Spiel et al. |

(56) References Cited

U.S. PATENT DOCUMENTS

| | | |
|---|---|---|
| 10,623,899 B2 | 4/2020 | Watkins et al. |
| 10,632,941 B2 | 4/2020 | Chauncey et al. |
| 10,645,066 B2 * | 5/2020 | Swahn .................. H04L 9/0656 |
| 10,652,335 B2 | 5/2020 | Botticelli |
| 10,715,976 B2 | 7/2020 | Hoffner et al. |
| 10,749,700 B2 | 8/2020 | Raleigh et al. |
| 10,762,363 B2 | 9/2020 | Watanabe |
| 10,782,691 B2 | 9/2020 | Suresh et al. |
| 10,788,990 B2 | 9/2020 | Kim et al. |
| 10,789,840 B2 | 9/2020 | Boykin et al. |
| 10,798,522 B1 | 10/2020 | Benjamin et al. |
| 10,803,496 B1 | 10/2020 | Hopkins |
| 10,818,109 B2 | 10/2020 | Palmer et al. |
| 10,827,324 B1 | 11/2020 | Hajimiri et al. |
| 10,843,659 B1 | 11/2020 | Innocenzi et al. |
| 10,848,670 B2 | 11/2020 | Gatti et al. |
| 10,878,030 B1 | 12/2020 | Lambert et al. |
| 10,969,852 B2 | 4/2021 | Tuan et al. |
| 10,979,871 B2 | 4/2021 | Hajimiri et al. |
| 10,999,269 B2 | 5/2021 | Bicket et al. |
| 10,999,374 B2 | 5/2021 | ElHattab et al. |
| 11,007,846 B2 | 5/2021 | Badger, II et al. |
| 11,046,205 B1 | 6/2021 | Govan et al. |
| 11,069,257 B2 | 7/2021 | Palmer et al. |
| 11,080,568 B2 | 8/2021 | ElHattab et al. |
| 11,122,488 B1 | 9/2021 | Lloyd et al. |
| 11,126,910 B1 | 9/2021 | Akhtar et al. |
| 11,127,130 B1 | 9/2021 | Jain et al. |
| 11,128,636 B1 | 9/2021 | Jorasch et al. |
| 11,131,986 B1 | 9/2021 | Gal et al. |
| 11,132,853 B1 | 9/2021 | Akhtar et al. |
| 11,133,113 B2 | 9/2021 | DeBates et al. |
| 11,137,744 B1 | 10/2021 | Heddleston et al. |
| 11,142,175 B2 | 10/2021 | Chow et al. |
| 11,158,177 B1 | 10/2021 | ElHattab et al. |
| 11,184,422 B1 | 11/2021 | Bicket et al. |
| 11,188,046 B1 | 11/2021 | ElHattab et al. |
| 11,190,373 B1 | 11/2021 | Stevenson et al. |
| 11,204,637 B2 | 12/2021 | Tuan et al. |
| 11,245,517 B1 * | 2/2022 | Tsarfati ................. H04L 9/0822 |
| 11,260,878 B2 | 3/2022 | Palmer et al. |
| 11,341,786 B1 | 5/2022 | Calmer et al. |
| 11,349,901 B1 | 5/2022 | Duffield et al. |
| 11,352,013 B1 | 6/2022 | Srinivasan et al. |
| 11,352,014 B1 | 6/2022 | Srinivasan et al. |
| 11,356,605 B1 | 6/2022 | Shemet et al. |
| 11,356,909 B1 | 6/2022 | Lloyd |
| 11,364,386 B2 | 6/2022 | Ibarrola et al. |
| 11,365,980 B1 | 6/2022 | Akhtar et al. |
| 11,374,761 B2 * | 6/2022 | Kapinos ................ H04L 9/3234 |
| 11,386,325 B1 | 7/2022 | Srinivasan et al. |
| 11,436,844 B2 | 9/2022 | Carruthers et al. |
| 11,451,610 B1 | 9/2022 | Saunders et al. |
| 11,451,611 B1 | 9/2022 | Saunders et al. |
| 11,460,507 B2 | 10/2022 | Lloyd et al. |
| 11,464,079 B1 | 10/2022 | Aschenbener et al. |
| 11,479,142 B1 | 10/2022 | Govan et al. |
| 11,494,921 B2 | 11/2022 | ElHattab et al. |
| 11,522,857 B1 | 12/2022 | Symons et al. |
| 11,532,169 B1 | 12/2022 | Hassan et al. |
| 11,558,449 B1 | 1/2023 | Bicket et al. |
| 11,595,632 B2 | 2/2023 | Tsai et al. |
| 11,599,097 B1 | 3/2023 | Gal et al. |
| 11,606,736 B1 | 3/2023 | Lloyd et al. |
| 11,611,621 B2 | 3/2023 | ElHattab et al. |
| 11,615,141 B1 | 3/2023 | Hoye et al. |
| 11,620,909 B2 | 4/2023 | Tsai et al. |
| 11,627,252 B2 | 4/2023 | Delegard et al. |
| 11,641,388 B1 | 5/2023 | Saunders et al. |
| 11,641,604 B1 | 5/2023 | Lloyd |
| 11,643,102 B1 | 5/2023 | Calmer et al. |
| 11,659,060 B2 | 5/2023 | Davis et al. |
| 11,665,223 B1 | 5/2023 | Duffield et al. |
| 11,669,714 B1 | 6/2023 | Akhtar et al. |
| 11,671,478 B1 | 6/2023 | Saunders et al. |
| 11,674,813 B1 | 6/2023 | Chung et al. |
| 11,675,042 B1 | 6/2023 | Lloyd et al. |
| 11,683,579 B1 | 6/2023 | Symons et al. |
| 11,688,211 B1 | 6/2023 | Calmer et al. |
| 11,694,317 B1 | 7/2023 | Jain et al. |
| 11,704,984 B1 | 7/2023 | ElHattab et al. |
| 11,709,500 B2 | 7/2023 | Lloyd et al. |
| 11,710,409 B2 | 7/2023 | Nanda et al. |
| 11,720,087 B1 | 8/2023 | Heddleston et al. |
| 11,727,054 B2 | 8/2023 | Grandhi et al. |
| 11,731,469 B1 | 8/2023 | McGillan |
| 11,736,312 B1 | 8/2023 | Xiao et al. |
| 11,741,760 B1 | 8/2023 | Dubin et al. |
| 11,748,377 B1 | 9/2023 | Zhang et al. |
| 11,752,895 B1 | 9/2023 | Govan et al. |
| 11,756,346 B1 | 9/2023 | Wu et al. |
| 11,756,351 B1 | 9/2023 | Akhtar et al. |
| 11,758,096 B2 | 9/2023 | Shah et al. |
| 11,776,328 B2 | 10/2023 | Yang et al. |
| 11,780,446 B1 | 10/2023 | Srinivasan et al. |
| 11,782,930 B2 | 10/2023 | McGee et al. |
| 11,787,413 B2 | 10/2023 | Tsai et al. |
| 11,798,187 B2 | 10/2023 | Zaheer et al. |
| 11,798,298 B2 | 10/2023 | Hassan et al. |
| 11,800,317 B1 | 10/2023 | Dugar et al. |
| 11,838,884 B1 | 12/2023 | Dergosits et al. |
| 11,842,577 B1 | 12/2023 | Harrison et al. |
| 11,847,911 B2 | 12/2023 | ElHattab et al. |
| 11,855,801 B1 | 12/2023 | Stevenson et al. |
| 11,861,955 B1 | 1/2024 | Dubin et al. |
| 11,863,712 B1 | 1/2024 | Young et al. |
| 11,866,055 B1 | 1/2024 | Srinivasan et al. |
| 11,868,919 B1 | 1/2024 | Zhang et al. |
| 11,875,580 B2 | 1/2024 | Hassan et al. |
| 11,875,683 B1 | 1/2024 | Tsai et al. |
| 11,890,962 B1 | 2/2024 | Govan et al. |
| 11,937,152 B2 | 3/2024 | Hajimiri et al. |
| 11,938,948 B1 | 3/2024 | Davis et al. |
| 11,959,772 B2 | 4/2024 | Robbins et al. |
| 11,974,410 B1 | 4/2024 | Lin et al. |
| 11,975,685 B1 | 5/2024 | Innocenzi et al. |
| 11,989,001 B1 | 5/2024 | ElHattab et al. |
| 11,995,546 B1 | 5/2024 | Srinivasan et al. |
| 11,997,181 B1 | 5/2024 | Davis et al. |
| 12,000,940 B1 | 6/2024 | Lloyd et al. |
| 12,106,613 B2 | 10/2024 | Calmer et al. |
| 12,117,546 B1 | 10/2024 | Lloyd et al. |
| 12,126,917 B1 | 10/2024 | Shemet et al. |
| 12,128,919 B2 | 10/2024 | Calmer et al. |
| 12,140,445 B1 | 11/2024 | Akhtar et al. |
| 12,150,186 B1 | 11/2024 | Aguilar et al. |
| 12,165,360 B1 | 12/2024 | Jain et al. |
| 12,168,445 B1 | 12/2024 | Srinivasan et al. |
| 12,172,653 B1 | 12/2024 | Akhtar et al. |
| 12,179,629 B1 | 12/2024 | Govan et al. |
| 12,197,610 B2 | 1/2025 | Wen et al. |
| 12,213,090 B1 | 1/2025 | Dergosits et al. |
| 12,228,944 B1 | 2/2025 | Dubin et al. |
| 12,253,617 B1 | 3/2025 | Aguilar et al. |
| 12,256,021 B1 | 3/2025 | Torres et al. |
| 12,260,616 B1 | 3/2025 | Rajan et al. |
| 12,269,498 B1 | 4/2025 | Rommel et al. |
| 12,289,181 B1 | 4/2025 | Stevenson et al. |
| 12,306,010 B1 | 5/2025 | Rommel et al. |
| 12,327,445 B1 | 6/2025 | Eberhardt et al. |
| 12,328,639 B1 | 6/2025 | Smith et al. |
| 2002/0061758 A1 | 5/2002 | Zarlengo et al. |
| 2002/0128751 A1 | 9/2002 | Engstrom et al. |
| 2002/0169850 A1 | 11/2002 | Batke et al. |
| 2003/0081935 A1 | 5/2003 | Kirmuss |
| 2003/0154009 A1 | 8/2003 | Basir et al. |
| 2004/0093264 A1 | 5/2004 | Shimizu |
| 2004/0107361 A1 | 6/2004 | Redan et al. |
| 2004/0236476 A1 | 11/2004 | Chowdhary |
| 2004/0236596 A1 | 11/2004 | Chowdhary et al. |
| 2005/0131585 A1 | 6/2005 | Luskin et al. |
| 2005/0131646 A1 | 6/2005 | Camus |
| 2005/0286774 A1 | 12/2005 | Porikli |
| 2006/0053295 A1 | 3/2006 | Madhusudan et al. |

(56) References Cited

U.S. PATENT DOCUMENTS

| | | |
|---|---|---|
| 2006/0167591 A1 | 7/2006 | McNally |
| 2007/0050108 A1 | 3/2007 | Larschan et al. |
| 2007/0173991 A1 | 7/2007 | Tenzer et al. |
| 2008/0252487 A1 | 10/2008 | Mcclellan et al. |
| 2008/0261622 A1 | 10/2008 | Lee et al. |
| 2008/0319602 A1 | 12/2008 | Mcclellan et al. |
| 2009/0099724 A1 | 4/2009 | Kranz et al. |
| 2009/0141939 A1 | 6/2009 | Chambers et al. |
| 2009/0240427 A1 | 9/2009 | Siereveld et al. |
| 2010/0030586 A1 | 2/2010 | Taylor et al. |
| 2010/0049639 A1 | 2/2010 | Ferro et al. |
| 2010/0281161 A1 | 11/2010 | Cohn et al. |
| 2011/0060496 A1 | 3/2011 | Nielsen et al. |
| 2011/0093306 A1 | 4/2011 | Nielsen et al. |
| 2011/0234749 A1 | 9/2011 | Alon |
| 2011/0276265 A1 | 11/2011 | Husain |
| 2012/0109418 A1 | 5/2012 | Lorber |
| 2012/0194357 A1 | 8/2012 | Ciolli |
| 2012/0201277 A1 | 8/2012 | Tanner et al. |
| 2012/0218416 A1 | 8/2012 | Leny et al. |
| 2012/0235625 A1 | 9/2012 | Takehara |
| 2012/0262104 A1 | 10/2012 | Kirsch |
| 2012/0303397 A1 | 11/2012 | Prosser |
| 2013/0072219 A1 | 3/2013 | Zhang et al. |
| 2013/0073112 A1 | 3/2013 | Phelan et al. |
| 2013/0147617 A1 | 6/2013 | Boling et al. |
| 2013/0162421 A1 | 6/2013 | Inaguma et al. |
| 2013/0162425 A1 | 6/2013 | Raghunathan et al. |
| 2013/0164713 A1 | 6/2013 | Hunt et al. |
| 2013/0211559 A1 | 8/2013 | Lawson et al. |
| 2013/0244210 A1 | 9/2013 | Nath et al. |
| 2013/0250040 A1 | 9/2013 | Vitsnudel et al. |
| 2013/0332004 A1 | 12/2013 | Gompert et al. |
| 2014/0012492 A1 | 1/2014 | Bowers et al. |
| 2014/0095061 A1 | 4/2014 | Hyde |
| 2014/0098060 A1 | 4/2014 | McQuade et al. |
| 2014/0113619 A1 | 4/2014 | Tibbitts et al. |
| 2014/0159660 A1 | 6/2014 | Klose et al. |
| 2014/0195106 A1 | 7/2014 | McQuade et al. |
| 2014/0223090 A1 | 8/2014 | Malone |
| 2014/0278108 A1 | 9/2014 | Kerrigan et al. |
| 2014/0293069 A1 | 10/2014 | Lazar et al. |
| 2014/0310162 A1 | 10/2014 | Collins |
| 2014/0328517 A1 | 11/2014 | Gluncic |
| 2014/0337429 A1 | 11/2014 | Asenjo et al. |
| 2014/0354227 A1 | 12/2014 | Tyagi et al. |
| 2014/0354228 A1 | 12/2014 | Williams et al. |
| 2015/0025734 A1 | 1/2015 | Cook et al. |
| 2015/0044641 A1 | 2/2015 | Chauncey et al. |
| 2015/0074091 A1 | 3/2015 | Walkin et al. |
| 2015/0116114 A1 | 4/2015 | Boyles |
| 2015/0148077 A1 | 5/2015 | Jelle |
| 2015/0149086 A1 | 5/2015 | Albert, Jr. et al. |
| 2015/0226563 A1 | 8/2015 | Cox et al. |
| 2015/0281889 A1 | 10/2015 | Menendez |
| 2015/0283912 A1 | 10/2015 | Shimizu et al. |
| 2015/0347121 A1 | 12/2015 | Harumoto |
| 2015/0356289 A1 | 12/2015 | Brown et al. |
| 2016/0046298 A1 | 2/2016 | DeRuyck et al. |
| 2016/0100282 A1 | 4/2016 | Pounds et al. |
| 2016/0110066 A1 | 4/2016 | McCormick et al. |
| 2016/0176401 A1 | 6/2016 | Pilkington |
| 2016/0275376 A1 | 9/2016 | Kant |
| 2016/0288744 A1 | 10/2016 | Rutherford et al. |
| 2016/0293049 A1 | 10/2016 | Monahan et al. |
| 2016/0343091 A1 | 11/2016 | Han et al. |
| 2016/0375780 A1 | 12/2016 | Penilla et al. |
| 2016/0381510 A1 | 12/2016 | Reynolds |
| 2017/0039784 A1 | 2/2017 | Gelbart et al. |
| 2017/0060726 A1 | 3/2017 | Glistvain |
| 2017/0102463 A1 | 4/2017 | Hwang |
| 2017/0111770 A1 | 4/2017 | Kusens |
| 2017/0123397 A1 | 5/2017 | Billi et al. |
| 2017/0124476 A1 | 5/2017 | Levinson et al. |
| 2017/0140603 A1 | 5/2017 | Ricci |
| 2017/0195265 A1 | 7/2017 | Billi et al. |
| 2017/0200061 A1 | 7/2017 | Julian et al. |
| 2017/0263049 A1 | 9/2017 | MacDonald et al. |
| 2017/0263120 A1 | 9/2017 | Durie, Jr. et al. |
| 2017/0278004 A1 | 9/2017 | McElhinney et al. |
| 2017/0286838 A1 | 10/2017 | Cipriani et al. |
| 2017/0291611 A1 | 10/2017 | Innes et al. |
| 2017/0291800 A1 | 10/2017 | Scoville et al. |
| 2017/0323641 A1 | 11/2017 | Shimizu et al. |
| 2017/0332199 A1 | 11/2017 | Elliott et al. |
| 2017/0345283 A1 | 11/2017 | Kwon et al. |
| 2017/0366935 A1 | 12/2017 | Ahmadzadeh et al. |
| 2018/0001771 A1 | 1/2018 | Park et al. |
| 2018/0001899 A1 | 1/2018 | Shenoy et al. |
| 2018/0007149 A1 | 1/2018 | Gauglitz |
| 2018/0012196 A1 | 1/2018 | Ricci et al. |
| 2018/0025636 A1 | 1/2018 | Boykin et al. |
| 2018/0063576 A1 | 3/2018 | Tillman et al. |
| 2018/0068206 A1 | 3/2018 | Pollach et al. |
| 2018/0072313 A1 | 3/2018 | Stenneth |
| 2018/0075309 A1 | 3/2018 | Sathyanarayana et al. |
| 2018/0093672 A1 | 4/2018 | Terwilliger et al. |
| 2018/0174485 A1 | 6/2018 | Stankoulov |
| 2018/0234514 A1 | 8/2018 | Rajiv et al. |
| 2018/0247109 A1 | 8/2018 | Joseph et al. |
| 2018/0253109 A1 | 9/2018 | Fontaine et al. |
| 2018/0262724 A1 | 9/2018 | Ross |
| 2018/0295141 A1 | 10/2018 | Solotorevsky |
| 2018/0329381 A1 | 11/2018 | Doh et al. |
| 2018/0356800 A1 | 12/2018 | Chao et al. |
| 2018/0357484 A1 | 12/2018 | Omata |
| 2018/0364686 A1 | 12/2018 | Naidoo et al. |
| 2019/0003848 A1 | 1/2019 | Hoten et al. |
| 2019/0007690 A1 | 1/2019 | Varadarajan et al. |
| 2019/0025062 A1 | 1/2019 | Young et al. |
| 2019/0054876 A1 | 2/2019 | Ferguson et al. |
| 2019/0065951 A1 | 2/2019 | Luo et al. |
| 2019/0077308 A1 | 3/2019 | Kashchenko |
| 2019/0090084 A1 | 3/2019 | Jacobs et al. |
| 2019/0118655 A1 | 4/2019 | Grimes et al. |
| 2019/0120947 A1 | 4/2019 | Wheeler et al. |
| 2019/0174158 A1 | 6/2019 | Herrick et al. |
| 2019/0188847 A1 | 6/2019 | Gonzalez et al. |
| 2019/0244301 A1 | 8/2019 | Seth et al. |
| 2019/0257661 A1 | 8/2019 | Stentz et al. |
| 2019/0265712 A1 | 8/2019 | Satzoda et al. |
| 2019/0272725 A1 | 9/2019 | Viklund et al. |
| 2019/0286948 A1 | 9/2019 | Sathyanarayana et al. |
| 2019/0303718 A1 | 10/2019 | Tanigawa et al. |
| 2019/0304082 A1 | 10/2019 | Tokashiki et al. |
| 2019/0318419 A1 | 10/2019 | VanderZanden |
| 2019/0318549 A1 | 10/2019 | Zeira et al. |
| 2019/0327590 A1 | 10/2019 | Kubo et al. |
| 2019/0370581 A1 | 12/2019 | Cordell et al. |
| 2020/0018612 A1 | 1/2020 | Wolcott |
| 2020/0026282 A1 | 1/2020 | Choe et al. |
| 2020/0034928 A1 | 1/2020 | Lim et al. |
| 2020/0050182 A1 | 2/2020 | Cheng et al. |
| 2020/0074326 A1 | 3/2020 | Balakrishnan et al. |
| 2020/0074397 A1 | 3/2020 | Burda et al. |
| 2020/0077246 A1 | 3/2020 | Mars et al. |
| 2020/0092682 A1 | 3/2020 | Winograd et al. |
| 2020/0096598 A1 | 3/2020 | Jadav et al. |
| 2020/0139847 A1 | 5/2020 | Baumer et al. |
| 2020/0162489 A1 | 5/2020 | Bar-Nahum et al. |
| 2020/0164509 A1 | 5/2020 | Shults et al. |
| 2020/0168094 A1 | 5/2020 | Shimodaira et al. |
| 2020/0283003 A1 | 9/2020 | Raichelgauz |
| 2020/0311602 A1 | 10/2020 | Hawley et al. |
| 2020/0312155 A1 | 10/2020 | Kelkar et al. |
| 2020/0327009 A1 | 10/2020 | Callison et al. |
| 2020/0327369 A1 | 10/2020 | Cruz et al. |
| 2020/0329334 A1 | 10/2020 | Kurian |
| 2020/0342230 A1 | 10/2020 | Tsai et al. |
| 2020/0342506 A1 | 10/2020 | Levy et al. |
| 2020/0366468 A1 | 11/2020 | Khandani |
| 2020/0371773 A1 | 11/2020 | Kato et al. |
| 2020/0380806 A1 | 12/2020 | Tabata |
| 2020/0389415 A1 | 12/2020 | Zhao et al. |

(56) References Cited

U.S. PATENT DOCUMENTS

| | | |
|---|---|---|
| 2020/0409929 A1 | 12/2020 | Kodavarti et al. |
| 2021/0097315 A1 | 4/2021 | Carruthers et al. |
| 2021/0105574 A1 | 4/2021 | Kim et al. |
| 2021/0133160 A1 | 5/2021 | Craft |
| 2021/0235410 A1 | 7/2021 | Hollar et al. |
| 2021/0397908 A1 | 12/2021 | ElHattab et al. |
| 2022/0059218 A1 | 2/2022 | Fischer |
| 2022/0095698 A1 | 3/2022 | Talbot et al. |
| 2022/0165073 A1 | 5/2022 | Shikii et al. |
| 2022/0283051 A1 | 9/2022 | Weiler |
| 2022/0289203 A1 | 9/2022 | Makilya et al. |
| 2022/0374737 A1 | 11/2022 | Dhara et al. |
| 2022/0377517 A1 | 11/2022 | Altshul et al. |
| 2023/0077207 A1 | 3/2023 | Hassan et al. |
| 2023/0104403 A1 | 4/2023 | Erez et al. |
| 2023/0153735 A1 | 5/2023 | Dhara et al. |
| 2023/0169420 A1 | 6/2023 | Dhara et al. |
| 2023/0219592 A1 | 7/2023 | Calmer et al. |
| 2023/0221985 A1 | 7/2023 | Tsirkin |
| 2023/0281553 A1 | 9/2023 | Singh et al. |
| 2023/0291243 A1 | 9/2023 | Audet et al. |
| 2023/0298410 A1 | 9/2023 | Calmer et al. |
| 2024/0003749 A1 | 1/2024 | Lin et al. |
| 2024/0005678 A1 | 1/2024 | Hassan et al. |
| 2024/0013423 A1 | 1/2024 | Zaheer et al. |
| 2024/0063596 A1 | 2/2024 | Pandian et al. |
| 2024/0146629 A1 | 5/2024 | Lloyd |
| 2024/0259815 A1* | 8/2024 | Boyapalle ........... H04W 12/037 |
| 2025/0002033 A1 | 1/2025 | Calmer et al. |
| 2025/0054378 A1 | 2/2025 | Nagy |

FOREIGN PATENT DOCUMENTS

| | | |
|---|---|---|
| EP | 1615178 A2 | 1/2006 |
| GB | 2288892 A | 11/1995 |
| WO | WO 2017/123665 A1 | 7/2017 |
| WO | WO 2018/131322 A1 | 7/2018 |
| WO | WO 2019/099409 A1 | 5/2019 |
| WO | WO 2019/125545 A1 | 6/2019 |
| WO | WO 2019/133533 A1 | 7/2019 |
| WO | WO 2023/244513 A1 | 12/2023 |

OTHER PUBLICATIONS

U.S. Appl. No. 18/752,307, Dynamic Geofence Generation and Adjustment for Asset Tracking And Monitoring, filed Jun. 24, 2024.
"5 Minutes", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0014).
"Fleet Dashcam Solution—Vision Mobile App", Fleet Complete, accessed on May 16, 2024 [publication date unknown], in 13 pages. URL: https://www.fleetcomplete.com/products/old-vision-xxxxxx/.
"Fleet Complete Vision Brings Intelligent Video Analytics to Advance Fleet Safety", Fleet Complete, Apr. 5, 2018, in 1 page. URL: https://www.fleetcomplete.com/fleet-complete-vision-brings-intelligent-video-analytics-to-advance-fleet-safety/.
"Fuelopps" [archived webpage], Propel It, archived on Nov. 14, 2017, in 3 pages. URL: https://web.archive.org/web/20171114184116/http://www.propelit.net:80/fuelopps2.
"Fuelopps", Propel It, [publication date unknown], in 1 page. (PROPEL-IT-1393_00001).
"FuelOpps™ Delivers for Covenant Transportation Group—Improved driver behavior contributes to a 3+% MPG improvement in less than 12 months", FuelOpps by Propel IT, [publication date unknown], in 2 pages.
"FuelOpps™ Version 2.0" [presentation], Propel IT, Inc., [publication date unknown], in 17 pages.
"Our Products" [archived webpage], Propel It, archived on Aug. 3, 2018, in 2 pages. URL: https://web.archive.org/web/20180803052120/http://www.propelit.net:80/our-products-1.
"Our Products" [archived webpage], Propel It, archived on Aug. 3, 2018, in 2 pages. URL: https://web.archive.org/web/20180803052120/http://www.propelit.net:80/our-products-1 (MOTIVE-ITC-1393-0024677).
"Our Story", Netradyne, [publication date unknown], (filed in: In the Matter of Certain Vehicle Telematics, Fleet Management, and Video-Based Safety Systems, Devices, and Components thereof, Investigation No. 337-TA-1393, complaint filed Feb. 8, 2024), in 1 page (ND_ITC_0015).
"Safetyopps" [archived webpage], Propel It, archived on Nov. 14, 2017, in 3 pages. URL: https://web.archive.org/web/20171114183538/http://www.propelit.net:80/safetyopps2.
"Safetyopps", Propel It, [publication date unknown], in 1 page. (PROPEL-IT-1393_00019).
Gallagher, J., "KeepTruckin's AI Focus driving down costs for customers", FreightWaves, Dec. 9, 2019, in 4 pages. URL: https://www.freightwaves.com/news/ai-focus-vaults-keeptruckin-higher-on-freighttech-25-list.
Netradyne, Warnings, [publication date unknown], (filed in: In the Matter of Certain Vehicle Telematics, Fleet Management, and Video-Based Safety Systems, Devices, and Components thereof, Investigation No. 337-TA-1393, complaint filed 2024-02-08), in 2 pages (ND_ITC_0005-ND_ITC_0006).
Ruiz, J. F. et al., "A Lifecyle for Data Sharing Agreements: How it Works Out", In Schiffner, S et al. (eds.), *Privacy Technologies and Policy*, APF 2016, vol. 9857, 2016, pp. 3-20.
U.S. Appl. No. 18/749,408, Connection Throttling in a Low Power Physical Asset Tracking System, filed Jun. 20, 2024.
U.S. Appl. No. 18/752,000, Rolling Encryption and Authentication in a Low Power Physical Asset Tracking System, filed Jun. 24, 2024.
U.S. Appl. No. 18/747,336, Low Power Physical Asset Location Determination, filed Jun. 18, 2024.
"Cargo Monitor", Samsara Inc., accessed Feb. 21, 2024 [publication date unknown], in 2 pages. URL: https://www.samsara.com/products/models/cargo-monitor.
"Connect your operations on the Samsara Platform.", Samsara Inc., [publication date unknown]. URL: https://www.samsara.com/products/platform/?gad_source=1&gclid=EAlalQobChMI14DWIofYgwMVaymtBh36cwx9EAAYASAAEgKjUfD_BwE#impact1 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Driver I, The Power of Vision, Netradyne, [publication date unknown], in 2 pages.
"Driver Scorecards & Fleet Safety" [archived webpage], KeepTruckin, Inc., accessed on Oct. 24, 2023 [archived on Apr. 23, 2019; publication date unknown], in 9 pages. URL: https://web.archive.org/web/20190423104921/https://keeptruckin.com/fleet-safety-and-coaching.
"Driver Speed Management for Fleets—Monitoring Speeding in your fleet to increase safety and lower costs", Lytx, 2018, in 9 pages. URL: https://web.archive.org/web/20181217230050/https:/www.lytx.com/en-us/fleet-services/program-enhancements/speed-management-for-fleets.
"Dual-Facing AI Dash Cam—CM32", Samsara Inc., accessed Feb. 7, 2024 [publication date unknown]. URL: https://www.samsara.com/ca/products/models/cm32/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Eco:Drive™ Social, the community of responsible drivers", Stellantis, Apr. 15, 2014, in 2 pages. URL: https://www.media.stellantis.com/em-en/fiat/press/eco-drive-social-the-community-of-responsible-drivers.
"EcoDrive", Wikipedia, 2022, in 1 page. URL: https://en.wikipedia.org/wiki/EcoDrive.
"ELD Fact Sheet—English Version", Federal Motor Carrier Safety Administration, U.S. Department of Transportation, last updated Oct. 31, 2017 [publication date unknown], in 3 pages. URL: https://www.fmcsa.dot.gov/hours-service/elds/eld-fact-sheet-english-version.

(56) References Cited

OTHER PUBLICATIONS

"EM21—Environmental Monitor", Samsara Inc., accessed Feb. 21, 2024 [publication date unknown], in 5 pages. URL: https://www.samsara.com/uk/products/models/em21/.

"Fast Facts: Electronic Logging Device (ELD) Rule", Federal Motor Carrier Safety Administration, U.S. Department of Transportation, Jun. 2017, Document No. FMCSA-ADO-17-003 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.

"Fiat 500—2015 Owner's Manual", FCA US LLC, 2016, 5th ed., in 440 pages.

"Fiat 500 Eco system", Fiat 500 Eco System Forum, Apr. 21, 2020, in 5 pages. URL: https://www.fiat500usaforum.com/forum/fiat-500-forums/fiat-500-general-discussion/32268-fiat-500-eco-system?36406-Fiat-500-Eco-system=.

"Fiat launches EcoDrive for 500 and Grande Punto", Indian Autos Blog, Jul. 10, 2008, in 4 p. URL: https://indianautosblog.com/fiat-launches-ecodrive-for-500-and-grande-punto-p3049.

"Fiat launches fleet-specific eco:Drive system", Fleet World, 2010, in 3 pages. URL: https://fleetworld.co.uk/fiat-launches-fleet-specific-ecodrive-system/.

Goodwin, A., "Fiats ecoDrive teaches efficient driving", CNET, Oct. 22, 2008, in 5 pages. URL: https://www.cnet.com/roadshow/news/fiats-ecodrive-teaches-efficient-driving/.

"Front-Facing AI Dash Cam—CM31", Samsara Inc., accessed Feb. 7, 2024 [publication date unknown]. URL: https://www.samsara.com/products/models/cm31/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

"Guide: DRIVE risk score 101", Motive Technologies, Inc., [publication date unknown], Document No. 2022Q2_849898994 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 22 pages.

"Introduction Pack", Drivecam, Inc., 2012, in 32 pages. URL: https://www.iae-services.com.au/downloads/DriveCam-Introduction-Pack.pdf.

"KeepTruckin Expands Hardware Portfolio to Support Fleet Safety and Efficiency—New dual-facing dash camera and asset tracker deliver fleet safety and asset visibility", Business Wire, Sep. 9, 2019, in 4 pages. URL: https://www.businesswire.com/news/home/20190909005517/en/KeepTruckin-Expands-Hardware-Portfolio-to-Support-Fleet-Safety-and-Efficiency.

"KeepTruckin Launches New AI Dashcam Featuring Industry-Leading Accuracy to Proactively Prevent Accidents, Increase Safety and Efficiency", Business Wire, Aug. 12, 2021. URL: https://www.businesswire.com/news/home/20210812005612/en/KeepTruckin-Launches-New-AI-Dashcam-Featuring-Industry-Leading-Accuracy-to-Proactively-Prevent-Accidents-Increase-Safety-and-Efficiency (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.

"Lytx DriveCam Program Adds New Client-Centric Enhancements", Mass Transit, Oct. 4, 2016, in 6 pages. URL: https://www.masstransitmag.com/safety-security/press-release/12265105/lytx-lytx-drivecamtm-program-adds-newclient-centric-enhancements-evolving-the-gold-standard-video-telematics-program.

"Lytx Video Services Workspace—Screenshot Key", Lytx, 2017, in 1 page. URL: https://www.multivu.com/players/English/7899252-lytx-video-services-program/docs/KeytoLytx_1505780254680-149005849.pdf.

"Making roads safer for everyone, everywhere", Light Metrics, 2023, in 8 pages. URL: https://www.lightmetrics.co/about-us.

"Map and Tile Coordinates", Google for Developers, last updated Oct. 23, 2023 [retrieved on Oct. 24, 2023], in 5 pages. URL: https://developers.google.com/maps/documentation/javascript/coordinates.

"Meet Return on Traffic Data—The new potential for contextualized transportation analytics", Geotab ITS, accessed on Apr. 1, 2024 [publication date unknown], in 13 pages. URL: https://its.geotab.com/return-on-traffic-data/.

"Mobile Logbook for Drivers" [archived webpage], KeepTruckin, Inc., accessed on Feb. 5, 2024 [archived on Dec. 13, 2013; publication date unknown]. URL: https://web.archive.org/web/20131213071205/https:/keeptruckin.com/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

"Motive Announces AI Omnicam, the Industry's First AI-Enabled Camera Built for Side, Rear, Passenger, and Cargo Monitoring", Business Wire, Jun. 15, 2023, in 2 pages. URL: https://www.businesswire.com/news/home/20230615577887/en/Motive-Announces-AI-Omnicam-the-Industry%E2%80%99s-First-AI-Enabled-Camera-Built-for-Side-Rear-Passenger-and-Cargo-Monitoring.

"Nauto—Getting Started", Manualslib, Nauto, Inc., Apr. 20, 2017, in 18 pages. URL: https://www.manualslib.com/manual/1547723/Nauto-Nauto.html.

"Netradyne Adds New Detection Features to Driveri Platform", Automotive Fleet Magazine, Oct. 27, 2016, in 13 pages. URL: https://www.automotive-fleet.com/137445/netradyne-adds-new-detection-features-to-driveri-platform.

"NetraDyne Discuss their AI Platform 5G and their vision of the IoT (Internet of Things)", GSMA, Oct. 3, 2018, in 2 pages. URL: https://www.gsma.com/solutions-and-impact/technologies/internet-of-things/news/netradyne-interview/.

"Netradyne Vision based driver safety solution—Model Name: Driver I, Model No. DRI-128-TMO" [device specification], [publication date unknown], in 4 pages. URL: https://device.report/m/4dd89450078fa688b333692844d3bde954ddfbaf5c105c9d1d42dfd6965cbf1b.pdf.

"NetraDyne, an Artificial Intelligence Leader, Launches Driver-i™, a Vision-Based Platform, Focusing on Commercial Vehicle Driver Safety", Netradyne, [publication date unknown], in 2 pages.

"NetraDyne's Artificial Intelligence Platform Improves Road Safety", Sierra Wireless, Oct. 31, 2016, in 4 pages. URL: https://device.report/m/7d898f1b967fc646a1242d092207719be5da8c6cc9c7daabc63d4a307cfd3dcb.pdf.

"Product Brief: System Overview", Motive Technologies, Inc., [publication date unknown], Document No. 2022Q4_1203118185166511 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

"Product Brief: System Overview", Motive Technologies, Inc., [publication date unknown], Document No. 2022Q4_1203118185166511 (referenced in Jan. 24, 2024 Complaint, Case No. 1:24-cv-00084-UNA), in 3 pages. URL: https://gomotive.com/content-library/guides/system-overview/.

"Real-Time GPS Fleet Tracking" [archived webpage], KeepTruckin, Inc., accessed on Oct. 24, 2023 [archived on Apr. 8, 2019; publication date unknown], in 4 pages. URL: https://web.archive.org/web/20190408022059/https:/keeptruckin.com/gps-tracking.

"Samsara Vehicle Telematics—Fleet Technology That Goes Beyond GPS Tracking", Fleet Europe, Nexus Communication S.A., Oct. 11, 2022, in 7 pages. URL: https://www.fleeteurope.com/en/connected/europe/features/samsara-vehicle-telematics-fleet-technology-goes-beyond-gps-tracking?t%5B0%5D=Samsara&t%5B1%5D=Telematics&t%5B2%5D=Connectivity&curl=1.

"Sensor Fusion: Building the Bigger Picture of Risk", Lytx, Apr. 12, 2019, in 1 page. URL: https://www.lytx.com/newsletter/sensor-fusion-building-the-bigger-picture-of-risk.

"Smart Dashcam" [archived webpage], KeepTruckin, Inc., accessed on Oct. 24, 2023 [archived on Apr. 8, 2019; publication date unknown], in 8 pages. URL: https://web.archive.org/web/20190408015958/https://keeptruckin.com/dashcam.

(56) References Cited

OTHER PUBLICATIONS

"Spec Sheet: AI Dashcam", Motive Technologies, Inc., [publication date unknown], Document No. 2023Q2_1204527643716537 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Spec Sheet: AI Dashcam", Motive Technologies, Inc., [publication date unknown], Document No. 2023Q2_1205736073289732 (referenced in Jan. 24, 2024 Complaint, Case No. 1:24-cv-00084-UNA), in 5 pages. URL: https://gomotive.com/content-library/spec-sheet/ai-dashcam/.
"Spec Sheet: AI Omnicam", Motive Technologies, Inc., [publication date unknown], Document No. 2023Q2_1204519709838862 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Spec Sheet: Smart Dashcam", Motive Technologies, Inc., [publication date unknown], Document No. 2022Q2_911703417 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
"Spec Sheet: Vehicle Gateway", Motive Technologies, Inc., [publication date unknown], Document No. 2022Q1_858791278 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.
"Spec Sheet: Vehicle Gateway", Motive Technologies, Inc., [publication date unknown], Document No. 2022Q1_858791278 (referenced in Jan. 24, 2024 Complaint, Case No. 1:24-cv-00084-UNA), in 6 pages. URL: https://gomotive.com/content-library/spec-sheet/vehicle-gateway/.
"The 2012 Fiat 500: eco:Drive", Fiat500USA.com, Feb. 14, 2011, in 24 pages. URL: http://www.fiat500usa.com/2011/02/2012-fiat-500-ecodrive.html.
"The World's Smartest 360° Dashcam: Vezo 360—Fast Facts", Arvizon, [publication date unknown], in 7 pages. URL: https://cdn.newswire.com/files/x/5e/13/b92cd7c6259a708e1dfdaa0123c4.pdf.
"What is a ter-a-flop?", netradyne.com, [publication date unknown], in 2 pages.
"Vehicle Gateway", Samsara Inc., [publication date unknown]. URL: https://www.samsara.com/products/models/vehicle-gateway (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
"Vezo 360 Dash Cam—Capture Every Single Angle in Crisp Detail", ArVizon, 2019, in 13 pages. URL: https://www.arvizon.com/vezo-360-dash-cam/.
"Vezo 360, the World's Smartest Dashcam, Keeps You Awake at the Wheel", PR Newswire, Apr. 2, 2019, in 4 pages. URL: https://www.prnewswire.com/news-releases/vezo-360-the-worlds-smartest-dashcam-keeps-you-awake-at-the-wheel-300823457.html.
"The Home of Actionable Transportation Insights—Meet Altitude", Geotab ITS, accessed on Apr. 1, 2024 [publication date unknown], in 5 pages. URL: https://its.geotab.com/altitude/.
"Transform your business with the Connected Operations™ Cloud", Samsara Inc., accessed Feb. 21, 2024 [publication date unknown], in 8 pages. URL: https://www.samsara.com/products/platform/#impact0.
24/7 Staff, "KeepTruckin Raises $18 Million as Silicon Valley Eyes Trucking Industry", Supply Chain 24/7, May 23, 2017. URL: https://www.supplychain247.com/article/keeptruckin_raises_18_million_as_silicon_valley_eyes_trucking_industry/CSA (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 1 page.
Alpert, B., "Deep Learning for Distracted Driving Detection", Nauto, Jan. 15, 2019, in 10 pages. URL: https://www.nauto.com/blog/nauto-engineering-deep-learning-for-distracted-driver-monitoring.
Amazon Web Services, "How Nauto Is Using AI & MI to Build a Data Platform That Makes Driving Safer and Fleets Smarter" [video], YouTube, Apr. 16, 2018, screenshot in 1 page. URL: https://www.youtube.com/watch?v=UtMIrYTmCMU.
Armstrong, C. et al. "Transport Canada Commercial Bus HVEDR Feasibility Study (File No. T8080-160062) Deliverable No. 4", Mecanica Scientific Services Corp, 2018, in 62 pages. URL: https://transcanadahvedr.ca/wp-content/uploads/2022/01/T8080_Deliverable4-DevSmryRpt-FINAL-20180804_English.pdf.
AutoMotoTV, "Fiat ecoDrive System" [video], YouTube, Oct. 6, 2008, screenshot in 1 page URL: https://www.youtube.com/watch?v=AUSb2dBBI8E.
Batchelor, B. et al., "Vision Systems on the Internet", Proc. SPIE 6000, Two- and Three-Dimensional Methods for Inspection and Metrology III, Nov. 2005, vol. 600003, in 15 pages.
Bendix Commercial Vehicle Systems LLC, "Bendix launches new Wingman Fusion safety system at Mid-America Trucking Show", OEM Off-Highway, Mar. 25, 2015, in 10 pages. URL: https://www.oemoffhighway.com/electronics/sensors/proximity-detection-safety-systems/press-release/12058015/bendix-launches-new-wingman-fusion-safety-system-at-midamerica-trucking-show.
Bendix, "Bendix® Wingman® Fusion: The Integration of camera, radar, and brakes delivers a new level of performance in North America", Waterstruck.com, 2015, in 10 pages. URL: https://www.waterstruck.com/assets/Bendix-Wingman-Fusion-brochure_Truck-1.pdf.
Bendix, "Quick Reference Catalog", Bendix Commercial Vehicle Systems LLC, 2018, in 165 pages. URL: https://www.bendix.com/media/home/bw1114_us_010.pdf (uploaded in 2 parts).
Bergasa, L. M. et al., "DriveSafe: an App for Alerting Inattentive Drivers and Scoring Driving Behaviors", IEEE Intelligent Vehicles Symposium (IV), Jun. 2014, in 7 pages.
Boodlal, L. et al., "Study of the Impact of a Telematics System on Safe and Fuel-efficient Driving in Trucks", U.S. Department of Transportation, Federal Motor Carrier Safety Administration, Apr. 2014, Report No. FMCSA-13-020, in 54 pages.
Brown, P. et al., "AI Dash Cam Benchmarking" [report], Strategy Analytics, Inc., Apr. 15, 2022, in 27 pages.
Camden, M. et al., "AI Dash Cam Performance Benchmark Testing Final Report", Virginia Tech Transportation Institute, revised Aug. 17, 2023 [submitted Jun. 30, 2023] (filed with Jan. 24, 2024 Complaint, Case No. 1:24-cv-00084-UNA), in 110 pages.
Camden, M. et al., "AI Dash Cam Performance Benchmark Testing Final Report", Virginia Tech Transportation Institute, submitted Jun. 30, 2023 (filed with Jan. 24, 2024 Complaint, Case No. 1:24-cv-00084-UNA), in 109 pages.
Camillo, J., "Machine Vision for Medical Device Assembly", Assembly, Mar. 3, 2015, in 5 pages. URL: https://www.assemblymag.com/articles/92730-machine-vision-for-medical-device-assembly.
Camillo, J., "Machine Vision for Medical Device Assembly", Assembly, Mar. 3, 2015, in 5 pages.
Cetecom, "FCC/IC Test Setup Photos, Intelligent Driving Monitoring System Smart Connected Dash Cam", Cetecom, Inc., Feb. 7, 2018, in 9 pages. URL: https://device.report/m/a68e1abef29f58b699489f50a4d27b81f1726ab4f55b3ac98b573a286594dc54.pdf.
Chauhan, V. et al., "A Comparative Study of Machine Vision Based Methods for Fault Detection in an Automated Assembly Machine", Procedia Manufacturing, 2015, vol. 1, pp. 416-428.
Chiou, R. et al., "Manufacturing E-Quality Through Integrated Web-enabled Computer Vision and Robotics", The International Journal of Advanced Manufacturing Technology, Aug. 2009, vol. 43, in 19 pages.
Chiou, R. et al., "Manufacturing E-Quality Through Integrated Web-enabled Computer Vision and Robotics", The International Journal of Advanced Manufacturing Technology, 2009 (published online Oct. 1, 2008), vol. 43, in 11 pages.

(56) References Cited

OTHER PUBLICATIONS

Cook, B., "Drivecam: Taking Risk out of Driving, Findings related to In-Cab driver Distraction", Drivecam, 2010, in 50 pages. URL: https://www.fmcsa.dot.gov/sites/fmcsa.dot.gov/files/docs/MCSAC_201006_DriveCam.pdf.

Cordes, C., "Ask an Expert: Capturing Fleet Impact from Telematics", Mckinsey & Co., Jun. 13, 2017, in 3 pages. URL: https://www.mckinsey.com/capabilities/operations/our-insights/ask-an-expert-capturing-fleet-impact-from-telematics.

D'Agostino, C. et al., "Learning-Based Driving Events Recognition and Its Application to Digital Roads", IEEE Transactions on Intelligent Transportation Systems, Aug. 2015, vol. 16(4), pp. 2155-2166.

Dillon, A., "User Interface Design", MacMillan Encyclopedia of Cognitive Science, 2003, vol. 4, London: MacMillan, in 18 pages (pp. 453-458). Downloaded from http://hdl.handle.net/10150/105299.

Dillon, A., "User Interface Design", *MacMillan Encyclopedia of Cognitive Science,* 2006, vol. 4, London: MacMillan, in 6 p. (pp. 453-458). Downloaded from https://onlinelibrary.wiley.com/doi/10.1002/0470018860.s00054.

Dunn, B., "What is the Lytx DriveCam?", Autobytel, Jul. 12, 2014, in 1 page. URL: https://www.autobytel.com/what-is-lytx-drivecam.

Ekström, L., "Estimating fuel consumption using regression and machine learning", KTH Royal Institute of Technology, Degree Project in Mathematics, 2018, in 126 pages.

Engelbrecht, J. et al., "A Survey of Smartphone-based Sensing in Vehicles for ITS Applications", IET Intelligent Transport Systems, Jul. 2015, vol. 9(10), in 23 pages.

Fiat, "Interview to Giorgio Neri: videotutorial eco:Drive" [video], YouTube, Dec. 1, 2010, screenshot in 1 page. URL: https://www.youtube.com/watch?v=XRDeHbUimOs&t=27s.

FiatFranco, ""Ciao!"—Fiat ecoDrive" [video], YouTube, Sep. 10, 2007, screenshot in 1 page URL: https://www.youtube.com/watch?v=SluE9Zco55c.

Firstnet™ Built with AT&T, "Reliable telematics solution for utility fleets", Fleet Complete, Apr. 25, 2019, in 2 pages. URL: https://www.firstnet.com/content/dam/firstnet/white-papers/firstnet-fleet-complete-utilities.pdf.

Fleet Complete, "Tony Lourakis tests out Fleet Complete Vision—our new video telematics and driver coaching tool" [video], YouTube, Jan. 9, 2019, screenshot in 1 page. URL: https://www.youtube.com/watch?v=3zEY5x5DOY8.

Fleet Equipment Staff, "Lytx announces enhancements to DriveCam system", Fleetequipmentmag.com, Oct. 7, 2016, in 9 pages. URL: https://www.fleetequipmentmag.com/lytx-drivecam-system-truck-telematics/.

Geraci, B., "It's been one year since we launched the Motive AI Dashcam. See how it's only gotten better.", Motive Technologies, Inc., Oct. 13, 2022, in 5 pages. URL: https://gomotive.com/blog/motive-ai-dashcam-year-one/.

Gilman, E et al., "Personalised assistance for fuel-efficient driving", Transportation Research Part C, Mar. 2015, pp. 681-705.

Ginevra2008, "Fiat EcoDrive" [video], YouTube, Mar. 7, 2008, screenshot in 1 page. URL: https://www.youtube.com/watch?v=D95p9Bljr90.

Goncalves, J. et al., "Smartphone Sensor Platform to Study Traffic Conditions and Assess Driving Performance", 17th International IEEE Conference on Intelligent Transportation Systems (ITSC), Oct. 2014, in 6 pages.

Green, A., "Logistics Disruptors: Motive's Shoaib Makani on AI and automation", Mckinsey & Company, Sep. 6, 2022, in 7 pages. URL: https://www.mckinsey.com/industries/travel-logistics-and-infrastructure/our-insights/logistics-disruptors-motives-shoaib-makani-on-ai-and-automation.

Groover, M. P., "Chapter 22 Inspection Technologies", in Automation, Production Systems, and Computer-Integrated Manufacturing, 2015, 4th Edition, Pearson, pp. 647-684.

Groover, M. P., *Automation, Production Systems, and Computer-Integrated Manufacturing,* 2016, 4th Edition (Indian Subcontinent Adaptation), Pearson, in 11 pages.

Hampstead, J. P. "Lightmetrics:an exciting video telematics software startup", FrieghtWaves, Aug. 5, 2018, in 4 pages. URL: https://www.freightwaves.com/news/lightmetrics-exciting-video-telematics-startup.

Han, Z. et al., "Design of Intelligent Road Recognition and Warning System for Vehicles Based on Binocular Vision", IEEE Access, Oct. 2018, vol. 6, pp. 62880-62889.

Hanson, Kelly, "Introducing Motive's Safety Hub for accident prevention and exoneration.", Motive Technologies, Inc., Aug. 18, 2020, in 6 pages. URL: https://gomotive.com/blog/motive-safety-hub/.

Haridas, S., "KeepTruckin Asset Gateway Review", Truck Trailer Tracker, Nov. 16, 2020, in 7 pages. URL: https://trucktrailertracker.com/keeptruckin-asset-gateway-review/.

Haworth, N. et al., "The Relationship between Fuel Economy and Safety Outcomes", Monash University, Accident Research Centre, Dec. 2001, Report No. 188, in 67 pages.

Horowitz, E. "Improve Fleet Safety with Samsara", Samsara Inc., Aug. 25, 2017, in 4 pages. URL: https://www.samsara.com/ca/blog/improve-fleet-safety-with-samsara/.

Horsey, J., "VEZO 360 4K 360 dash cam from $149", Geeky Gadgets, Apr. 3, 2019, in 12 pages. URL: https://www.geeky-gadgets.com/vezo-360-4k-360-dash-cam-03-04-2019/.

Huang, K.-Y. et al., "A Novel Machine Vision System for the Inspection of Micro-Spray Nozzle", Sensors, Jun. 2015, vol. 15(7), pp. 15326-15338.

Huff, A., "Lytx DriveCam", CCJDigital, Apr. 4, 2014, in 12 pages. URL: https://www.ccjdigital.com/business/article/14929274/lytx-drivecam.

Huff, A., "NetraDyne Uses Artificial Intelligence in New Driver Safety Platform", CCJ, Sep. 15, 2016, in 10 pages. URL: https://www.ccjdigital.com/business/article/14933761/netradyne-uses-artificial-intelligence-in-new-driver-safety-platform.

Junior, J. F. et al., "Driver behavior profiling: An investigation with different smartphone sensors and machine learning", PLoS ONE, Apr. 2017, vol. 12(4): e0174959, in 16 pages.

Khan, M., "Why and How We Measure Driver Performance", Medium, Jan. 14, 2020. URL: https://medium.com/motive-eng/why-and-how-we-measure-driver-performance-768d5316fb2c#:~:text=By%20studying%20data%20gathered%20from,the%20driver%20a%20safety%20score (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 8 pages.

Kinney, J., "Timeline of the ELD Mandate: History & Important Dates", GPS Trackit, May 3, 2017. URL: https://gpstrackit.com/blog/a-timeline-of-the-eld-mandate-history-and-important-dates/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.

Kwon, Y. J. et al., "Automated Vision Inspection in Network-Based Production Environment", International Journal of Advanced Manufacturing Technology, Feb. 2009, vol. 45, pp. 81-90.

Lan, M. et al., "SmartLDWS: A Robust and Scalable Lane Departure Warning System for the Smartphones", Proceedings of the 12th International IEEE Conference on Intelligent Transportation Systems, Oct. 3-7, 2009, pp. 108-113.

Lekach, S., "Driver safety is 'all talk' with this AI real-time road coach", Mashable, Aug. 3, 2018, in 11 pages. URL: https://mashable.com/article/netradyne-driveri-ai-driver-safety.

Lotan, T. et al., "In-Vehicle Data Recorder for Evaluation of Driving Behavior and Safety", Transportation Research Record Journal of the Transportation Research Board, Jan. 2006, in 15 pages.

Lytx, "TeenSafe Driver Program", American Family Insurance®, 2014, in 10 pages. URL: https://online-sd02.drivecam.com/Downloads/TSD_WebsiteGuide.pdf.

Malamas, Elias N. et al. "A survey on industrial vision systems, applications and tools", Image and Vision Computing, Dec. 28, 2002, vol. 21, pp. 171-188.

(56) References Cited

OTHER PUBLICATIONS

Meiring, G. et al., "A Review of Intelligent Driving Style Analysis Systems and Related Artificial Intelligence Algorithms", Sensors, Dec. 2015, vol. 15, pp. 30653-30682.

Mitrovic, D. et al., "Reliable Method for Driving Events Recognition", IEEE Transactions on Intelligent Transportation Systems, Jun. 2005, vol. 6(2), pp. 198-205.

Motive Help Center, "*New Fleet Managers Start Here*—Getting Started with Motive for Fleet Managers", Motive Technologies, Inc., accessed on Oct. 24, 2023 [publication date unknown], in 2 pages. URL: https://helpcenter.gomotive.com/hc/en-US/articles/6162442580893--New-Fleet-Managers-Start-Here-Getting-Started-with-Motive-for-Fleet-Managers.

Motive Help Center, "How to add a vehicle on the Fleet Dashboard", Motive Technologies, Inc., accessed on Oct. 25, 2023 [publication date unknown], in 6 pages. URL: https://helpcenter.gomotive.com/hc/en-us/articles/6208623928349.

Motive Help Center, "How to assign an Environmental Sensor to Asset Gateway", Motive Technologies, Inc., accessed on Oct. 24, 2023 [publication date unknown], in 11 pages. URL: https://helpcenter.gomotive.com/hc/en-us/articles/6908982681629.

Motive Help Center, "How to create a Geofence", Motive Technologies, Inc., accessed on Oct. 24, 2023 [publication date unknown], in 5 pages. URL: https://helpcenter.gomotive.com/hc/en-us/articles/6162211436061-How-to-create-a-Geofence.

Motive Help Center, "How to create Alert for Geofence", Motive Technologies, Inc., accessed on Oct. 24, 2023 [publication date unknown], in 10 pages. URL: https://helpcenter.gomotive.com/hc/en-us/articles/6190688664733-How-to-create-Alert-for-Geofence.

Motive Help Center, "How to enable Dashcam In-cab Alerts for a Vehicle?", Motive Technologies, Inc., accessed on Feb. 7, 2024 [publication date unknown]. URL: https://helpcenter.gomotive.com/hc/en-us/articles/11761978874141-How-to-enable-Dashcam-In-cab-Alerts-for-a-Vehicle (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.

Motive Help Center, "How to enable Event Severity", Motive Technologies, Inc., accessed on Oct. 24, 2023 [publication date unknown], in 3 pages. URL: https://helpcenter.gomotive.com/hc/en-us/articles/7123375017757-How-to-enable-Event-Severity.

Motive Help Center, "How to enable In-Cab audio alerts on the Motive Fleet Dashboard", Motive Technologies, Inc., accessed on Oct. 25, 2023 [publication date unknown], in 4 pages. URL: https://helpcenter.gomotive.com/hc/en-us/articles/6176882285469.

Motive Help Center, "How to install Environmental Sensors", Motive Technologies, Inc., accessed on Oct. 24, 2023 [publication date unknown], in 4 pages. URL: https://helpcenter.gomotive.com/hc/en-us/articles/6907777171613.

Motive Help Center, "How to Manage a Group and Sub-groups", Motive Technologies, Inc., accessed on Oct. 24, 2023 [publication date unknown], in 4 pages. URL: https://helpcenter.gomotive.com/hc/en-us/articles/6189047187997-How-to-Manage-A-Group-and-Sub-groups.

Motive Help Center, "How to manage Fuel Hub Vehicle Details", Motive Technologies, Inc., accessed on Oct. 24, 2023 [publication date unknown], in 5 pages. URL: https://helpcenter.gomotive.com/hc/en-us/articles/6190039573789-How-to-manage-Fuel-Hub-Vehicle-Details.

Motive Help Center, "How to modify/ set up custom safety events thresholds", Motive Technologies, Inc., accessed on Oct. 24, 2023 [publication date unknown], in 4 pages. URL: https://helpcenter.gomotive.com/hc/en-us/articles/6162556676381-How-to-set-up-Custom-Safety-Event-Thresholds-for-vehicles.

Motive Help Center, "How to monitor Fleet's Speeding behavior", Motive Technologies, Inc., accessed on Oct. 24, 2023 [publication date unknown], in 4 pages. URL: https://helpcenter.gomotive.com/hc/en-us/articles/6189068876701-How-to-monitor-fleet-s-Speeding-behavior.

Motive Help Center, "How to recall/request video from the Motive Fleet Dashboard?", Motive Technologies, Inc., accessed on Oct. 25, 2023 [publication date unknown], in 7 pages. URL: https://helpcenter.gomotive.com/hc/en-us/articles/6162075219229-How-to-recall-request-video-from-the-Motive-Dashcam.

Motive Help Center, "How to record Hours of Service (HOS) with Vehicle Gateway", Motive Technologies, Inc., accessed on Oct. 24, 2023 [publication date unknown], in 3 pages. URL: https://helpcenter.gomotive.com/hc/en-us/articles/6162505072157-How-to-record-Hours-of-Service-HOS-with-Vehicle-Gateway.

Motive Help Center, "How to set a custom Speed Limit", Motive Technologies, Inc., accessed on Oct. 24, 2023 [publication date unknown], in 5 pages. URL: https://helpcenter.gomotive.com/hc/en-us/articles/8866852210205-How-to-set-a-custom-Speed-Limit.

Motive Help Center, "How to Set Real-Time Speeding Alerts on the Fleet Dashboard", Motive Technologies, Inc., accessed on Oct. 24, 2023 [publication date unknown], in 7 pages. URL: https://helpcenter.gomotive.com/hc/en-us/articles/6175738246557-How-to-Set-Real-Time-Speeding-Alerts-on-the-Fleet-Dashboard.

Motive Help Center, "How to set up Custom Safety Event Thresholds for vehicles", Motive Technologies, Inc., accessed on Mar. 13, 2023 [publication date unknown], in 6 pages. URL: https://helpcenter.gomotive.com/hc/en-us/articles/6162556676381-How-to-set-up-Custom-Safety-Event-Thresholds-for-vehicles.

Motive Help Center, "How to track vehicle speed from the Motive Fleet Dashboard", Motive Technologies, Inc., accessed on Oct. 24, 2023 [publication date unknown], in 4 pages. URL: https://helpcenter.gomotive.com/hc/en-us/articles/6189043119261-How-to-track-vehicle-speed-from-the-Motive-Fleet-Dashboard.

Motive Help Center, "How to unpair and repair Environmental Sensors", Motive Technologies, Inc., accessed on Oct. 24, 2023 [publication date unknown], in 3 pages. URL: https://helpcenter.gomotive.com/hc/en-us/articles/6905963506205-How-to-unpair-and-repair-Environmental-Sensors.

Motive Help Center, "How to view a Safety Event", Motive Technologies, Inc., accessed on Oct. 25, 2023 [publication date unknown], in 4 pages. URL: https://helpcenter.gomotive.com/hc/en-us/articles/6189410468509-How-to-view-a-Safety-Event.

Motive Help Center, "How to view Fleet DRIVE Score Report on Fleet Dashboard", Motive Technologies, Inc., accessed on Feb. 7, 2024 [publication date unknown]. URL: https://helpcenter.gomotive.com/hc/en-us/articles/13200798670493-How-to-view-Fleet-DRIVE-Score-Report-on-Fleet-Dashboard (filed with 2024-02-08 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view Fuel Hub Driver Details", Motive Technologies, Inc., [publication date unknown]. URL: https://helpcenter.gomotive.com/hc/en-us/articles/6173246145053-How-to-view-Fuel-Hub-Driver-Details (filed with 2024-02-08 ITC Complaint, In the Matter of Certain Vehicle Telematics, Fleet Management, and Video-Based Safety Systems, Devices, and Components thereof, Investigation No. 337-TA-3722), in 5 pages.

Motive Help Center, "How to view Fuel Hub Driver Details", Motive Technologies, Inc., accessed on Oct. 24, 2023 [publication date unknown], in 7 pages. URL: https://helpcenter.gomotive.com/hc/en-us/articles/6173246145053-How-to-view-Fuel-Hub-Driver-Details.

Motive Help Center, "How to view Group DRIVE Score Report on Fleet Dashboard", Motive Technologies, Inc., accessed on Feb. 7, 2024 [publication date unknown]. URL: https://helpcenter.gomotive.com/hc/en-us/articles/12743858622365-How-to-view-Group-DRIVE-Score-Report-on-Fleet-Dashboard (filed with 2024-02-08 ITC Complaint, In the Matter of Certain Vehicle Telematics, Fleet Management, and Video-Based Safety Systems, Devices, and Components thereof, Investigation No. 337-TA-3722), in 2 pages.

Motive Help Center, "How to view safety events report", Motive Technologies, Inc., accessed on Oct. 24, 2023 [publication date unknown], in 2 pages. URL: https://helpcenter.gomotive.com/hc/en-us/articles/6190647741853-How-to-view-safety-events-report.

Motive Help Center, "How to view Stop Sign Violation events on Fleet Dashboard", Motive Technologies, Inc., accessed on Feb. 7, 2024 [publication date unknown]. URL: https://helpcenter.gomotive.

(56) References Cited

OTHER PUBLICATIONS com/hc/en-us/articles/6163732277917-How-to-view-Stop-Sign-Violation-events-on-Fleet-Dashboard (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view Stop Sign Violation events on Fleet Dashboard", Motive Technologies, Inc., accessed on Oct. 24, 2023 [publication date unknown], in 2 pages. URL: https://helpcenter.gomotive.com/hc/en-us/articles/6163732277917-How-to-view-Stop-Sign-Violation-events-on-Fleet-Dashboard.
Motive Help Center, "How to view the Driver DRIVE Score Report", Motive Technologies, Inc., accessed on Feb. 7, 2024 [publication date unknown]. URL: https://helpcenter.gomotive.com/hc/en-us/articles/13200710733853-How-to-view-the-Driver-DRIVE-Score-Report (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Motive Help Center, "How to view the Safety Hub and DRIVE Score details in the DriverApp", Motive Technologies, Inc., accessed on Oct. 24, 2023 [publication date unknown], in 5 pages. URL: https://helpcenter.gomotive.com/hc/en-us/articles/6162215453853-How-to-view-safety-events-and-Dashcam-videos-on-Motive-App.
Motive Help Center, "How to view your vehicle's Utilization details", Motive Technologies, Inc., accessed on Feb. 7, 2024 [publication date unknown]. URL: https://helpcenter.gomotive.com/hc/en-us/articles/6176914537373-How-to-view-your-vehicle-s-Utilization-details (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive Help Center, "Viewing Close Following Events on the Motive Fleet Dashboard", Motive Technologies, Inc., accessed on Oct. 24, 2023 [publication date unknown], in 7 pages. URL: https://helpcenter.gomotive.com/hc/en-us/articles/6189574616989-Viewing-Close-Following-Events-on-the-Motive-Fleet-Dashboard.
Motive Help Center, "What are safety risk tags?", Motive Technologies, Inc., accessed on Feb. 21, 2024 [publication date unknown], in 4 pages. URL: https://helpcenter.gomotive.com/hc/en-us/articles/6163713841053.
Motive Help Center, "What are the definitions of safety behaviors triggered by Motive's AI & Smart Dashcams", Motive Technologies, Inc., accessed on Mar. 13, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.
Motive Help Center, "What are the definitions of safety behaviors triggered by Motive's AI & Smart Dashcams", Motive Technologies, Inc., accessed on Oct. 24, 2023 [publication date unknown], in 3 pages. URL: https://helpcenter.gomotive.com/hc/en-us/articles/8218103926941-What-are-the-definitions-of-safety-behaviors-triggered-by-Motive-s-AI-Smart-Dashcams.
Motive Help Center, "What are Vehicle Gateway Malfunctions and Data Diagnostics", Motive Technologies, Inc., accessed on Oct. 24, 2023 [publication date unknown], in 4 pages. URL: https://helpcenter.gomotive.com/hc/en-us/articles/6160848958109-What-are-Vehicle-Gateway-Malfunctions-and-Data-Diagnostics.
Motive Help Center, "What is DRIVE Risk Score?", Motive Technologies, Inc., accessed on Oct. 24, 2023 [publication date unknown]. URL: https://helpcenter.gomotive.com/hc/en-us/articles/6162164321693-What-is-DRIVE-risk-score- (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 5 pages.
Motive Help Center, "What is Fuel Hub?", Motive Technologies, Inc., accessed on Feb. 5, 2024 [publication date unknown]. URL: https://helpcenter.gomotive.com/hc/en-us/articles/6161577899165-What-is-Fuel-Hub (filed with Feb. 8, 2024-02-08 ITC Complaint, In the Matter of Certain Vehicle Telematics, Fleet Management, and Video-Based Safety Systems, Devices, and Components thereof, Investigation No. 337-TA-3722), in 9 pages.
Motive Help Center, "What unsafe behaviors does Motive monitor through Dashcam and Vehicle Gateway?", Motive Technologies, Inc., accessed on Feb. 21, 2024 [publication date unknown], in 5 pages. URL: https://helpcenter.gomotive.com/hc/en-us/articles/6858636962333-What-unsafe-behaviors-does-Motive-monitor-through-Dashcam-and-Vehicle-Gateway-#01HCB72T2EXXW3FFVJ1XSDEG77.
Motive, "AI dash cam comparison: Motive, Samsara, Lytx", Motive Technologies, Inc., [publication date unknown]. URL: https://gomotive.com/products/dashcam/fleet-dash-cam-comparison/#seat-belt-use (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Motive, "AI dash cam comparison: Motive, Samsara, Lytx", Motive Technologies, Inc., accessed on Feb. 18, 2024 [publication date unknown], in 20 pages. URL: https://gomotive.com/products/dashcam/fleet-dash-cam-comparison/.
Motive, "Asset Gateway Installation Guide | Cable/Vehicle Powered" screenshot in 1 page. URL: https://www.youtube.com/watch?v=pME-VMauQgY.
Motive, "Asset Gateway Installation Guide | Solar Powered" [video], YouTube, Jun. 25, 2020, screenshot in 1 page. URL: https://www.youtube.com/watch?v=jifKM3GT6Bs.
Motive, "Benchmarking AI Accuracy for Driver Safety" [video], YouTube, Apr. 21, 2022, screenshot in 1 page. URL: https://www.youtube.com/watch?v=brRt2h0J80E.
Motive, "CEO Shoaib Makani's email to Motive employees.", Motive Technologies, Inc., Dec. 7, 2022, in 5 pages. URL: https://gomotive.com/blog/shoaib-makanis-message-to-employees/.
Motive, "Coach your drivers using the Motive Safety Hub." [video], YouTube, Mar. 27, 2023, screenshot in 1 page. URL: https://www.youtube.com/watch?v=VeErPXF30js.
Motive, "Equipment and trailer monitoring", Motive Technologies, Inc., accessed on Feb. 18, 2024 [publication date unknown], in 11 pages. URL: https://gomotive.com/products/tracking-telematics/trailer-tracking/.
Motive, "Experts agree, Motive is the most accurate, fastest AI dash cam.", Motive Technologies, Inc., accessed Feb. 21, 2024 [publication date unknown] in 16 pages. URL: https://gomotive.com/products/dashcam/best-dash-cam/.
Motive, "Guide: AI Model Development", Motive Technologies, Inc., accessed on Mar. 29, 2024 [publication date unknown], Document No. 2022Q1_849898994, in 14 pages.
Motive, "Guide: DRIVE risk score", Motive Technologies, Inc., accessed on Apr. 8, 2023 [publication date unknown], Document No. 2022Q2_849898994, in 22 pages.
Motive, "Guide: Smart Event Thresholds", Motive Technologies, Inc., accessed on Apr. 8, 2023 [publication date unknown], Document No. 2022Q1_902914404, in 11 pages.
Motive, "How to install a Motive Vehicle Gateway in light-duty vehicles." [video], YouTube, Aug. 5, 2022, screenshot in 1 page. URL: https://www.youtube.com/watch?v=WnclRs_cFw0.
Motive, "How to install your Motive AI Dashcam." [video], YouTube, Aug. 5, 2022, screenshot in 1 page. URL: https://www.youtube.com/watch?v=3JNG2h3KnU4.
Motive, "IFTA fuel tax reporting", Motive Technologies, Inc., accessed on Feb. 18, 2024 [publication date unknown], in 4 pages. URL: https://gomotive.com/products/fleet-compliance/ifta-fuel-tax-reporting/.
Motive, "Improve road and fleet safety with driver scores.", Motive Technologies, Inc., Feb. 7, 2019, in 5 pages. URL: https://gomotive.com/blog/improve-fleet-safety-driver-scores/.
Motive, "Industry-leading fleet management solutions", Motive Technologies, Inc., accessed on Feb. 18, 2024 [publication date unknown], in 13 pages. URL: https://gomotive.com/products/.
Motive, "Introducing an easier way to manage unidentified trips.", Motive Technologies, Inc., Apr. 30, 2020, in 5 pages. URL: https://gomotive.com/blog/introducing-easier-ude-management/.

(56) References Cited

OTHER PUBLICATIONS

Motive, "Introducing Motive Driver Workflow.", Motive Technologies, Inc., Oct. 16, 2017, in 5 pages. URL: https://gomotive.com/blog/motive-driver-workflow/.
Motive, "Introducing the Motive Asset Gateway and dual-facing Smart Dashcam.", Motive Technologies, Inc., Sep. 9, 2019, in 5 pages. URL: https://gomotive.com/blog/trailer-tracking-and-dual-facing-dash-cam-introducing/.
Motive, "Introducing the Motive Smart Dashcam", Motive Technologies, Inc., Jun. 6, 2018. URL: https://gomotive.com/blog/announcing-smart-dashcam (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Motive, "KeepTruckin ELD Training for Drivers" [video], YouTube, Feb. 2, 2018, screenshot in 1 page. URL: https://www.youtube.com/watch?v=LkJLIT2bGS0.
Motive, "KeepTruckin Smart Dashcam" [video], Facebook, Jun. 6, 2018. URL: https://www.facebook.com/keeptrucking/videos/keeptrucking-smart-dashcam/10212841352048331/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Motive, "Motive Fleet View | Advanced GPS system for live and historical fleet tracking." [video], YouTube, Jan. 23, 2023, screenshot in 1 page. URL: https://www.youtube.com/watch?v=CSDiDZhjVOQ.
Motive, "Motive introduces Reefer Monitoring for cold chain logistics.", Motive Technologies, Inc., |Oct. 4, 2022, in 5 pages. URL: https://gomotive.com/blog/motive-introduces-reefer-monitoring-for-cold-chain-logistics/.
Motive, "Motive Reefer Monitoring for cold chain logistics." [video], YouTube, Oct. 5, 2022, screenshot in 1 page. URL: https://www.youtube.com/watch?v=rDwS5AmQp-M.
Motive, "Motive Smart Load Board—designed to help you find the right loads faster." [video], YouTube, Nov. 28, 2022, screenshot in 1 page. URL: https://www.youtube.com/watch?v=UF2EQBzLYYk.
Motive, "Motive vs. Samsara: What's the difference?", Motive Technologies, Inc., accessed Feb. 21, 2024 [publication date unknown], in 16 pages. URL: https://gomotive.com/motive-vs-samsara/#compare-chart.
Motive, "No time for downtime—automate fleet maintenance schedules" [video], YouTube, Dec. 20, 2022, screenshot in 1 page. URL: https://www.youtube.com/watch?v=flUccP-ifaU.
Motive, "Product Brief: Driver Safety", Motive Technologies, Inc., accessed on Oct. 24, 2023 [publication date unknown], Document No. 2023Q2_1204527735206670, in 4 pages.
Motive, "Product Brief: System Overview", Motive Technologies, Inc., accessed on Oct. 24, 2023 [publication date unknown], Document No. 2022Q4_1203331000367178, in 4 pages.
Motive, "Product Brief: Tracking & Telematics", Motive Technologies, Inc., accessed on Oct. 24, 2023 [publication date unknown], Document No. 2022Q3_ 1202933457877590, in 4 pages.
Motive, "Products | AI Dashcam—Smart, accurate, and responsive AI dash cams.", Motive Technologies, Inc., [publication date unknown]. URL: https://gomotive.com/products/dashcam/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 7 pages.
Motive, "Products | AI Dashcam—Smart, accurate, and responsive AI dash cams.", Motive Technologies, Inc., accessed on Feb. 18, 2024 [publication date unknown], in 9 pages. URL: https://gomotive.com/products/dashcam/.
Motive, "Products | Dispatch—Manage your dispatches with ease.", Motive Technologies, Inc., accessed on Feb. 18, 2024 [publication date unknown], in 9 pages. URL: https://gomotive.com/products/dispatch-workflow/.
Motive, "Products | Driver Safety—Protect your fleet and profits with an all-in-one safety solution.", Motive Technologies, Inc., accessed on Feb. 18, 2024 [publication date unknown], in 13 pages. URL: https://gomotive.com/products/driver-safety/.
Motive, "Products | Driver Safety—Protect your fleet and profits with an all-in-one safety solution.", Motive Technologies, Inc., accessed on Feb. 5, 2024 [publication date unknown]. URL: https://gomotive.com/products/driver-safety/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 16 pages.
Motive, "Products | Platform—Everything you need to manage your fleet. In one place.", Motive Technologies, Inc., accessed on Feb. 7, 2024 [publication date unknown]. URL: https://gomotive.com/products/platform/ (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 12 pages.
Motive, "Products | Reefer Monitoring—The strongest link in cold chain transportation.", Motive Technologies, Inc., accessed on Feb. 18, 2024 [publication date unknown], in 8 pages. URL: https://gomotive.com/products/reefer-monitoring-system/.
Motive, "Products | Tracking & Telematics—Track and monitor your fleet.", Motive Technologies, Inc., accessed on Feb. 18, 2024 [publication date unknown], in 11 pages. URL: https://gomotive.com/products/tracking-telematics/.
Motive, "Spec Sheet: AI Dashcam", Motive Technologies, Inc., accessed on Oct. 24, 2023 [publication date unknown], Document No. 2022Q3_1202788858717595, in 5 pages.
Motive, "Spec Sheet: Asset Gateway", Motive Technologies, Inc., accessed on Mar. 15, 2023 [publication date unknown], Document No. 2022Q1_849551229, in 6 pages.
Motive, "Take control of your fleet with Groups and Features Access.", Motive Technologies, Inc., Apr. 4, 2017, in 3 pages. URL: https://gomotive.com/blog/take-control-fleet-groups-features-access/.
Motive, "Take the time and hassle out of IFTA fuel tax reporting with Motive's fleet card." [video], YouTube, Jan. 26, 2023, screenshot in 1 page. URL: https://www.youtube.com/watch?v=OEN9Q8X3j6l.
Motive, "The most accurate AI just got better.", Motive Technologies, Inc., Mar. 8, 2023, in 8 pages. URL: https://gomotive.com/blog/fewer-fleet-accidents-with-the-new-ai/.
Motive, "The Motive Driver App: Change current duty status in your driving log." [video], YouTube, Aug. 10, 2022, screenshot in 1 page. URL: https://www.youtube.com/watch?v=m4HPnM8BLBU.
Motive, "The Motive Driver App: Claim and correct unidentified trips." [video], YouTube, Sep. 13, 2022, screenshot in 1 page. URL: https://www.youtube.com/watch?v=z2_kxd3dRac.
Motive, "The Motive Driver App: Connect to the Vehicle Gateway." [video], YouTube, Sep. 13, 2022, screenshot in 1 page. URL: https://www.youtube.com/watch?v=egZmLYDa3kE.
Motive, "The Motive Driver App: Creating fleet vehicle inspection reports." [video], YouTube, Aug. 10, 2022, screenshot in 1 page. URL: https://www.youtube.com/watch?v=u1JI-rZhbdQ.
Motive, "The Motive Driver App: Digitally record hours of service (HOS)." [video], YouTube, Aug. 10, 2022, screenshot in 1 page. URL: https://www.youtube.com/watch?v=gdexlb_zqtE.
Motive, "The Motive Driver App: Insert past duty driving log status." [video], YouTube, Aug. 10, 2022, screenshot in 1 page. URL: https://www.youtube.com/watch?v=TmOipFKPBeY.
Motive, "The Motive Driver App: Switch to DOT inspection mode to share driving logs." [video], YouTube, Aug. 10, 2022, screenshot in 1 page. URL: https://www.youtube.com/watch?v=S2LR1ZUImBU.
Motive, "The Motive Driver App: View hours of service (HOS) violations." [video], YouTube, Aug. 10, 2022, screenshot in 1 page. URL: https://www.youtube.com/watch?v=qJX2ZiBGtV8.
Motive, "U.S. speed limits. What drivers and fleets need to know.", Motive Technologies, Inc., Jan. 13, 2022, in 8 pages. URL: https://gomotive.com/blog/us-speed-limits-for-drivers/.
Motive, "What is an AI dashcam?", Motive Technologies, Inc., Jan. 21, 2022, in 6 pages. URL: https://gomotive.com/blog/what-is-ai-dashcam/.
Motive, "WiFi Hotspot sets you free from restrictive cell phone data plans.", Motive Technologies, Inc., Jun. 27, 2019, in 5 pages. URL: https://gomotive.com/blog/wifi-hotspot/.
Motive, "WiFi Hotspot", Motive Technologies, Inc., accessed on Feb. 18, 2024 [publication date unknown], in 5 pages. URL: https://gomotive.com/products/wifi-hotspot/.

(56) References Cited

OTHER PUBLICATIONS

Multivu.com, "Powerful Technology ER-SV2 Event Recorder", Lytx Inc., 2015, in 2 pages. URL: https://www.multivu.com/players/English/7277351-lytx-activevision-distracted-driving/document/52a97b52-6f94-4b11-b83b-8c7d9cef9026.pdf.
Nauto, "How Fleet Managers and Safety Leaders Use Nauto" [video], YouTube, Jan. 25, 2018, screenshot in 1 page. URL: https://www.youtube.com/watch?v=k_iX7a6j2-E.
Nauto, "The New World of Fleet Safety—Event Keynote" [video], YouTube, Jul. 9, 2020, screenshot in 1 page. URL: https://www.youtube.com/watch?v=iMOab9Ow_CY.
Netradyne Inc., "Netradyne Introduces New DriverStar Feature to Recognize and Reward Safe Driving", PR Newswire, Netradyne, Inc., Oct. 19, 2017, in 2 pages. URL: https://www.prnewswire.com/news-releases/netradyne-introduces-new-driverstar-feature-to-recognize-and-reward-safe-driving-300540267.html.
Netradyne India, "Netradyne Driveri Covered in BBC Click" [video], YouTube, Jan. 25, 2018, screenshot in 1 page. URL: https://www.youtube.com/watch?v=jhULDLj9iek.
Netradyne presentation, Netradyne, Oct. 2016, in 23 pages.
Netradyne, "Driver•i™ Catches No. Stop ad Stop Sign | Fleet Management Technology" [video], YouTube, Oct. 3, 2017, screenshot in 1 page. URL: https://www.youtube.com/watch?v=18sX3X02aJo.
Netradyne, "Driver•i™ Flags Commercial Driver Running Red Light - 360-degree vi" [video], YouTube, Oct. 3, 2017, screenshot in 1 page. URL: https://www.youtube.com/watch?v=au9_ZNGYCmY.
Netradyne, Driver Card 1, 2018, in 2 pages.
Netradyne, Driver Card 2, 2018, in 2 pages.
Ohidan, A., "Fiat and AKQA Launch Eco:Drive™", Science 2.0, Oct. 7, 2008, in 4 pages. URL: https://www.science20.com/newswire/fiat_and_akqa_launch_eco_drive_tm.
Perez, L. et al., "Robot Guidance Using Machine Vision Techniques in Industrial Environments: A Comparative Review", Sensors, Mar. 2016, vol. 16(3), in 27 pages.
Puckett, T. et al. "Safety Track 4B—Driver Risk Management Program", Airports Council International, Jan. 18, 2019, in 29 pages. URL: https://airportscouncil.org/wp- content/uploads/2019/01/4b-DRIVER-RISK-MANAGEMENT-PROGRAM-Tamika-Puckett-Rob-Donahue.pdf.
Ramkumar, S. M. et al., "Chapter 14 Web Based Automated Inspection and Quality Management", in Web-Based Control and Robotics Education, 2009, ed., Spyros G. Tzafestas, Springer, in 42 pages.
Tzafestas, S. G. (ed.), *Web-Based Control and Robotics Education*, 2009, Springer, ISBN 978-90-481-2504-3, in 362 pages. [uploaded in 3 parts].
Samsara Support, "AI Event Detection", Samsara Inc., accessed on Feb. 7, 2024 [publication date unknown]. URL: https://kb.samsara.com/hc/en-us/articles/360043619011-AI-Event-Detection#UUID-4790b62c-6987-9c06-28fe-c2e2a4fbbb0d (filed with 2024-02-08 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Alert Configuration", Samsara Inc., accessed Feb. 7, 2024 [publication date unknown]. URL: https://kb.samsara.com/hc/en-us/articles/217296157-Alert-Configuration (filed with Feb. 8, 2024 ITC Complaint, In the Matter of Certain Vehicle Telematics, Fleet Management, and Video- Based Safety Systems, Devices, and Components thereof, Investigation No. 337-TA-3722), in 5 pages.
Samsara Support, "Alert Triggers", Samsara Inc., accessed Feb. 7, 2024 [publication date unknown]. URL: https://kb.samsara.com/hc/en-us/articles/360043113772-Alert-Triggers (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 6 pages.
Samsara Support, "Automatic Driver Detection (Camera ID)", Samsara Inc., accessed on Feb. 7, 2024 [publication date unknown]. URL: https://kb.samsara.com/hc/en-us/articles/360042878172#UUID-294cf192-f2f6-2c5a-3221-9432288c9b25 (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Dash Cam Recording Logic", Samsara Inc., accessed on Feb. 7, 2024 [publication date unknown]. URL: https://kb.samsara.com/hc/en-us/articles/360011372211-Dash-Cam-Recording-Logic (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Dash Cam Settings Overview", Samsara Inc., accessed on Feb. 7, 2024 [publication date unknown]. URL: https://kb.samsara.com/hc/en-us/articles/360042037572-Dash-Cam-Settings-Overview (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Rolling Stop Detection", Samsara Inc., accessed on Feb. 7, 2024 [publication date unknown]. URL: https://kb.samsara.com/hc/en-us/articles/360029629972-Rolling-Stop-Detection (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara Support, "Safety Score Categories and Calculation", Samsara Inc., [publication date unknown]. URL: https://kb.samsara.com/hc/en-us/articles/360045237852-Safety-Score-Categoriesand-Calculation (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 3 pages.
Samsara Support, "Safety Score Weights and Configuration", Samsara Inc., accessed Feb. 7, 2024 [publication date unknown]. URL: https://kb.samsara.com/hc/en-US/articles/360043160532-Safety-Score-Weights-and-Configuration#UUID-fcb096dd-79d6-69fc-6aa8-5192c665be0a_sectionidm458564145580163323842957870 4 (filed with 2024-02-08 ITC Complaint, In the Matter of Certain Vehicle Telematics, Fleet Management, and Video-Based Safety Systems, Devices, and Components thereof, Investigation No. 337-TA-3722), in 4 pages.
Samsara, "AI Dash Cams", Samsara, Inc., [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 9 pages.
Samsara, "CM31 Dash Camera Datasheet—Internet-Connected Front-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 4 pages.
Samsara, "CM32 Dash Camera—Internet-Connected Dual-Facing HD Camera Module", [publication date unknown] (filed with Feb. 8, 2024 ITC Complaint, In the Matter of Certain Vehicle Telematics, Fleet Management, and Video-Based Safety Systems, Devices, and Components thereof, Investigation No. 337-TA-3722), in 2 pages.
Samsara, "Unpowered Asset Tracker AG45 Datasheet", accessed Feb. 21, 2024 [publication date unknown], in 4 pages. URL: https://www.samsara.com/pdf/docs/AG45_Datasheet.pdf.
Samsara, "Vehicle Gateways—VG34, VG54, VG54H Datasheet", [publication date unknown] (filed with Feb. 8, 2024 ITC Complaint, In the Matter of Certain Vehicle Telematics, Fleet Management, and Video- Based Safety Systems, Devices, and Components thereof, Investigation No. 337-TA-3722), in 8 pages.
Sindhu MV, "How this three-year-old Bengaluru startup is helping make US roads safer with its video analytics solutions", Yourstory.com, Mar. 26, 2018, in 7 pages. URL: https://yourstory.com/2018/03/lightmetrics-road-safety-analytics.
Smart Dash Cam Vezo360!, "Vivek Soni Co-Founder at Arvizon" [video], YouTube, Feb. 21, 2019, screenshot in 1 page. URL: https://www.youtube.com/watch?v=leclwRCb5ZA.

(56) References Cited

OTHER PUBLICATIONS

Song, T et al., "Enhancing GPS with Lane-level Navigation to Facilitate Highway Driving", IEEE Transactions on Vehicular Technology, Jun. 2017 (published on Jan. 30, 2017), vol. 66, No. 6, in 12 pages.

Song, T et al., "Enhancing GPS with Lane-level Navigation to Facilitate Highway Driving", IEEE Transactions on Vehicular Technology, Jun. 2017 (published on Jan. 30, 2017), vol. 66, No. 6, pp. 4579-4591, in 13 p.

Soumik Ukil, " LightMetrics ADAS demo" [video], YouTube, Jul. 20, 2017, screenshot in 1 page. URL: https://www.youtube.com/watch?app=desktop&v=9LGz1007dTw.

Steger, C et al., "Chapter 2 Image Acquisition" and "Chapter 3 Machine Vision Algorithms", in Machine Vision Algorithms and Applications, 2018, 2nd ed., Wiley, in 604 pages.

Steger, C et al., *Machine Vision Algorithms and Applications*, 2018, 2nd ed., Wiley, in 60 pages.

Straight, B. "Over 20 years later, Lytx continues to evolve alongside the industry it serves", FreightWaves, Apr. 16, 2019, in 4 pages. URL: https://www.freightwaves.com/news/technology/the-evolution-of-lytx.

Straight, B., "Netradyne using AI to provide intelligent insight into distracted driving", Netradyne, Inc., Nov. 8, 2017, in 4 pages. URL: https://www.freightwaves.com/news/2017/11/7/netradyne-using-ai-to-provide-intelligent-insight-into-distracted-driving.

Su, C.-C. et al., "Bayesian depth estimation from monocular natural images", Journal of Vision, 2017, vol. 17(5):22, pp. 1-29.

Sung, T.-W. et al., "A Speed Control Scheme of Eco-Driving at Road Intersections", 2015 Third International Conference on Robot, Vision and Signal Processing, 2015, pp. 51-54.

Suppose U Drive, "New Trucking Tech: Forward Facing Cameras" supposeudrive.com, Mar. 15, 2019, in p. 7. URL: https://supposeudrive.com/new-trucking-tech-forward-facing-cameras/.

The Wayback Machine, "AT&T Fleet Complete—Give your Business a competitive advantage", AT&T, 2019, in 12 pages. URL: https://web.archive.org/web/20190406125249/http:/att.fleetcomplete.com/.

The Wayback Machine, "Introducing Driver-I ™", NetraDyne, Sep. 22, 2016, in 4 pages URL: https://web.archive.org/web/20160922034006/http://www.netradyne.com/solutions.html.

The Wayback Machine, "NetraDyne's Driver-I™ platform delivers results beyond legacy safety video systems Counting safe driving as safe driving—taking second-guessing out of commercial fleet driver safety", NetraDyne, Feb. 9, 2018, in 7 pages. URL: https://web.archive.org/web/20180209192736/http:/netradyne.com/solutions/.

Top Fives, "15 BIGGEST Data Centers on Earth" [video], YouTube, Jun. 9, 2024, screenshot in 1 page. URL: https://www.youtube.com/watch?v=1LmFmCVTppo.

Uliyar, M., "LightMetrics' RideView video safety system provides the best ROI", Linkedin, Sep. 8, 2016, in 4 pages URL: https://www.linkedin.com/pulse/lightmetrics-rideview-video-safety-system-provides-best-mithun-uliyar/.

Vezo 360, "World's Smartest Dash Cam Powered by AI" [video], YouTube, Mar. 31, 2019, screenshot in 1 page. URL: https://www.youtube.com/watch?v=M5r5wZozS0E.

Vlahogianni, E et al., "Driving analytics using smartphones: Algorithms, comparisons and challenges", Transportation Research Part C, Jun. 2017, vol. 79, pp. 196-206.

Wahlstrom, J et al., "Smartphone-based Vehicle Telematics—A Ten-Year Anniversary", IEEE Transactions on Intelligent Transportation Systems, Nov. 2016, vol. 18(10), in 23 pages.

Wu, S., "Motivating High-Performing Fleets with Driver Gamification", Samsara, Feb. 2, 2018, in 4 pages. URL: https://www.samsara.com/blog/motivating-high-performing-fleets-with-driver-gamification/.

Yufeng, Z. et al., "3G-Based Specialty Vehicles Real-Time Monitoring System", Applied Mechanics and Materials, Feb. 2014, vols. 513-517, pp. 871-875.

Yufeng, Z. et al., "3G-Based Specialty Vehicles Real-Time Monitoring System", Applied Mechanics and Materials, Feb. 2014, vols. 513-517, pp. 871-875, in 7 pages.

Zanini, M. et al., "Mobile Assets Monitoring for Fleet Maintenance", SAE International, Apr. 11-14, 2005, in 9 pages.

Zanini, M. et al., "Mobile Assets Monitoring for Fleet Maintenance", SAE International, 2005, pp. 369-375, in 8 pages.

Zhong, R. Y. et al., "Intelligent Manufacturing in the Context of Industry 4.0: A Review", Engineering, Oct. 2017, vol. 3, Issue 5, pp. 616-630.

U.S. Appl. No. 18/308,536, Ride Along Location Tracking, filed Apr. 27, 2023.

U.S. Appl. No. 18/468,463, Ride Along Location Tracking, filed Sep. 15, 2023.

U.S. Appl. No. 18/512,497, Ride Along Location Tracking, filed Nov. 17, 2023.

U.S. Appl. No. 17/931,354, Power Optimized Geolocation, filed Sep. 12, 2022.

U.S. Appl. No. 18/308,549, Low Power Geofencing, filed Apr. 27, 2023.

U.S. Appl. No. 18/468,478, Low Power Geofencing, filed Sep. 15, 2023.

U.S. Appl. No. 18/830,325, Connection Throttling in a Low Power Physical Asset Tracking System, filed Sep. 10, 2024.

U.S. Appl. No. 18/753,180, Packet Structure in a Low Power Physical Asset Tracking System, filed Jun. 25, 2024.

U.S. Appl. No. 19/051,058, Low Power Physical Asset Location Determination, filed Feb. 11, 2025.

U.S. Appl. No. 18/753,458, Providing Left-Behind Alerts Based on Real-Time Monitoring of Asset Groups, filed Jun. 25, 2024.

U.S. Appl. No. 18/753,571, Dynamic Geofence Management and Alerting for Asset Movement Monitoring, filed Jun. 25, 2024.

U.S. Appl. No. 18/753,948, Dynamic Asset Mismatch Detection and Notification, filed Jun. 25, 2024.

U.S. Appl. No. 19/203,895, Dynamic Geofence Generation and Adjustment for Asset Tracking and Monitoring, filed May 9, 2025.

U.S. Appl. No. 19/173,719, Encoding and Transmitting Sensor Data in Low Power Broadcasts, filed Apr. 8, 2025.

U.S. Appl. No. 12,150,186, Connection Throttling in a Low Power Physical Asset Tracking System, filed Nov. 19, 2024.

U.S. Appl. No. 12,256,021, Rolling Encryption and Authentication in a Low Power Physical Asset Tracking System, filed Mar. 18, 2025.

U.S. Appl. No. 12,253,617, Low Power Physical Asset Location Determination, filed Mar. 18, 2025.

U.S. Appl. No. 12,328,639, Dynamic Geofence Generation and Adjustment for Asset Tracking and Monitoring, filed Jun. 10, 2025.

\* cited by examiner

```
struct packet
{
2802 → var version;
2804 → var productID;
2806 → var flags;
2808 → var transmitPower;
2810 → var timeSinceConnection;
2812 → var error;
2814 → var firmwareVersion;
2816 → var MAC;
2818 → var temperature;
2820 → var battery;
2822 → var bootCount;
2824 → var securityData;
};
```

FIG. 28

ANONYMIZATION IN A LOW POWER PHYSICAL ASSET TRACKING SYSTEM

TECHNICAL FIELD

Implementations of the present disclosure relate to gateway devices, low power sensors, systems, and methods that allow for physical asset location tracking with improved power efficiency.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Tracking the location of unpowered assets can be important but presents several challenges as trackers often rely on battery power, which limits their ability to determine and report their locations frequently while also maintaining sufficient battery life.

SUMMARY

The systems, methods, and devices described herein each have several aspects, no single one of which is solely responsible for its desirable attributes. Without limiting the scope of this disclosure, several non-limiting features will now be described briefly.

Tracking assets such as equipment, shipping containers, pallets, trailers, and so forth can provide valuable information. For example, tracking can enable users to determine if an asset has been stolen, determine when an asset is moved, and so forth. Tracking can help users locate lost or misplaced items. For example, users may use a tracking system to determine the location of a piece of equipment on a construction site or the location of a package in a shipping facility or warehouse. However, tracking systems may be difficult to deploy in some situations. For example, object tracking devices that are battery powered, such as might be used to track unpowered objects or objects where connections to a power source are limited, may require frequent charging and/or replacement of the battery.

Reliance on batteries can significantly limit the functionality of object tracking devices. An object tracking device may contain GPS, WiFi, and/or cellular hardware that can be used to determine the location of an object and to report the location of the object to a Backend over a cellular network (e.g., an LTE network) and/or non-terrestrial network (e.g., a satellite connection). While this approach can provide location information, its functionality is limited because GPS and cellular operations require significant power and are often associated with additional expense. Thus, users of such an object tracking device choose between long battery life with limited information, or more information at the expense of significantly shorter battery life, which may necessitate frequent recharging or battery replacement. To achieve long battery life, an object tracking device may only determine and report a location periodically, for example once per day, twice per day, and so forth.

Disclosed herein are systems and methods that enable more efficient and frequent location updates regarding an asset through coordinated communications between a Peripheral (e.g., an asset tracking device) associated with an asset, and a less power restricted device (e.g., a vehicle gateway that is configured as a Central) that can at least temporarily communicate with the Peripheral, and that may be powered by the vehicle battery or another asset that can provide power (e.g., a trailer). In various implementations, the asset tracking device (e.g., the Peripheral) includes a low power Bluetooth (BLE) module that advertises (or broadcasts) information associated with the Peripheral, which information may be detected by a Central when the Peripheral is within BLE range of a Central (e.g., a vehicle gateway). The Centrals can receive the information from the Peripheral, and can communicate that information to a Backend, along with location information associated with the Centrals. Accordingly, the Backend can determine an approximate location of the asset via the association between the asset and the Peripheral, and the Peripheral and the Central (e.g., at the point in time at which the Peripheral was in range of the Central).

In various implementations, for example, an asset tracking device that is in a trailer may be in BLE range of a Gateway (e.g., a vehicle gateway) in a cab of the vehicle that is pulling the trailer. When in BLE range, if the asset tracking device includes GPS and/or LTE functionality (e.g., if it is an asset gateway), the GPS and/or LTE communications of the asset tracking device are suppressed (e.g., the asset gateway is configured to operate as a Peripheral) in favor of the vehicle tracking device indicating to a cloud server that the asset tracking device has the same location. This "ride along" technology extends battery life of the asset tracking device while also allowing more frequent location updates via the vehicle gateway, which derives its power from the vehicle and thus can determine and report location information with reduced concern for battery life. In some embodiments, the vehicle gateway and asset tracking device may maintain a continuous connection, while in other embodiments, the vehicle gateway and asset tracking device may connect periodically or may not establish a connection. In some embodiments, the vehicle gateway may operate in central mode (and referred to as a "Central" herein) and the asset tracking device may operate in peripheral mode (and referred to as a "Peripheral" herein), while in other embodiments, the vehicle gateway may operate in peripheral mode and the asset tracking device may operate in central mode. In some embodiments, other communication protocols (e.g., rather than BLE and LTE) may be used.

Various combinations of the above and below recited features, embodiments, and aspects are also disclosed and contemplated by the present disclosure.

Additional implementations of the disclosure are described below in reference to the appended claims and/or clauses, which may serve as an additional summary of the disclosure.

In various implementations, systems and/or computer systems are disclosed that comprise one or more computer readable storage mediums having program instructions embodied therewith, and one or more processors configured to execute the program instructions to cause the systems and/or computer systems to perform operations comprising one or more aspects of the above- and/or below-described implementations (including one or more aspects of the appended claims and/or clauses).

In various implementations, computer-implemented methods are disclosed in which, by one or more processors executing program instructions, one or more aspects of the above- and/or below-described implementations (including one or more aspects of the appended claims and/or clauses) are implemented and/or performed.

In various implementations, computer program products comprising one or more computer readable storage medium are disclosed, wherein the computer readable storage medium(s) has program instructions embodied therewith, the program instructions executable by one or more processors to cause the one or more processors to perform operations comprising one or more aspects of the above- and/or below-described implementations (including one or more aspects of the appended claims and/or clauses).

BRIEF DESCRIPTION OF THE DRAWINGS

The following drawings and the associated descriptions are provided to illustrate embodiments of the present disclosure and do not limit the scope of the claims. Aspects and many of the attendant advantages of this disclosure will become more readily appreciated as the same become better understood by reference to the following detailed description, when taken in conjunction with the accompanying drawings, wherein:

FIG. 28 illustrates an example broadcast packet structure, according to various implementations.

DETAILED DESCRIPTION

Figure 1:
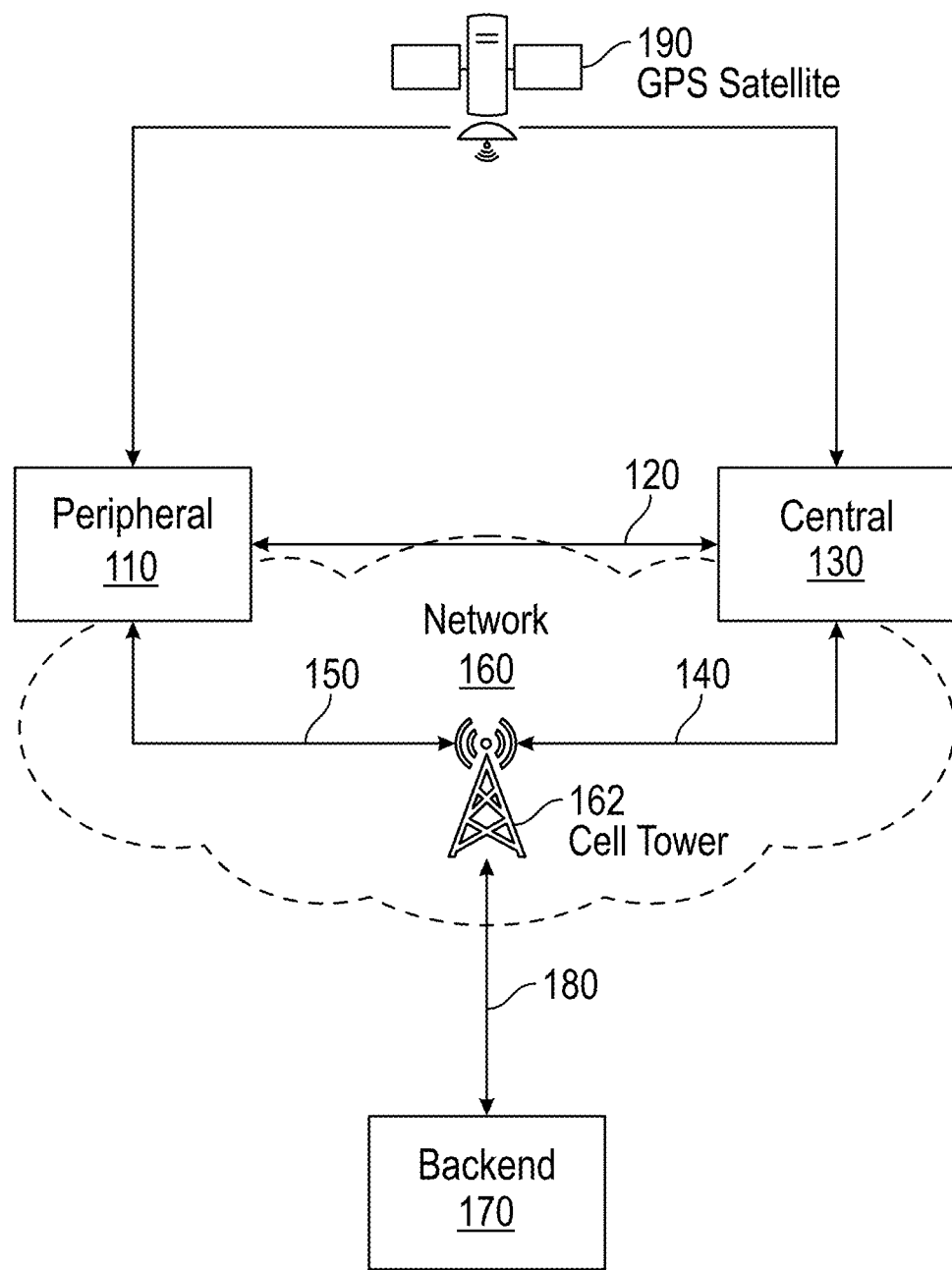
FIG. 1 is an example diagram showing location determination and communication, according to various implementations.

Although certain preferred embodiments and examples are disclosed below, inventive subject matter extends beyond the specifically disclosed embodiments to other alternative embodiments and/or uses and to modifications and equivalents thereof. Thus, the scope of the claims appended hereto is not limited by any of the particular embodiments described below. For example, in any method or process disclosed herein, the acts or operations of the method or process may be performed in any suitable sequence and are not necessarily limited to any particular disclosed sequence. Various operations may be described as multiple discrete operations in turn, in a manner that may be helpful in understanding certain embodiments; however, the order of description should not be construed to imply that these operations are order dependent. Additionally, the structures, systems, and/or devices described herein may be embodied as integrated components or as separate components. For purposes of comparing various embodiments, certain aspects and advantages of these embodiments are described. Not necessarily all such aspects or advantages are achieved by any particular embodiment. Thus, for example, various embodiments may be carried out in a manner that achieves or optimizes one advantage or group of advantages as taught herein without necessarily achieving other aspects or advantages as may also be taught or suggested herein.

To facilitate an understanding of the systems and methods discussed herein, several terms are described below. These terms, as well as other terms used herein, should be construed to include the provided descriptions, the ordinary and customary meanings of the terms, and/or any other implied meaning for the respective terms, wherein such construction is consistent with context of the term. Thus, the descriptions below do not limit the meaning of these terms, but only provide example descriptions.

Backend (also referred to herein as "cloud," "backend server," "backend server system," and/or the like): one or more network-accessible servers configured to communicate with various devices, such as Centrals (including, for example, vehicle gateways, asset gateways, industrial gateways, and/or the like), Sensor Devices, and/or the like. For example, a Backend may be configured to communicate with multiple Gateways (e.g., vehicle gateways, asset gateways, and/or the like) associated with each of a fleet of hundreds, thousands, or more vehicles, assets, and/or the like. Similarly, a Backend may be configured to communicate with multiple Peripherals (e.g., asset tracking devices) attached to and/or corresponding to respective assets, vehicles, and/or the like. Additionally, a Backend may be configured to communicate with multiple Sensor Devices (e.g., data sources, information sources, and/or the like). Such communication between a Backend and Peripherals, and/or a Backend and Sensor Devices, may be provided via one or more Centrals (e.g., Gateways). Thus, the Backend may have context and perspective that individual devices (including Centrals, Peripherals, and Sensor Devices) do not have. With reference to vehicles, for example, the Backend may include data associated with a large quantity of vehicles, such as vehicles across a fleet or within a geographic area, which may be provided via various Centrals, Peripherals, and/or Sensor Devices. Thus, the Backend may perform analysis of vehicle/asset data across multiple vehicles and between groups of vehicles (e.g., comparison of fleets operated by different entities). A Backend may also include a feedback system that periodically updates event models used by Centrals, Peripherals, and/or Sensor Devices to provide immediate in-vehicle alerts, such as when the Backend has optimized an event model based on analysis of asset data associated with many safety events, potentially across multiple fleets of vehicles.

Sensor Device: an electronic device comprising one or more electronic components and configured to and/or capable of providing data and/or information (e.g., sensor data, sensed data, and/or the like). Sensor Devices may be positioned in or on a vehicle and/or asset, and may be configured to communicate with a Backend directly, and/or via a Gateway. A Sensor Device can include one or more sensors, and/or be configured to communicate with one or more sensors, such as one or more video sensors, audio sensors, accelerometers, global positioning systems (GPS), and the like, which may be housed in a single enclosure (e.g., a dashcam, a device housing, and/or the like) or multiple enclosures. A Sensor Device may include a single enclosure that houses multiple sensors as well as communication circuitry configured to transmit sensor data to a Backend and/or Gateway. Alternatively, a Sensor Device may include multiple enclosures that may variously house sensors, circuitry, communications elements, and/or the like. Examples of Sensor Devices include dashcams, which may be mounted on a front window of a vehicle. A Sensor Device (e.g., dashcam) may be configured to acquire various sensor data, such as from one or more cameras, and communicate sensor data to a vehicle gateway, which can include communication circuitry configured to communicate with the Backend. Sensor Devices can also include memory for storing software code that is usable to execute one or more event detection models, such as neural network or other artificial intelligence programming logic, that allow the Sensor Device to trigger events without communication with the Backend. In some implementations, Sensor Devices may be configured as Centrals, which generally indicates that a device is configured to scan or observe broadcasted packets from Peripherals, such as using BLE communications.

Gateway (also referred to herein as "gateway device," "vehicle gateway," "VG," "asset gateway," "AG," and/or the like): an electronic device comprising one or more electronic components and configured to obtain and/or receive data and/or information, and communicate the data and/or information to and/or from a Backend. Gateways can include, for example, vehicle gateways (or "VGs"), which may be Gateways associated with vehicles. Gateways can further include, for example, asset gateways (or "Ags"), which may be Gateways associated with assets (e.g., trailers, containers, equipment, towers, mobile assets, and/or the like (and just to name a few)). Gateways can be positioned in or on vehicles/assets, and can be configured to communicate with one or more Sensor Devices, sensors, Peripherals, and/or the like. Gateways can further be configured to communicate with a Backend. Gateways, (e.g., a vehicle gateway) can be installed within a vehicle by coupling an interface of the vehicle gateway to an on-board diagnostic (OBD) port of the vehicle. Gateways may include short-range communication circuitry, such as near field communication ("NFC"), Bluetooth ("BT"), Bluetooth Low Energy ("BLE"), and/or the like, for communicating with sensors, Sensor Devices, Peripherals, and/or the like (which may, for example, be in a vehicle and/or other devices that are in proximity to the vehicle (e.g., outside of the vehicle)). Gateways can further include GPS receivers for determining a location of the Gateway. Gateways can further include cellular and/or WiFi radios for communicating with a Backend. In some implementations, a cellular and/or WiFi radio may be used to approximate the location of a Gateway. Gateways may be configured as Centrals, which generally indicates that the Gateway is configured to scan, observe, and/or receive broadcasted packets from Peripherals, such as using BLE communications, and provide such Peripheral information to a Backend. Gateways may, in some implementations, be configured to functional as Peripherals, which generally indicates that the Gateway is configured to suppress location determinations via GPS, and communications via LTE and/or WiFi, in favor of simpler communications with a Central via short-range communications (e.g., via BLE), as described herein.

Central: any electronic device, such as a Gateway, Sensor Device, mobile device, and/or the like, and/or functionality, that is configured to detect short-range communications (e.g., BLE advertisements/broadcasts) from Peripherals. As used herein, the term "Central" may refer to the communication functionality of a device (e.g., the BLE communication functionality) or the term "Central" may refer to the device containing the BLE communication functionality. Thus, a Central may refer to a Gateway, Sensor Device, mobile device, and/or any other device that is configured with functionality to scan, observe, and/or receive broadcasted packets from Peripherals. Further, these Centrals (e.g., Gateways of various types) are also configured to communicate with a Backend. Centrals further include functionality for determining a location of the Central (e.g., GPS receiver, cellular radio, WiFi, and/or the like), which location can be communicated, e.g., to a Backend. A location of a Central can also be determined and/or specified by a user (e.g., via user-entered location/GPS pinning) or another system. Such alternative location determination may be useful for indoor/poor GPS signal locations.

Peripheral (also referred to herein as "asset tracking device," "object tracking device," and/or the like): any electronic device configured to be positioned in, on, near, and/or in association with, an asset, vehicle, and/or the like, and which is configured to communicate with Centrals (e.g., Gateways) via short-range communications (e.g., BLE). A Peripheral may include short-range communication circuitry, such as near field communication ("NFC"), Bluetooth ("BT"), Bluetooth Low Energy ("BLE"), and/or the like, for communicating information to Centrals. Typically, a Peripheral is a dedicated, relatively simple electronic device which includes short-range communication circuitry, but not other communications circuitry, such as Wi-Fi or cellular radio. For example, in various implementations, the communications circuitry of a Peripheral may include only BLE-related communications circuitry. In some implementations, and as described herein, a more complicated device, such as a Gateway (e.g., an asset gateway), may function as a Peripheral. For example, an asset gateway may be configurable to operate in a peripheral mode in which location determinations via GPS, and communications via LTE and/or WiFi, are suppressed in favor of simpler communications with a Central via short-range communications (e.g., via BLE). Accordingly, a device, when operating as a Peripheral, will utilize only functionality as if it were a dedicated Peripheral device. As described herein, Peripherals may advantageously require significantly less power to operate (as compared to, for example, a Gateway under normal operations) and may therefore have extended battery life for an equivalent sized battery. In general, a Peripheral communicates a limited amount of information, including an identification of the Peripheral, via advertisements, to Centrals (as further described herein). Advertisements transmitted by Peripherals may also be referred to herein as "Bluetooth advertisements," "Bluetooth broadcasts," "BLE advertisements," "BLE broadcasts," "peripheral communications," "peripheral broadcasting packets," "broadcasted packets," "broadcast packets," "peripheral broadcasts," "broadcasts," and/or the like).

Data Store: Any computer readable storage medium and/or device (or collection of data storage mediums and/or devices). Examples of data stores include, but are not limited to, optical disks (e.g., CD-ROM, DVD-ROM, and/or the like), magnetic disks (e.g., hard disks, floppy disks, and/or the like), memory circuits (e.g., solid state drives, random-access memory (RAM), and/or the like), and/or the like.

Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (e.g., Oracle databases, PostgreSQL databases, and/or the like), non-relational databases (e.g., NoSQL databases, and/or the like), in-memory databases, spreadsheets, comma separated values (CSV) files, Extensible Markup Language (XML) files, text (TXT) files, flat files, spreadsheet files, and/or any other widely used or proprietary format for data storage. Databases are typically stored in one or more data stores. Accordingly, each database referred to herein (e.g., in the description herein and/or the figures of the present application) is to be understood as being stored in one or more data stores. Additionally, although the present disclosure may show or describe data as being stored in combined or separate databases, in various embodiments, such data may be combined and/or separated in any appropriate way into one or more databases, one or more tables of one or more databases, and/or the like. As used herein, a data source may refer to a table in a relational database, for example.

Example Ride Along Features and Functionality

FIG. 1 is an example diagram showing location determination and communication according to some embodiments. A Peripheral 110 and a vehicle gateway 130 (e.g., configured as a Central) are configured to determine location from GPS satellite 190 (which may be a plurality of satellites). The Peripheral 110 and the vehicle gateway 130 can communicate with a Backend 170 over a wireless connection (e.g., wireless connection 140 and/or wireless connection 150) via a network 160, which may include any combination of one or more networks, such as a LAN, WAN, PAN, the Internet, and/or the like. In the example of FIG. 1, the network 160 includes cellular tower 162 and/or other network access points (e.g., a Wi-Fi network) that provide communications with the Backend 170 (e.g., via network connection 180). The Peripheral 110 and the vehicle gateway 130 can be communicatively coupled via a wireless connection 120, which may be, for example, a BLE connection or other connection suitable for lower power communications. The Peripheral 110 and the vehicle gateway 130 may make determinations about location reporting based at least in part on the presence or absence of the wireless connection 120. For example, if the wireless connection 120 is present, the Peripheral may not determine and report its own location, and the vehicle gateway 130 may report its own location as the location of the Peripheral 110. In some embodiments, the vehicle gateway 130 can report a received signal strength indicator ("RSSI") for the wireless connection 120 (e.g., a measurement of the power of the signal received from the Peripheral 110). In some embodiments, the vehicle gateway 130 can report an estimated distance between the vehicle gateway 130 and the Peripheral 110, for example as determined based on the received signal strength indicator. If the wireless connection 120 is not present, then the Peripheral 110 and the vehicle gateway 130 may separately determine and report their own locations independently of one another.

Figure 2:
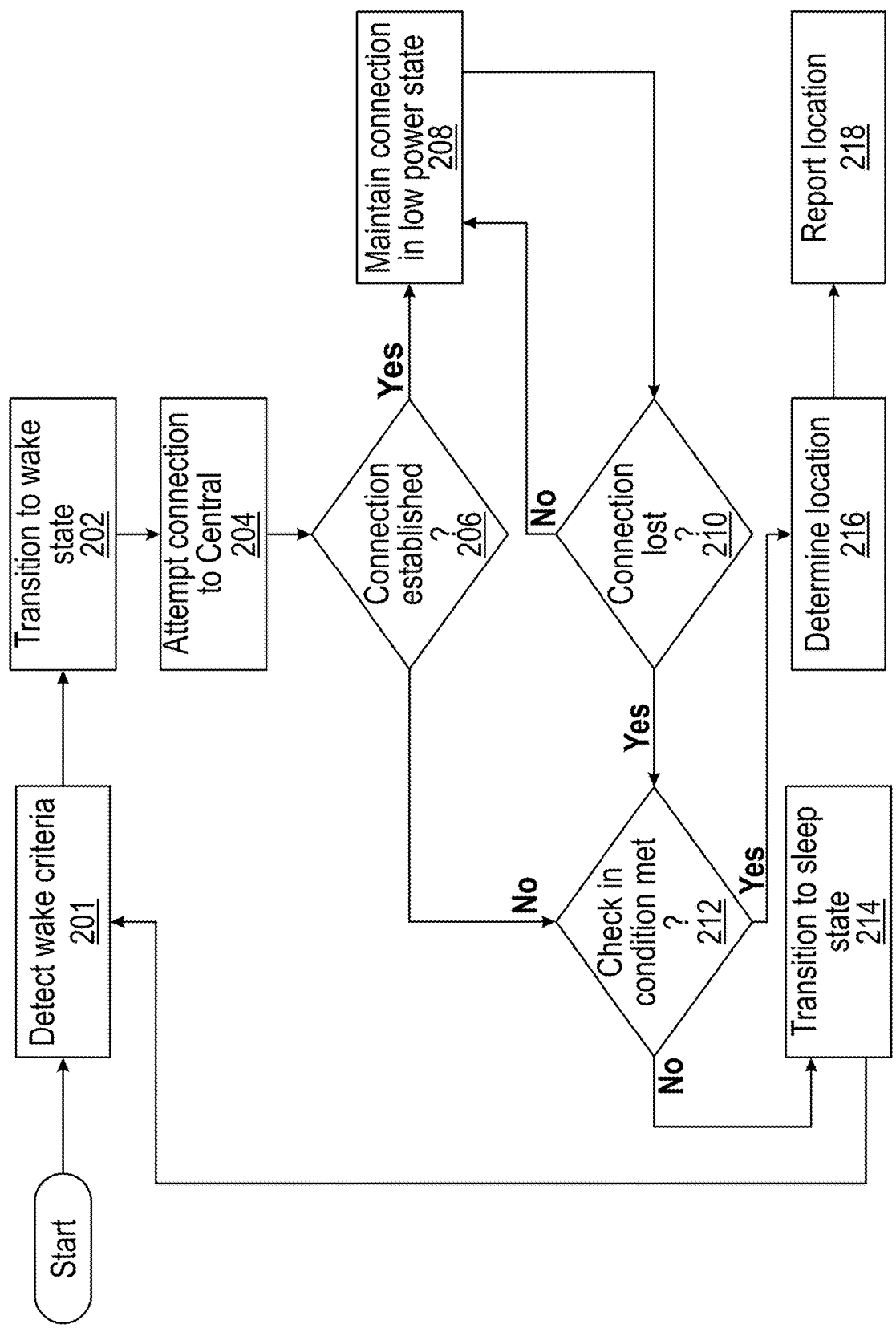
FIG. 2 is a flowchart illustrating an example process for low power location determination which may be executed on a Peripheral, according to various implementations.

FIG. 2 is a flowchart illustrating an example process for low power location determination which may be executed on a Peripheral according to some embodiments. Depending on the embodiment, the process of FIG. 2 may include fewer or additional blocks and/or blocks may be performed in an order different than is illustrated.

In FIG. 2, a Peripheral detects wake criteria at block 201 and transitions from a sleep state to a wake state at block 202. For example, a Peripheral may move to a wake state in response to passage of a predetermined time since last awake, passage of a predetermined time since last determining a location using an on-board GPS receiver, a predetermined value of one or more sensors (e.g., accelerometer, gyroscope, magnetometer, and/or the like) of the Peripheral (e.g., waking in response to motion), and/or detection of a signal from a vehicle gateway.

Next, at block 204, the Peripheral attempts to locate and connect to a vehicle gateway, such as via a low power communication protocol such as Bluetooth Low Energy (BLE). For example, the Peripheral can broadcast a signal indicating its presence, and upon receiving said signal, the vehicle gateway can send a request to connect to the Peripheral. At decision 206, if the Peripheral established a connection to the vehicle gateway, the Peripheral may maintain the connection to the vehicle gateway in a low power state at block 208 and may monitor the connection. Maintaining a connection does not necessarily require continuous communication between devices, but may include periodic (e.g., every minute, five minutes, twenty minutes, hour, six hours, and/or the like) communications between the devices. In some embodiments, maintaining a connection comprises the vehicle gateway transmitting a ping signal to the Peripheral, which requires minimal power for the Peripheral to respond. In some embodiments, maintaining a connection comprises the Peripheral transmitting a ping single to the vehicle gateway and receiving a response. In some embodiments, communication can be one-way, for example from the Peripheral to the vehicle gateway. In some embodiments, communication can include an advertisement/broadcast from the Peripheral. In some embodiments, communication can include a scan response from the vehicle gateway. In some embodiments, when the Peripheral is in a low-power state, battery power may be reserved for maintaining the BLE connection with the vehicle gateway, while eliminating power consumption to all other components of the Peripheral (e.g., GPS receivers, cellular transceivers, Wi-Fi transceivers, and so forth).

If the connection is lost at decision 210, the Peripheral may determine if a check in condition has been met at decision 212. The check in condition may be, for example, a time since last check in to a Backend, a wake reason (e.g., motion), and so forth. If no check in condition has been met, the Peripheral may transition to a sleep state at block 214 and may remain in the sleep state until detecting wake criteria at block 201. If a check in condition has been met, the Peripheral may, at block 216, determine a location of the Peripheral (e.g., using GPS) and at block 218 may transmit the location to a Backend, for example over a cellular connection.

Figure 3:
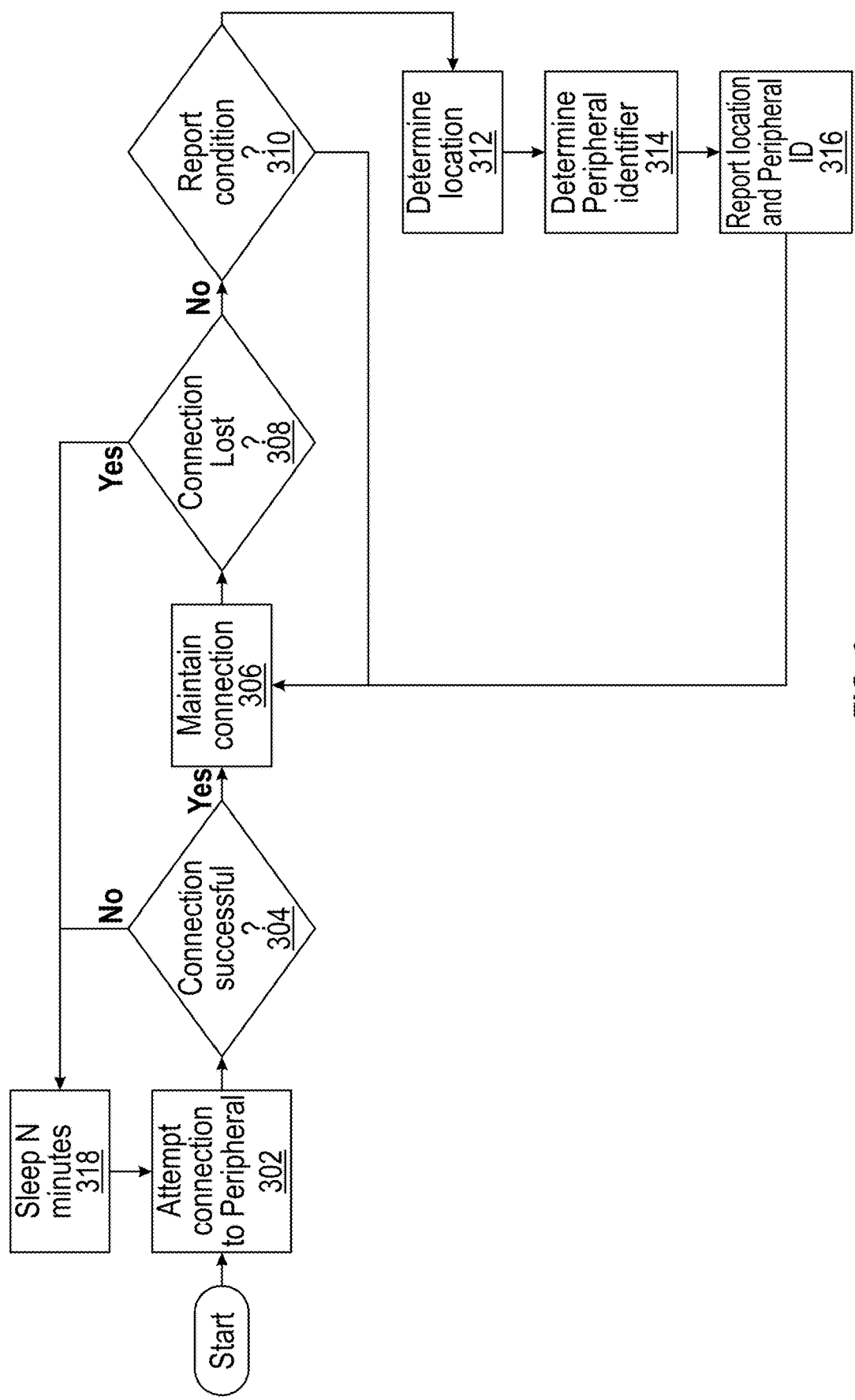
FIG. 3 is a flowchart illustrating an example process for low power location determination which may be executed on a vehicle gateway, according to various implementations.

FIG. 3 is a flowchart illustrating an example process for low power location determination that may be executed on a vehicle gateway according to some embodiments. Depending on the embodiment, the process of FIG. 3 may include fewer or additional blocks and/or the blocks may be performed in an order different than is illustrated.

Beginning at block 302, the vehicle gateway may attempt to connect to a Peripheral. At decision 304, if the connection was not successful, the vehicle gateway may, at block 318, wait for a threshold period of time before attempting to connect again. If the connection was successful, the vehicle gateway may at block 306 maintain the connection (e.g., through periodic communications with the Peripheral). At decision 308, if the connection is lost (e.g., a response from the Peripheral is not received in response to a periodic ping), the vehicle gateway may, at block 318, wait for a threshold period of time before attempting to reconnect. The wait time may vary depending on, for example, whether the vehicle gateway was unable to connect at all or was able to connect but lost the connection to the Peripheral. If the connection to the Peripheral has not been lost, at block 310, the vehicle gateway may determine if a vehicle gateway location reporting status indicates a reporting condition has been met, such as motion (e.g., the vehicle gateway is currently moving, such as based on accelerometer data, gyroscope data, and/or magnetometer data). In some embodiments, the vehicle gateway may be configured to report the Peripheral location continuously or any time the vehicle gateway would otherwise be sending its location to a cloud server (e.g., the Backend of FIG. 1). In some embodiments, a report condition is triggered at a predefined time period since the last self-reported location from the Peripheral was transmitted to the cloud (e.g., block 316). If a report condition has been met, the vehicle gateway may, at block 312, determine its location (e.g., geolocation using GPS) and, at block 314 determine a Peripheral identifier associated with the Peripheral. The vehicle gateway may, at block 316, report the determined location of the vehicle gateway along with the Peripheral identifier to the Backend, thereby allowing the Backend to use the vehicle gateway's location as a proxy for location of the Peripheral, without the Peripheral itself having to consume power to determine and transmit (e.g., via cellular communication) its own location.

Figure 4:
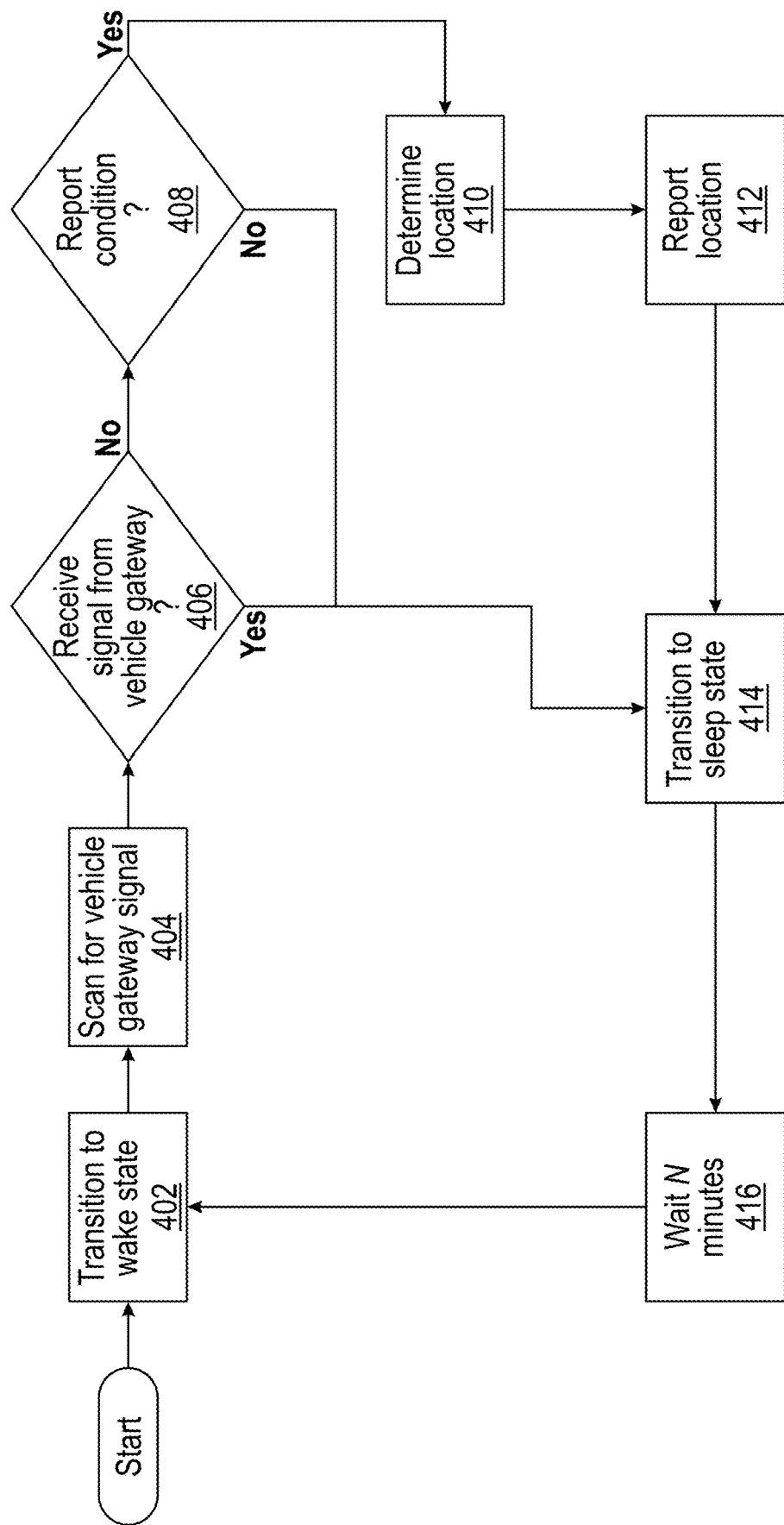
FIG. 4 is a flowchart illustrating another example process for low power location determination that may be executed on a Peripheral according to various implementations.

FIG. 4 is a flowchart illustrating another example process for low power location determination that may be executed on a Peripheral according to some embodiments. Depending on the embodiment, the process of FIG. 4 may include fewer or additional blocks and/or the blocks may be performed in an order different than is illustrated.

Beginning at block 402, the Peripheral may transition to a wake state. At block 404, the Peripheral may scan for a vehicle gateway signal. At decision 406, if the Peripheral received a signal from the vehicle gateway, the Peripheral may, at block 414, transition to a sleep state and may, at block 416, remain in the sleep state for a threshold period of time or until a condition triggers scanning for a vehicle gateway signal. In some embodiments, the Peripheral and vehicle gateway may not connect to one another. For example, the detection can be based on the presence of a signal from the vehicle gateway and does not require two-way communication between the Peripheral and the vehicle gateway. If, at decision 406, the Peripheral did not detect a vehicle gateway, the Peripheral may, at decision 408, determine if a reporting condition has been met. If a reporting condition has not been met, the Peripheral may transition to a sleep state at block 414 and may remain in the sleep state for a threshold period of time at block 416. If a reporting condition has been met, the Peripheral may, at block 410, determine its location (e.g., using GPS) and at block 412 may report its location to a cloud server (e.g., the Backend of FIG. 1) over a network connection (e.g., over a cellular connection) and at block 414, may transition to a sleep state and may remain, at block 416, in the sleep state for a predetermined threshold period of time.

Figure 5A:
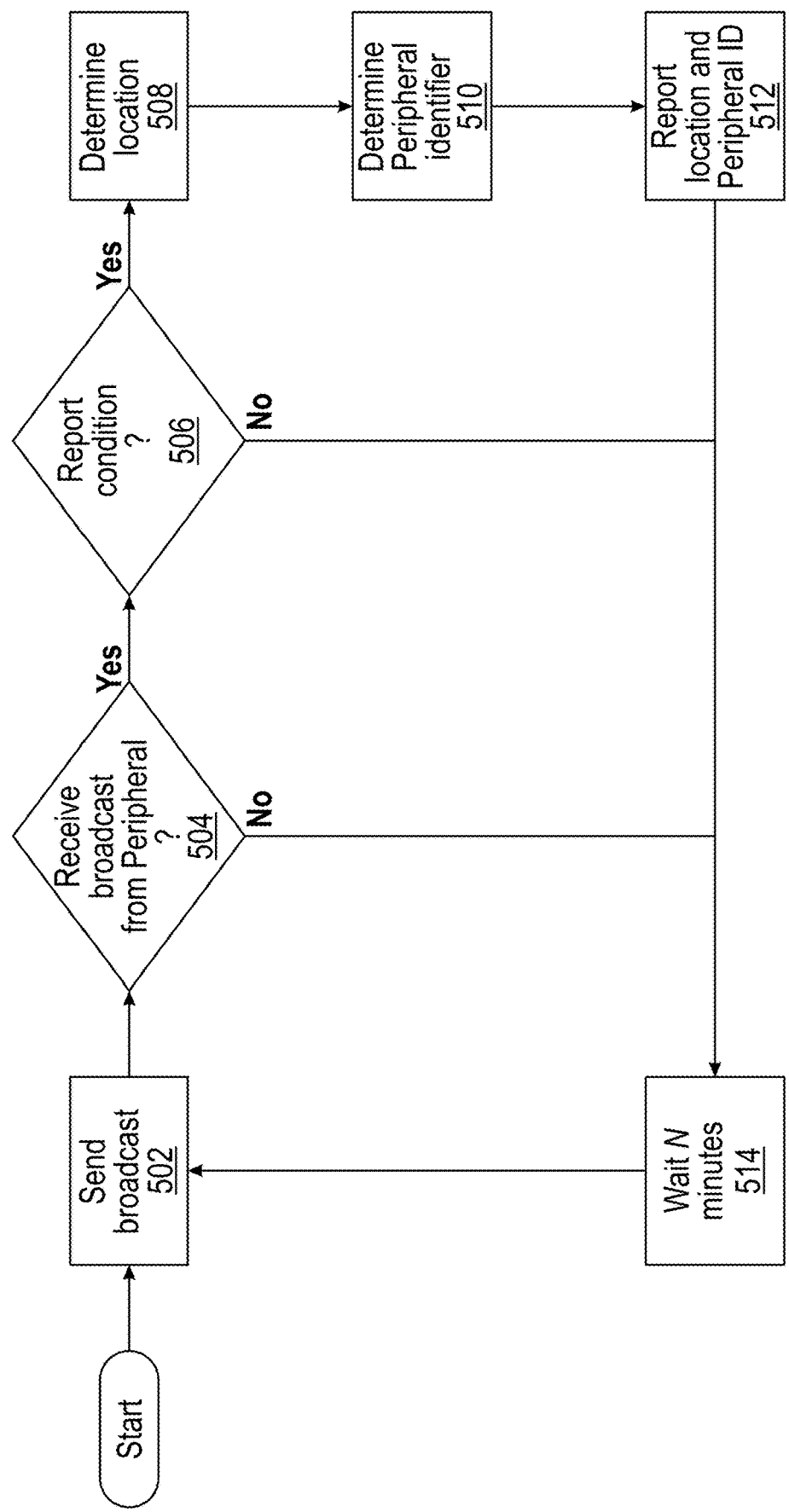
FIG. 5A is a flowchart illustrating another example process for low power location determination that may be executed on a vehicle gateway, according to various implementations.

FIG. 5A is a flowchart illustrating another example process for low power location determination that may be executed on a vehicle gateway (or other Central), and/or a Peripheral, according to various embodiments. Depending on the embodiment, the process of FIG. 5A, the vehicle gateway may operate over BLE in peripheral mode, although other configurations are possible, for example the vehicle gateway may operate in central mode and an asset gateway (or other Peripheral) may operate in peripheral mode.

Beginning at block 502, the vehicle gateway may send or broadcast an advertisement/broadcast (e.g., a packet of data). At decision 504, the vehicle gateway may determine if it has received information from a Peripheral (e.g., an asset gateway operating in peripheral mode). If the vehicle gateway has not received information from the Peripheral, the vehicle gateway may, at block 514, wait for a threshold period of time before trying again. Alternatively, the Peripheral may wait a threshold period of time before again broadcasting. If the vehicle gateway has received information from a Peripheral, the vehicle gateway may, at block 506, determine if a reporting condition has been met. If a reporting condition has not been met, the vehicle gateway may, at block 514, wait for a threshold period of time. If a reporting condition has been met, the vehicle gateway may determine a location and a Peripheral identifier at blocks 508 and 510, and may report the location and the Peripheral identifier to a cloud server (e.g., the Backend of FIG. 1) over a network connection (e.g., over a cellular connection, satellite connection, or Wi-Fi connection) at block 512.

Figure 5B:
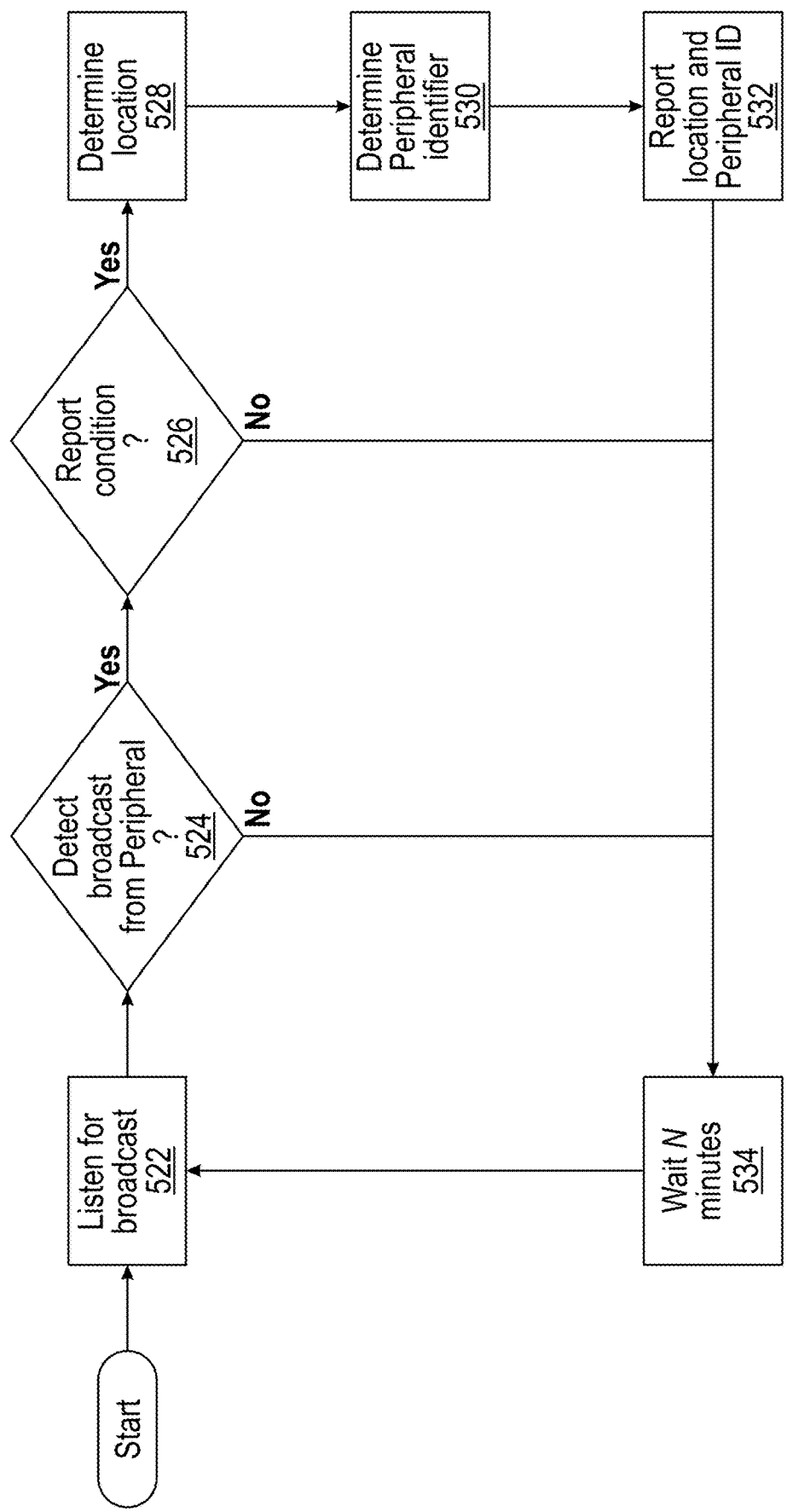
FIG. 5B is a flowchart illustrating another example process for low power location determination that may be executed on a vehicle gateway, according to various implementations.

FIG. 5B is a flowchart illustrating another example process for low power location determination according to some embodiments. Unlike the process depicted in FIG. 5A, in FIG. 5B the Peripheral can operate in peripheral mode and the vehicle gateway can operate in central mode. It will be appreciated that in some embodiments, Peripherals and vehicle gateways can be configured to operate in either peripheral or central mode. For example, in some embodiments, users may configure a Peripheral or vehicle gateway to operate in either mode.

Beginning at block 522, the vehicle gateway can listen for an advertisement/broadcast from the Peripheral (e.g., an asset gateway in peripheral mode, and/or another Peripheral). At decision 524, the vehicle gateway determine if it has received a broadcast from the Peripheral. If the vehicle gateway has not received a broadcast from the Peripheral, the vehicle gateway can, at block 534, wait for a threshold period of time before listening for a broadcast again. In some embodiments, the vehicle gateway may continuously listen for a broadcast from the Peripheral. That is, block 534 can be skipped in some embodiments, and the process can proceed directly from decision 524 to block 522 if a broadcast is not detected by the vehicle gateway. As mentioned above, in various implementations, the Peripheral may wait a threshold period of time before again broadcasting. If the vehicle gateway has detected a broadcast from the Peripheral, then at decision 526, the vehicle gateway can determine if a report condition is met. If a reporting condition has not been met, the vehicle gateway can wait for a threshold period of time at block 534 and then proceed to block 522. If a reporting conditioning has been met, the vehicle gateway can, at block 528, determine a location of the vehicle gateway, for example using GPS, nearby Wi-Fi access points, nearby cellular towers, and so forth. At block 530, the vehicle gateway can determine an identifier of the Peripheral, for example based on the broadcast received from the Peripheral. At block 532, the vehicle gateway can report the location and identifier of the Peripheral to a cloud server (e.g., the Backend of FIG. 1) over a network connection (e.g., over a cellular, satellite, or Wi-Fi connection).

Figure 6:
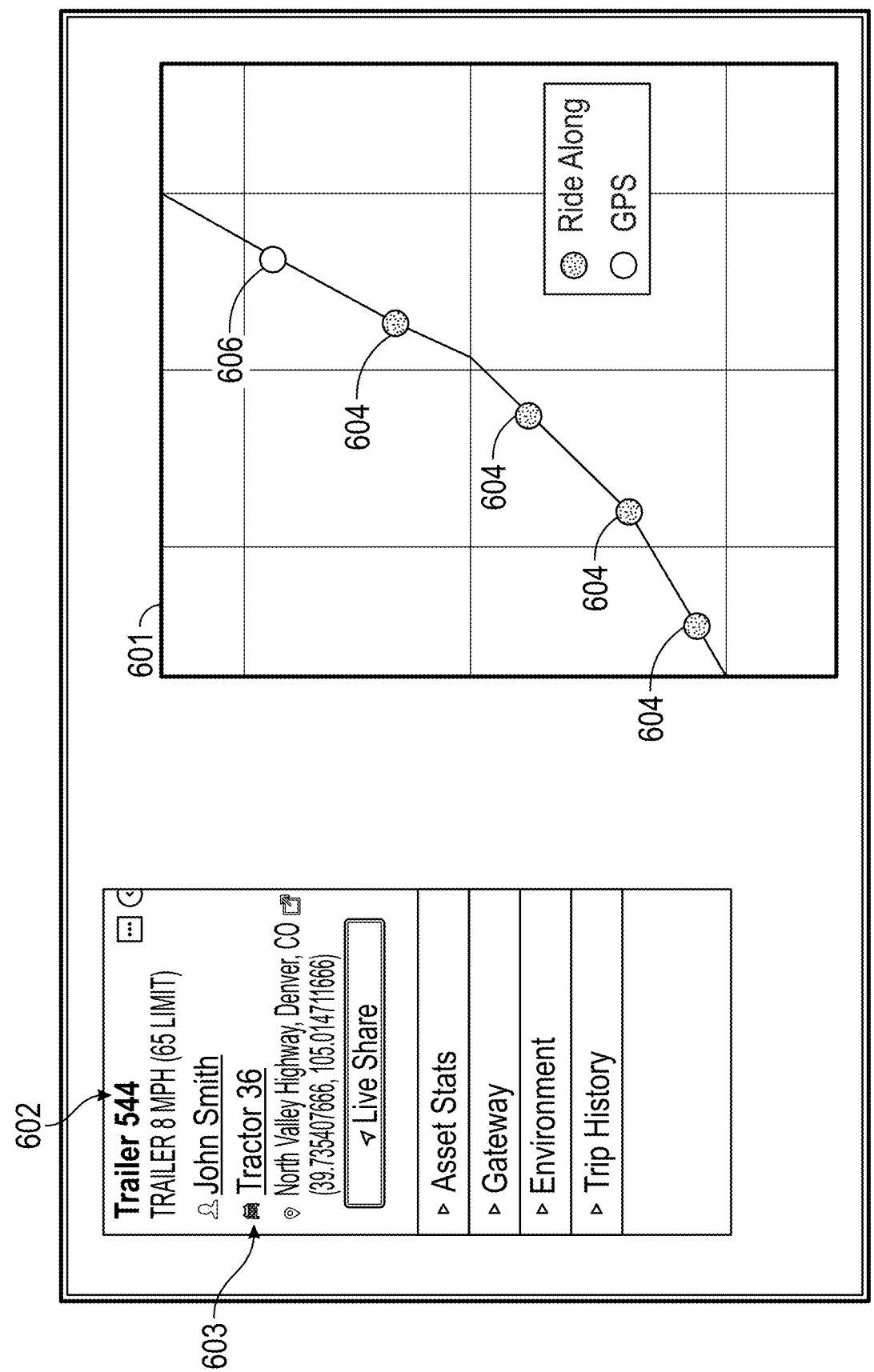
FIG. 6 is an example user interface for tracking asset locations, according to various implementations.

FIG. 6 is an example user interface for tracking asset locations according to some embodiments. For example, the user interface may be provided to a fleet administrator, project manager, manager, and/or the like, having an interest in tracking location of assets with associated Peripherals. For example, user interface may be provided on a user device (e.g., mobile phone, tablet, laptop, desktop, and/or the like) via network communications connection to the Backend 170.

In the example of FIG. 6, the user interface provides location tracking information for a single asset (e.g., a trailer), but multiple asset locations may be included in the user interface. The user interface may include a map 601 that depicts that location history of the asset. The map may provide an indication of how the location was determined (e.g., using the Peripheral's on-board GPS (if present) or using ride along mode (e.g., location of a vehicle gateway that is moving in conjunction with the Peripheral)). For example. The user interface in FIG. 6 shows that Peripheral locations 604 are based on ride along locations of a vehicle gateway, while location 606 is based on a GPS location determined by the Peripheral itself.

In the example of FIG. 6, the user interface includes an asset identifier 602 and an identifier of the current vehicle gateway 603. In some embodiments, the user interface may include additional information. For example, the user interface may include a table that shows which vehicle gateway the Peripheral was connected to at different times/locations. Hovering over a point on the map may provide more information, such as timestamps, vehicle gateway ID, and so forth.

In the above description, ride along location tracking does not necessarily associate the Peripheral and the vehicle gateway with each other. In some cases, a Peripheral and vehicle gateway may be unable to maintain a connection, broadcast advertisements/broadcasts, receive advertisements/broadcasts, and/or the like. For example, radio frequency interference may prevent connection, a battery of a Peripheral may need to be replaced or recharged, and so forth. In some embodiments, a Backend can be configured to enable association of a Peripheral and a vehicle gateway. For example, a vehicle gateway can be disposed in or on a tractor and a Peripheral can be disposed in or on a trailer, in or on an asset inside a trailer, and so forth. The trailer may be coupled to the tractor. In some embodiments, location data reported by the vehicle gateway may be used as the location of the associated Peripheral even if a connection between the vehicle gateway and Peripheral cannot be established. In some embodiments, a Backend may be configured to limit the time such tracking may be enabled. In some embodiments, a user may be able to configure a time limit for such tracking. In some embodiments, other conditions may additionally or alternatively be used to determine if the location of the vehicle gateway should be used as the location of the associated Peripheral. For example, a limit can be based on a distance traveled, which may, in some embodiments, be configurable by a user (e.g., a longer distance may be permitted for long haul highway trips, while shorter distances may be permitted for local deliveries, job sites, and/or the like) Imposing conditions on the association can be significant for several reasons. For example, while a connection may be lost temporarily because of a lack of power, interference, and/or the like, a connection may also be lost because an asset has been lost or stolen or is otherwise no longer co-located with the vehicle gateway.

Figure 7:
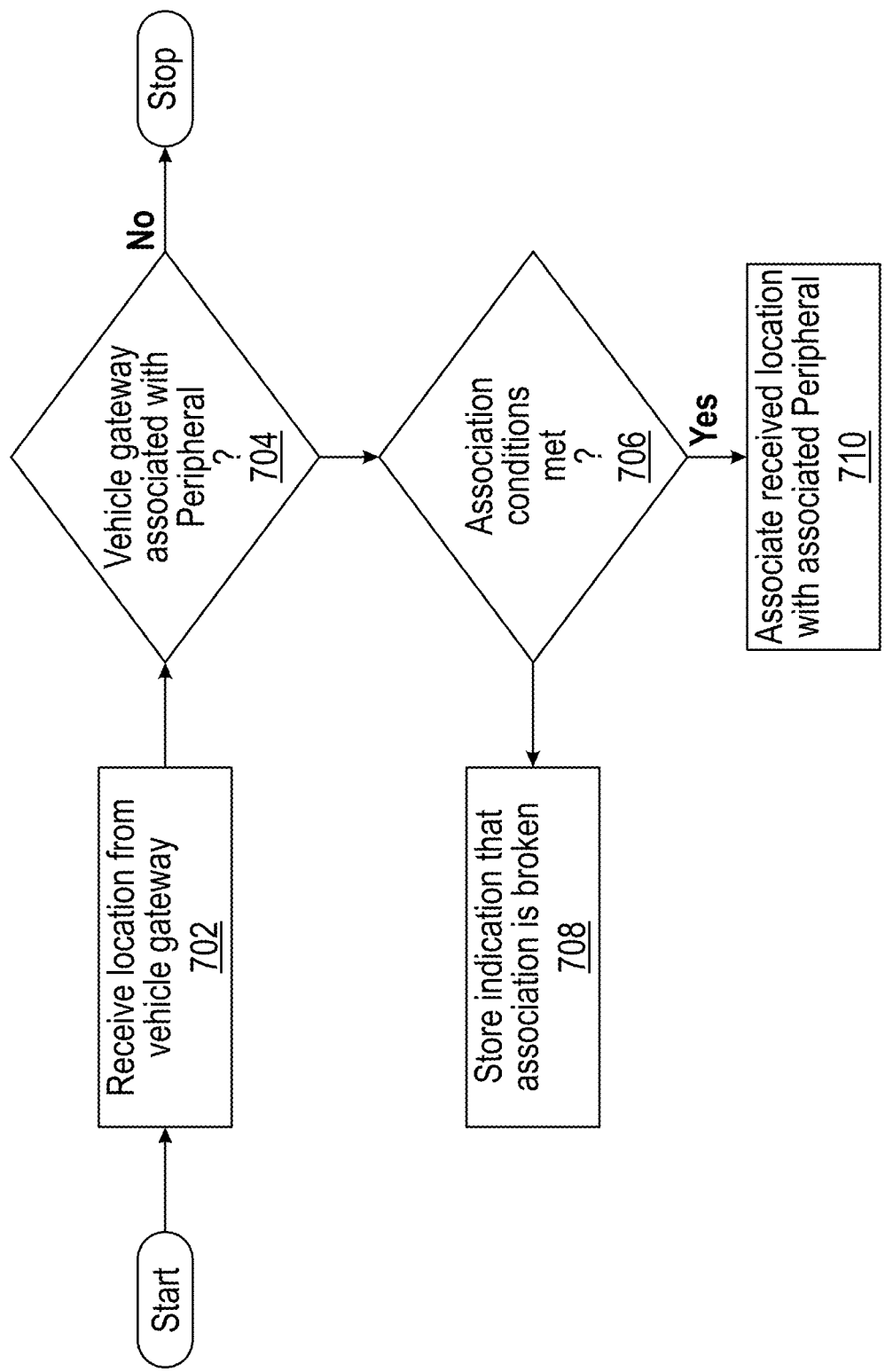
FIG. 7 illustrates an example of a process that can be executed on a Backend, according to various implementations.

FIG. 7 illustrates an example of a process of detecting Peripheral locations based on an association with a vehicle gateway. The process of FIG. 7 may be executed on a Backend according to some embodiments. Depending on the embodiment, the method of FIG. 7 may include fewer or additional blocks and the blocks may be performed in an order that is different than illustrated.

In FIG. 7, at block 702, the Backend can receive location information from a vehicle gateway. At decision point 704, the Backend can determine if the vehicle gateway is associated with a Peripheral (e.g., an asset gateway in peripheral mode, and/or another Peripheral), for example by querying a database. If not, the process can stop. At decision point 706, the Backend can determine if one or more association conditions (e.g., time, distance, and/or the like) are met. If not, at block 708 the Backend can store an indication that the association between the Peripheral and the vehicle gateway is broken. The indication may be used to, for example, alert a user that the association is broken. If the association conditions are met, at block 710 the Backend can associate the received location of the vehicle gateway with the associated Peripheral.

The preceding discussion focuses on embodiments in which a Peripheral is in communication with a Central (e.g., a vehicle gateway). In some embodiments, a Peripheral can be in communication with multiple Centrals or other devices that can be used to report the location of the Peripheral. In some embodiments, a Peripheral can be in communication with one or more other Peripherals. In some embodiments, a smartphone or other device can be a gateway. In some embodiments, a smartphone can be associated with a particular driver.

Associating a Peripheral and a smartphone (or other device that is commonly carried by the user, such as a security tag) can have several advantages. For example, it can be possible to know which individual is associated with assets (e.g., tools, equipment, cargo, and/or the like) on a particular day. The associated individual may change from day to day. For example, a particular individual may have the day off, may only complete a portion of a trip, and/or the like. In some embodiments, a smartphone app, web site, or the like may be used to aid the associated individual in ensuring that all assets are accounted for. For example, a driver taking equipment, cargo, and/or the like, to another location may check that they have loaded all the expected assets before departing a warehouse or other location. In some embodiments, a driver or other individual may ensure that all assets have been reloaded onto a truck at the end of the day.

Figure 8:
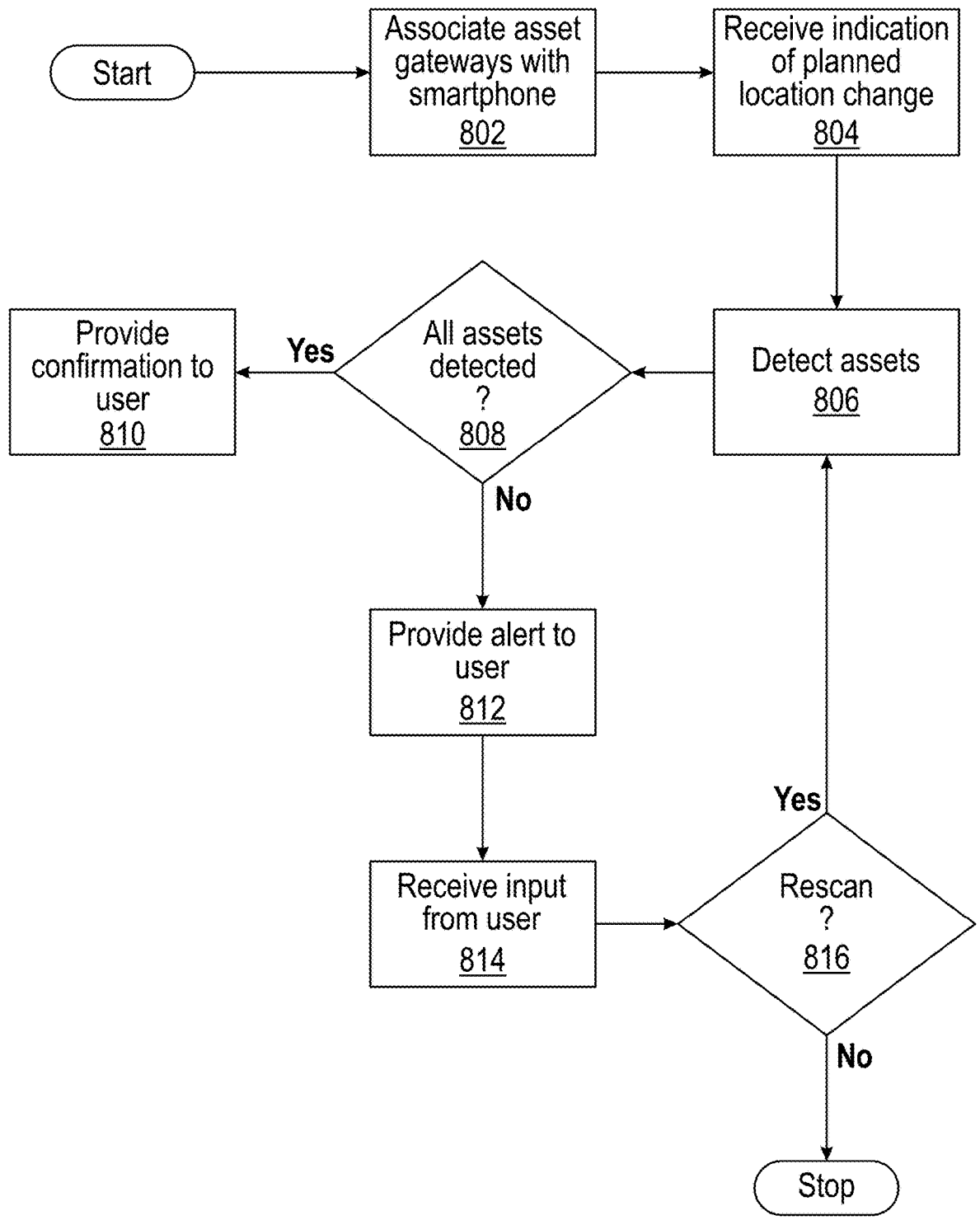
FIG. 8 is a flowchart illustrating an example process, according to various implementations.

FIG. 8 is a flowchart that illustrates an example process of associating a Peripheral with an electronic device of a user. The process depicted in FIG. 8 can be carried out on a Backend and/or on a smartphone or other electronic device. Depending on the embodiment, the method of FIG. 8 may include fewer or additional blocks and the blocks may be performed in an order that is different than illustrated.

Beginning at block 802, Peripherals can be associated with a smartphone (or other suitable device). For example, a user may access an app or web site to associate Peripherals with the smartphone. At block 804, the Backend or app can receive an indication of a planned location change. For example, a user may access an app or web site and indicate that they are preparing to leave a location. Alternatively or additionally, a user may not provide such an indication, and the web site or app may instead provide an interface indicating which Peripherals have been detected and which are unaccounted for. At block 806, the smartphone or other device may detect nearby assets. At decision point 808, the Backend and/or the smartphone or other device may determine if all associated assets have been detected. If so, at block 810, an indication that all assets have been detected may be provided to a user. For example, a web site or app may show a notification or otherwise inform a user that all assets have been detected. If not all assets have been detected, the app or web site may provide an indication to the user that one or more assets are missing at block 812. At block 814, the user may provide input. For example, the user may indicate that one or more assets have been lost, damaged, stolen, that a Peripheral is inoperable (e.g., due to a lack of power), and so forth. At decision point 816, the user may provide an indication (e.g., via an app or web site) to rescan for Peripherals. If the user requests a rescan, the process can proceed to block 806 and detect nearby Peripherals again. If the user elects not to rescan, the process can stop.

In some cases, a Peripheral may communicate only with other devices that are associated with the same organization. For example, a trucking company may have a number of vehicle gateways, Peripherals, and/or the like, and the gateways may communicate with one another but may not communicate with vehicle gateways, Peripherals, and/or the like, associated with different companies or organizations.

In some cases, it can be advantageous for a gateway to communicate with gateways associated with other organizations. For example, a construction company may use Peripherals to track equipment at a job site. While the equipment is at the job site, the Peripherals may communicate with other gateways such as vehicle gateways, smartphones, and/or other gateways associated with the construction company. However, if the equipment is lost or stolen, it may be relocated to a location where the construction company does not have other infrastructure. Depending on the Peripheral, the construction company may have limited or no tracking capability. For example, if the Peripheral has on-board GPS, cellular, Wi-Fi, and/or the like, if the needed communication infrastructure is within rage of the Peripheral (e.g., a Wi-Fi hotspot is within range of a gateway with a Wi-Fi radio), the Peripheral may report its location on an intermittent basis, for example once per day, twice per day, three times per day, four times per day, and/or the like. In some cases, a Peripheral may lack a cellular radio, Wi-Fi radio, or both. In such cases, the Peripheral may not be able to report its location or may only be able to report its location on an intermittent or sporadic basis. For example, if a Peripheral has a Wi-Fi radio but not a cellular radio, the Peripheral may only be able to report its location when in range of a known Wi-Fi access point and/or when near an open Wi-Fi access point. Even if the Peripheral has a cellular radio, it may still be preferable to rely on other communications interfaces (e.g., Bluetooth, BLE) for location reporting in order to reduce power consumption by an on-board GPS receiver, cellular radio, and/or the like. Thus, it can be beneficial to carry out low power location determination as described herein even when a Peripheral is not located near another gateway associated with the same organization as the Peripheral.

In some cases, an organization may wish to allow its gateways or other infrastructure to be used to report location information for gateways that are not associated with the organization. In some cases, an organization may not want to allow its gateways or other infrastructure to be used for location reporting for gateways outside the organization. In some embodiments, organizations may opt in to sharing location data with other organizations. In some embodiments, organizations may be opted in by default and may opt out of sharing location data with other organizations. In some embodiments, organizations may be able to select or exclude sharing with particular other organizations, types of organizations, uses of the location data, and/or other criteria.

For example, a company may wish to allow sharing with emergency services, with companies in other industries, and/or the like, but may not wish to allow sharing with competitors (e.g., specifically named competitors and/or based on types of business that are considered competitors).

Figure 9A:
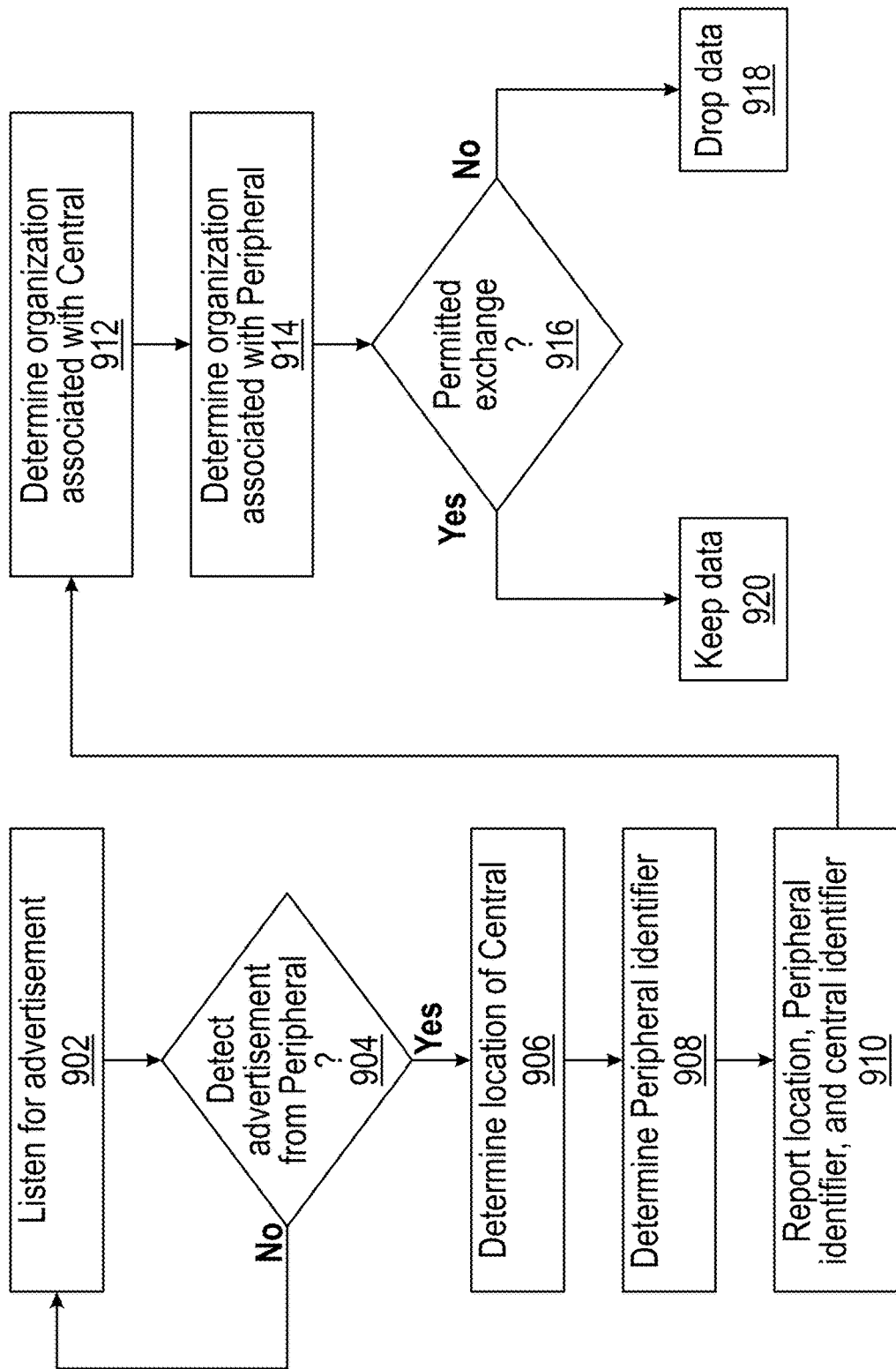
FIG. 9A is a flowchart illustrating an example process for low power location determination, according to various implementations.

FIG. 9A is a flowchart illustrating an example process for low power location determination that may be executed on a Central and/or Backend according to some embodiments. As noted herein, a Central may refer to any device (e.g., an asset gateway, vehicle gateway, smartphone, or other device) that can communicate with a Peripheral, such as a Peripheral whose location is to be determined, and that can report location information and/or other information to a Backend. Depending on the embodiment, the method of FIG. 9A may include fewer or additional blocks and the blocks may be performed in an order that is different than illustrated.

In FIG. 9A, a Central is configured to operate in central mode and a Peripheral is configured to operate in peripheral mode. At block 902, the Central may listen for a broadcast from the Peripheral. At decision point 904, if the Central does not detect a broadcast from the Peripheral, the Central can continue listening for a broadcast. If the Central detects a broadcast from a Peripheral, at block 906, the Central can determine the location of the Central. At block 908, the Central can determine a Peripheral identifier, which can be a unique identifier of the Peripheral. At block 910, the Central can report the location of the Central, the Peripheral identifier, and a Central identifier that can be a unique identifier of the Central to a Backend.

At block 912, the Backend can determine an organization associated with the Central, for example based on the Central identifier. At block 914, the Backend can determine an organization associated with the Peripheral, for example based on the Peripheral identifier. At decision point 916, the Backend can determine if sharing of location data is permitted between the organization associated with the Central and the organization associated with the Peripheral. If sharing is not permitted, the Backend can drop the data at block 918. If sharing is permitted, the Backend can retain the data at block 920.

In some implementations, the criteria for sharing location information are not linked to organizations, or are not entirely linked to organizations. For example, a gateway may be assigned sharing privileges (and/or restrictions) that are accessed to determine if location of the gateway may be shared with other gateways. Thus, the discussion herein of sharing rights associated with organizations, such as in blocks 912-914 of FIG. 9A are equally implementable with sharing privileges assigned to gateways based on other factors (e.g., other than just an associated organization).

Figure 9B:
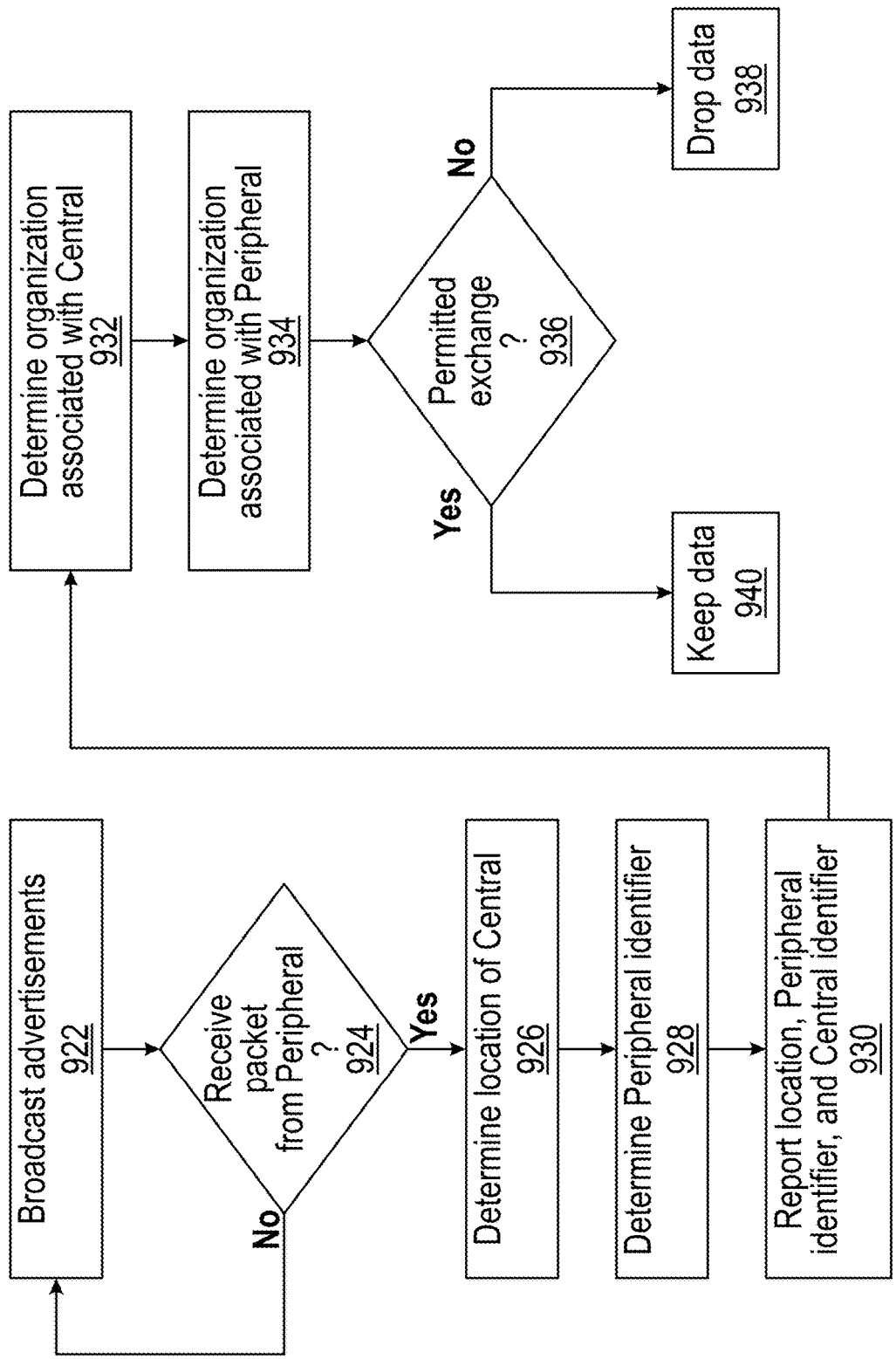
FIG. 9B is a flowchart illustrating another example process for low power location determination, according to various implementations.

FIG. 9B is a flowchart illustrating another example process for low power location determination that may be executed on a Central and a Backend according to some embodiments. The process illustrated in FIG. 9B is generally similar to the process depicted in FIG. 9A, except that the Central operates in peripheral mode and Peripheral operates in central mode. Depending on the embodiment, the method of FIG. 9B may include fewer or additional blocks and the blocks may be performed in an order that is different than illustrated.

At block 922, the Central can send or broadcast advertisements/broadcasts. At decision point 924, if the Central receives a broadcast from a Peripheral, the process can proceed. If not, the Central can continue broadcasting broadcasts. In some embodiments, the Central may transmit broadcasts continuously. In some embodiments, the Central may transmit broadcasts periodically, for example every minute, five minutes, fifteen minutes, thirty minutes, one hour, and/or the like. In some embodiments, the Central may transmit broadcasts based at least in part on a change in the location of the Central. For example, if the Central is a vehicle gateway or other moving gateway, the Central may be configured to transmit broadcasts in response to moving a certain distance.

At block 926, the Central can determine the location of the Central. At block 928, the Central can determine a Peripheral identifier. At block 930, the Central can report the location, Peripheral identifier, and Central identifier to a Backend. At block 932, the Backend can determine an organization associated with the Central. At block 934, the Backend can determine an organization associated with the Peripheral. At decision point 936, the Backend can determine if data sharing is permitted between the organization associated with the Central and the organization associated with the Peripheral. If not, the data can be dropped at block 938. If so, the data can be retained at block 940.

In the processes illustrated in FIGS. 9A and 9B, a Backend may receive data and subsequently determine whether to retain or drop the data. In some embodiments, data may not be uploaded to the Backend if exchanges are not permitted.

Figure 9C:
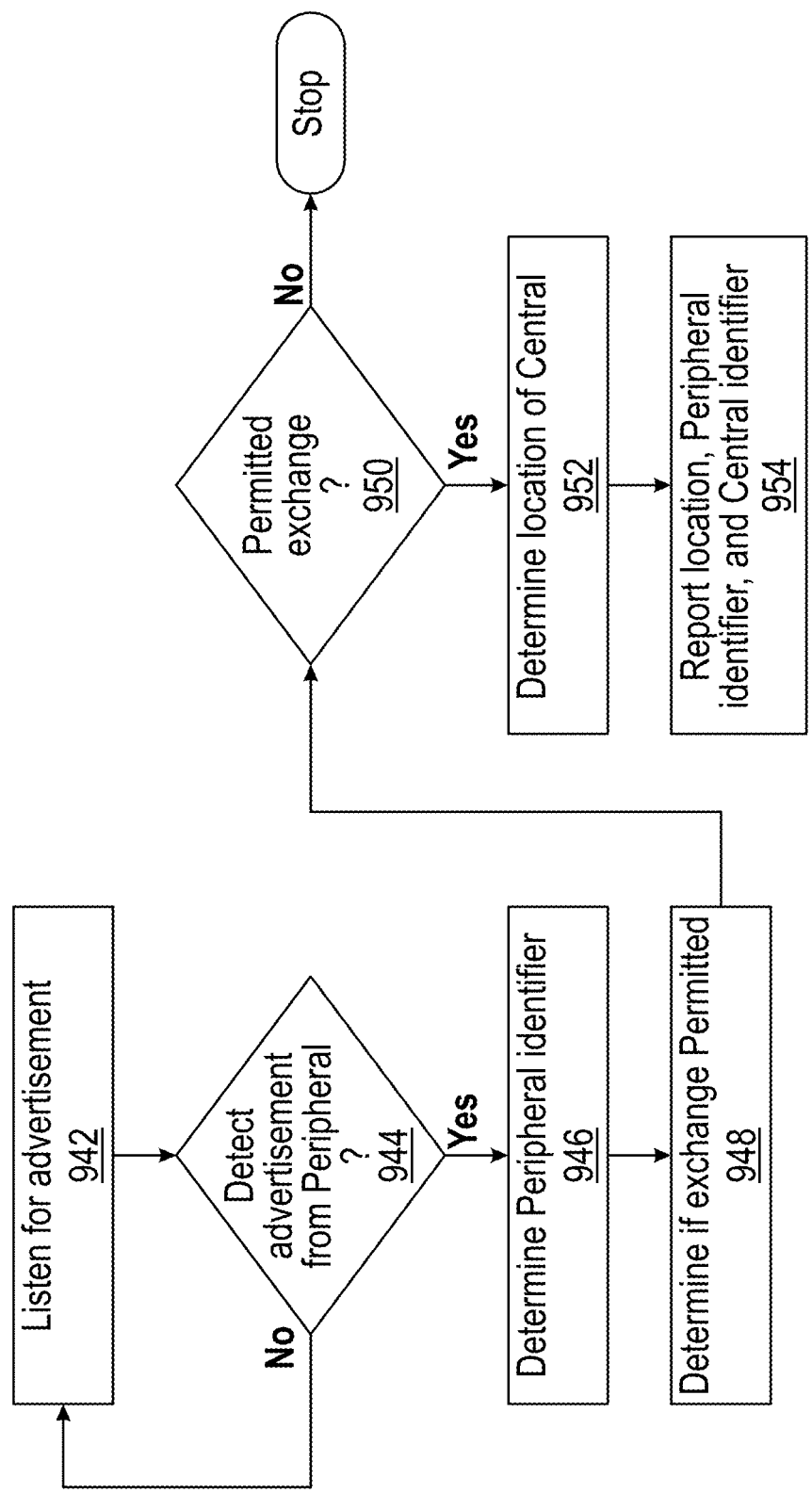
FIG. 9C is a flowchart that illustrates another process for low power location determination, according to various implementations.

FIG. 9C is a flowchart that illustrates another process for low power location determination according to some embodiments. Depending on the embodiment, the method of FIG. 9C may include fewer or additional blocks and the blocks may be performed in an order that is different than illustrated.

At block 942, a Central can listen for a broadcast from a Peripheral. At decision point 944, if no broadcast is detected, the Central can continue to listen to a broadcast. If a broadcast is detected, at block 946, the Central can determine an identifier of the Peripheral. At block 948, the Central can determine if exchange is permitted. For example, the Central may send the Peripheral identifier and a Central identifier to a Backend and may receive a response indicating that exchange is or is not permitted. In some embodiments, a local data store on a memory of the Central may be used to determine if exchange is permitted. At decision point 950, if exchange is not permitted, the process can stop. If exchange is permitted, the Central can determine its location at block 952. At block 954, the Central can report the location, Peripheral identifier, and Central identifier to the Backend. In some embodiments, the Central may not report the Peripheral identifier. For example, the Backend may determine an associated Peripheral based on the previously-received query to determine if exchange is permitted between the Peripheral and the Central.

Figure 9D:
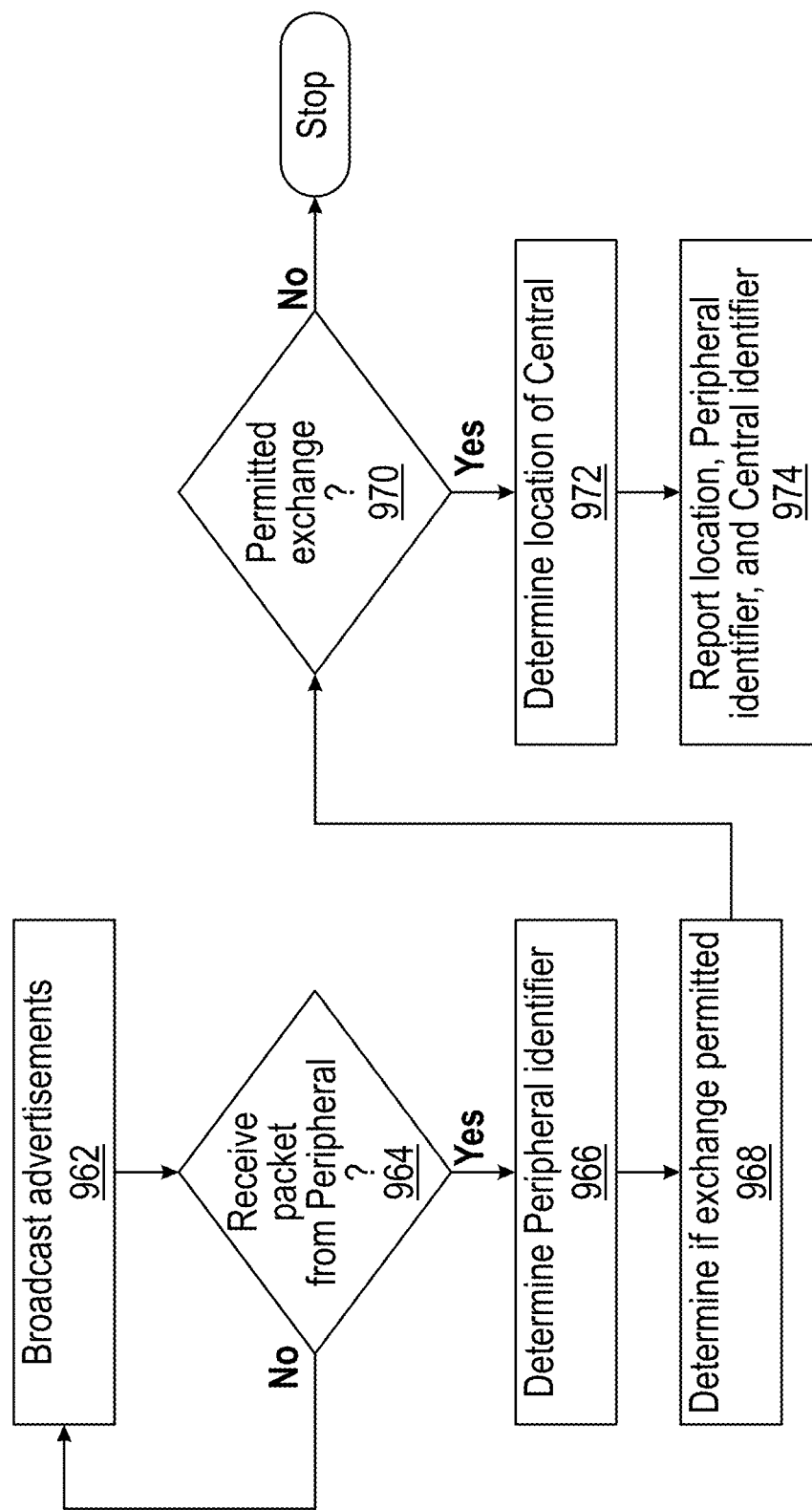
FIG. 9D is a flowchart that illustrates another process for low power location determination, according to various implementations.

FIG. 9D is a flowchart that illustrates another process for low power location determination according to some embodiments. The process of FIG. 9D is generally similar to that of FIG. 9C, except that in FIG. 9D, the Central broadcasts advertisements/broadcasts at block 962 and, at decision point 964, determines if it has received a packet from a Peripheral. Block 966, block 968, block 970, block 972, and block 974 may proceed in a manner generally similar to similar blocks described above in reference to FIG. 9C. Depending on the embodiment, the method of FIG. 9D may include fewer or additional blocks and the blocks may be performed in an order that is different than illustrated.

In some embodiments, a Peripheral may maintain a low power connection to a Central. For example, the Peripheral may be a Peripheral attached to cargo in a vehicle, and the Central may be a vehicle gateway connected to the vehicle. In some embodiments, if the Peripheral has already established and is maintaining a connection to a Central, the Peripheral may not transmit broadcasts and/or may not respond to broadcasts broadcast by other Centrals. Such an approach can prevent or reduce the reporting of duplicative location data to a Backend.

In some embodiments, a Peripheral (e.g., a Peripheral) may be configured to first attempt connections to gateways associated with the same organization as the Peripheral, and may only connect to other gateways associated with other organizations if the Peripheral is unable to connect to a gateway associated with the same organization. For example, the Peripheral may include volatile and/or non-volatile memory that has identifiers of known gateways embodied thereon. In some embodiments, the identifiers may be identifiers of gateways associated with the same organization as the Peripheral. In some embodiments, the identifiers may include other gateways not associated with the same organization as the Peripheral. For example, if equipment, vehicles, and/or the like, are often located at a customer site, that customer's gateways may be included.

In some cases, there may be a large number of Centrals within range of a Peripheral. For example, in dense urban areas, along busy highways, at rest stops and truck stops, and/or the like, there may be a large number of Centrals within range of a Peripheral. If each Central within range reports location information for the Peripheral, there can be a large amount of location data for the Peripheral that is largely duplicative.

Retaining all reported location data can have several drawbacks. For example, a significant amount of storage space may be used to store the location data. As another example, showing all the data on a map may lead to slow performance, the map may appear cluttered, and/or the like. In some embodiments, data collected at or near the same location at or near the same time can be filtered, combined, partially dropped, and/or the like. Such data manipulation can reduce storage demands, improve user interface performance, and so forth.

In some embodiments, location data can be kept or dropped based on, for example, the number of data points at the same or similar location close in time, signal strength between the Central and the Peripheral, and/or the like. For example, if two Centrals determine a location for a Peripheral, but one of the gateways had a low signal strength and the other gateway had a higher signal strength, the low signal strength data may be dropped. Low signal strength can be caused by a variety of factors such as, for example, distance, atmospheric conditions, intervening structures (e.g., buildings, walls, trailers, and/or the like).

In some embodiments, location information from multiple Centrals may be used. For example, in some embodiments, a Backend may calculate a geometric mean of the reported locations to better determine the actual location of the Peripheral. In some embodiments, the location information reported by each Central can be weighted based on the signal strength between the Central and the Peripheral. For example, a Central that was close to the Peripheral (as may be indicated by a relatively high signal strength) may be weighted more strongly than location information received from a Central that was farther away from the Peripheral. In some embodiments, signal strength may be used to estimate a distance between a Central and a Peripheral.

Figure 10:
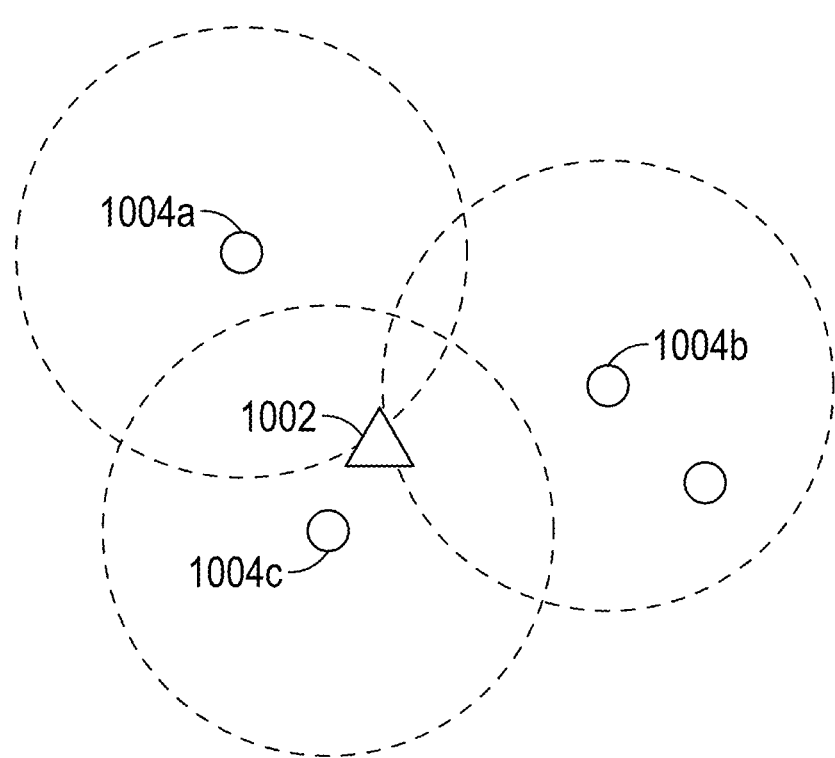
FIG. 10 is an example diagram showing location determination, according to various implementations.

FIG. 10 is an example diagram showing location determination according to some embodiments. In FIG. 10, a Peripheral 1002 is within range of three Centrals 1004a, 1004b, 1004c. In some embodiments, the locations of the Centrals 1004a, 1004b, 1004c can be reported to a Backend and used as approximate locations of the Peripheral 1002. In some embodiments, each data point may be maintained on the Backend and/or may be shown to a user viewing the location data of Peripheral 1002. In some embodiments, the location of the Peripheral 1002 can be computed as the geometric mean of the locations of the Centrals 1004a, 1004b, 1004c. In some embodiments, additional information can be used to more precisely locate the Peripheral 1002. For example, as mentioned above, the signal strength between the Peripheral 1002 and each of the Centrals 1004a, 1004b, 1004c can be used to estimate the distance between the Peripheral 1002 and each Central 1004a, 1004b, 1004c and to determine an estimated or proxy location of the Peripheral 1002.

Figure 11:
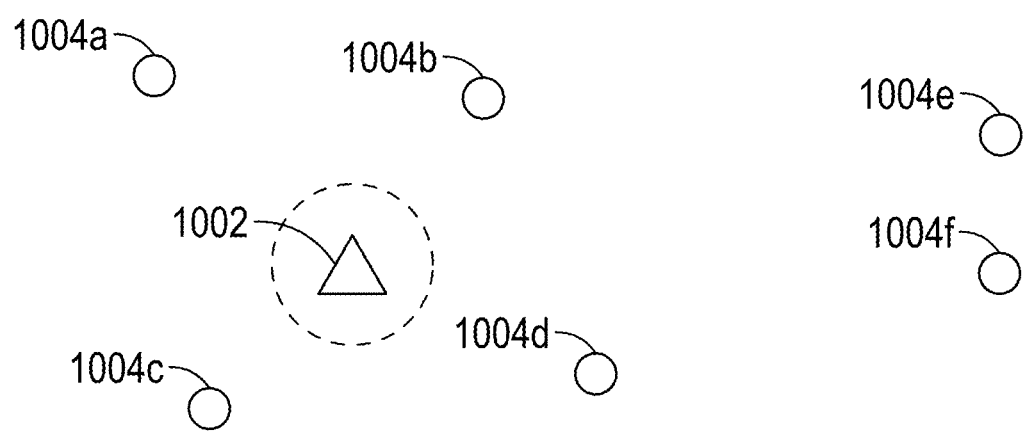
FIG. 11 is an example diagram showing location determination of a Peripheral, according to various implementations.

FIG. 11 is an example diagram showing location determination of a Peripheral according to some embodiments. As shown in FIG. 11, in some embodiments, the Peripheral 1002 can be within range of multiple Centrals 1004a-1004f. In FIG. 11, the Centrals 1004a-1004d are relatively close to the Peripheral 1002 while Centrals 1004e, 1004f are relatively far. In some embodiments, the Backend can receive location information from the Centrals 1004a-1004f. In some embodiments, the Backend may exclude the data from the Centrals 1004e, 1004f, for example based on a determination that the signal strength between the Peripheral 1002 and the Centrals 1004e, 1004f is too low, based on a determination that the Centrals 1004e, 1004f are far away from the Centrals 1004a-1004d, and/or the like. In some embodiments, Backend can determine the location of the Peripheral 1002 as the geometric means of the locations reported by the Centrals 1004a-1004d.

In some embodiments, Centrals can be excluded if they are more than a threshold distance away from the average location of other Centrals that have detected the Peripheral. In some embodiments, the threshold distance can be fixed. In some embodiments, the threshold distance can be variable. For example, the threshold distance may be relatively small if there are at least a minimum number of Centrals within range of the Peripheral. In some embodiments, the threshold distance may be relatively large if there are below the minimum number of Centrals within range of the Peripheral. Such an approach may result in more accurate determination of a Peripheral's location when there are many Centrals nearby, while still providing at least an approximate location when there are relatively few Centrals within range of the Peripheral.

In some embodiments, location history of a Central may be used to exclude a Central from calculations to determine the location of a Peripheral. For example, if the location of a Central shows errant behavior (e.g., the location of the Central changes more or in a different manner than would be expected for a Central that is traveling on a vehicle), the Central may not be used to determine the location of the Peripheral. In some embodiments, a Backend can determine whether a Central is fixed or movable (e.g., installed at a facility, job site, and/or the like, or attached to a vehicle), for example by querying a database that includes information about the Centrals. In some embodiments, fixed Centrals may be favored over movable Centrals. For example, a Backend may be configured to drop location information from movable Centrals when at least one fixed Central has also reported location information for a Peripheral.

In some embodiments, the amount of location data that is uploaded to a Backend can be limited. For example, there may be dozens or hundreds of Centrals within range at a depot, in a dense urban area, and/or the like. If all Centrals report the location of the Peripheral, there can be a large amount of data uploaded to a Backend, which can increase network capacity demands, processing demands, data storage demands, and/or the like. In some embodiments, Centrals can be configured to report the location of a Peripheral with reduced frequency. For example, in some embodiments, a Central can determine whether or not to report the location of the Peripheral based on the number of other Centrals nearby. In some embodiments, Centrals may operate as both central and peripheral devices to facilitate determination of the number of nearby Centrals. In some embodiments, a Central can have a probability of reporting the location of the Peripheral based on the number of other Centrals nearby. For example, if there are many other Centrals nearby, the Central may have a low probability of reporting the location of the Peripheral, while if there are relatively few other Centrals nearby, the Central may have a relatively high likelihood of reporting the location of the Peripheral. For example, the probability of reporting the location of the Peripheral can be 1/x, 2/x, 3/x, 4/x, and/or the like, where x is the number of Centrals nearby. In some embodiments, the reporting probability may be binned or grouped. For example, if there are below a first number of nearby Centrals, the Central may have a first reporting probability, if there are between the first number and a second number of nearby Centrals, the Central may have a second probability, and so forth. For example, the reporting probability may be 1 if the number of nearby Centrals is between 1 and 4, 0.5 if the number of nearby Centrals is between 5 and 10, and 0.25 if the number of nearby Centrals is greater than 10. In some embodiments, a reporting probability may be fixed. For example, a Central may only report 25% of the time, 50% of the time, 75% of the time, 100% of the time, or any other pre-defined value.

Figure 12:
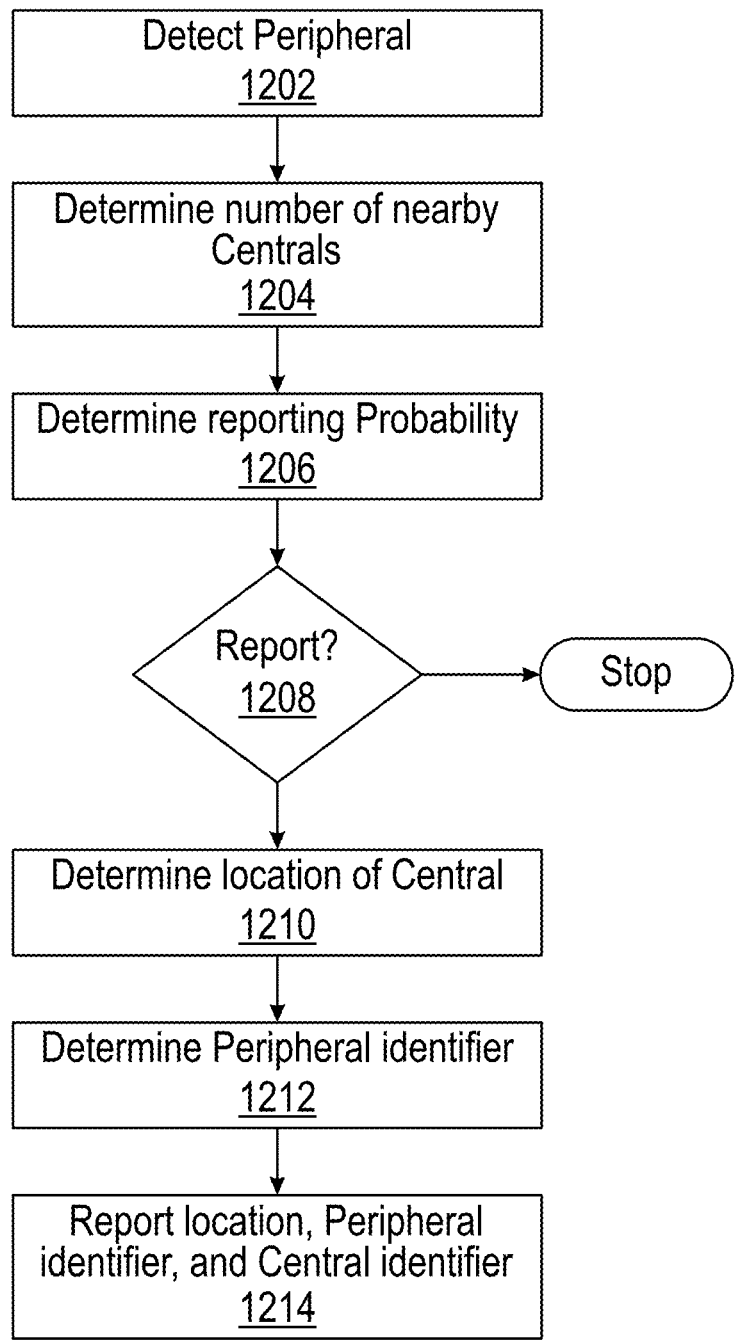
FIG. 12 illustrates an example process that may be run on a Central, according to various implementations.

FIG. 12 illustrates an example process that may be run on a Central according to some embodiments. At block 1202, the Central may detect a Peripheral. At block 1204, the Central may determine the number of nearby Centrals. At block 1206, the Central may determine a reporting probability, which can determine whether or not the Central reports location information to a Backend. At decision point 1208, the Central can determine whether or not to report location information to the Backend. If not, the process can end. If so, the Central can, at block 1210, determine the location of the Central. At block 1212, the Central can determine an identifier of the Peripheral. At block 1214, the Central can report the location, Peripheral identifier, and Central identifier to a Backend.

In some embodiments, a Peripheral may be connected to another gateway in ride along mode, as described herein. In some embodiments, the Peripheral may be configured not to transmit broadcasts when operating in ride-along mode. In some embodiments, the Peripheral may be configured to broadcast an indication that the Peripheral is operating in ride-along mode. In some embodiments, if a Central is provided with an indication that the Peripheral is operating in ride-along mode, the Central may not report the location of the Peripheral.

Figure 13A:
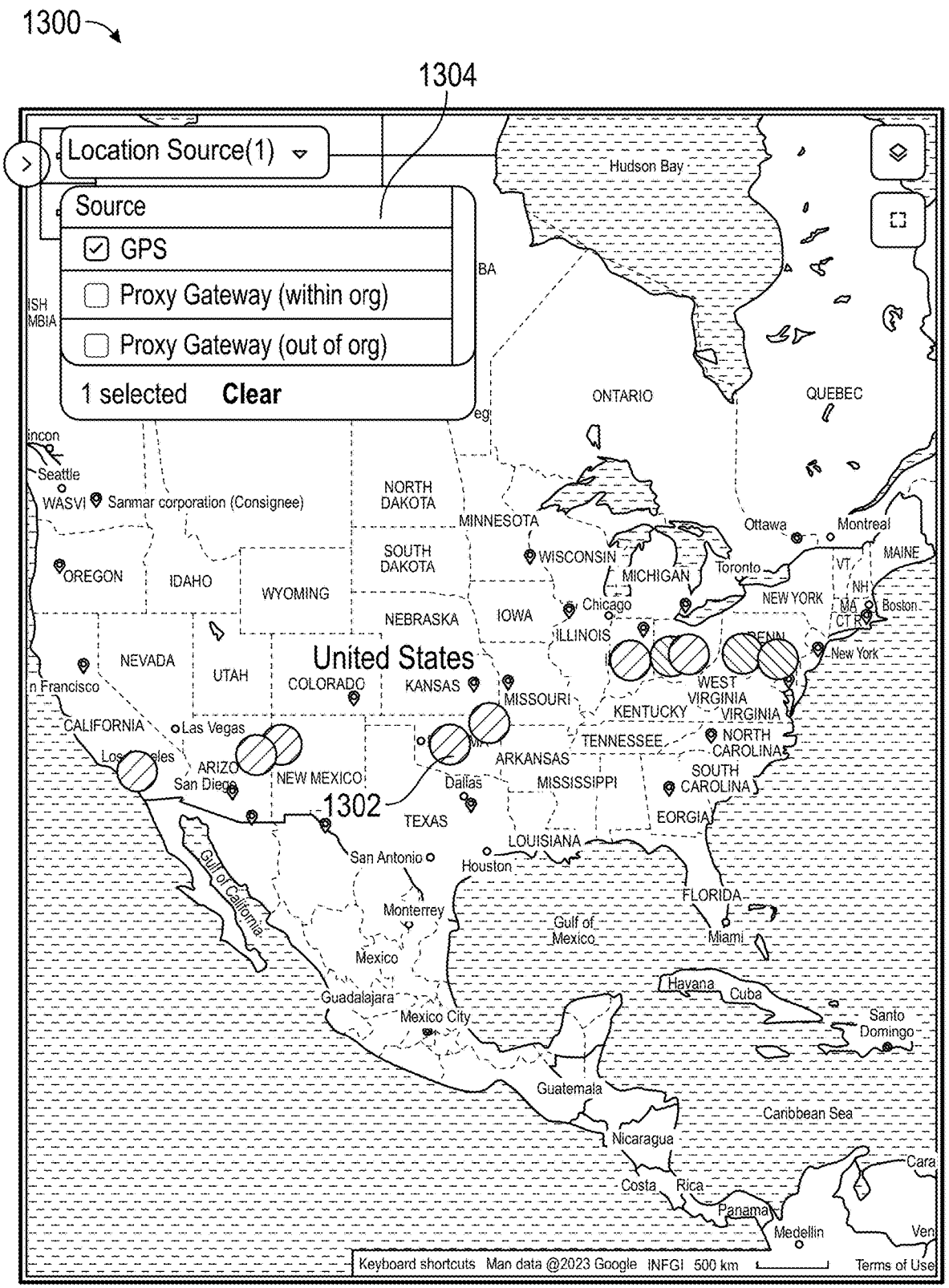
FIG. 13A illustrates a map that shows the location of a Peripheral, according to various implementations.

FIG. 13A illustrates an example user interface depicting a map that shows the location of a Peripheral over time, such as the Peripheral is moved from the east to west coast of the US. As shown in FIG. 13A, the map 1300 can include indicators 1302 that show the location of the Peripheral over time. A dropdown 1304 can allow a user to select which location points to show on the map. For example, in FIG. 13A, only GPS data is selected. The GPS data can be, for example, data reported by the Peripheral itself. The location data can be relatively sparse. For example, a Peripheral may be configured to report its location one per day, twice per day, and/or the like. The dropdown 1304 can include additional location selections. For example, a user can select to display locations received from Centrals (also referred to herein as proxy gateways). In some implementations, the user can select Centrals within the same organization as the Peripheral and/or Centrals in a different organization than that of the Peripheral. As noted above, permissions for sharing of Central locations may be limited by certain organizations, such as to limit sharing of location data with Peripherals associated with a particular entity or of a particular type.

Figure 13B:
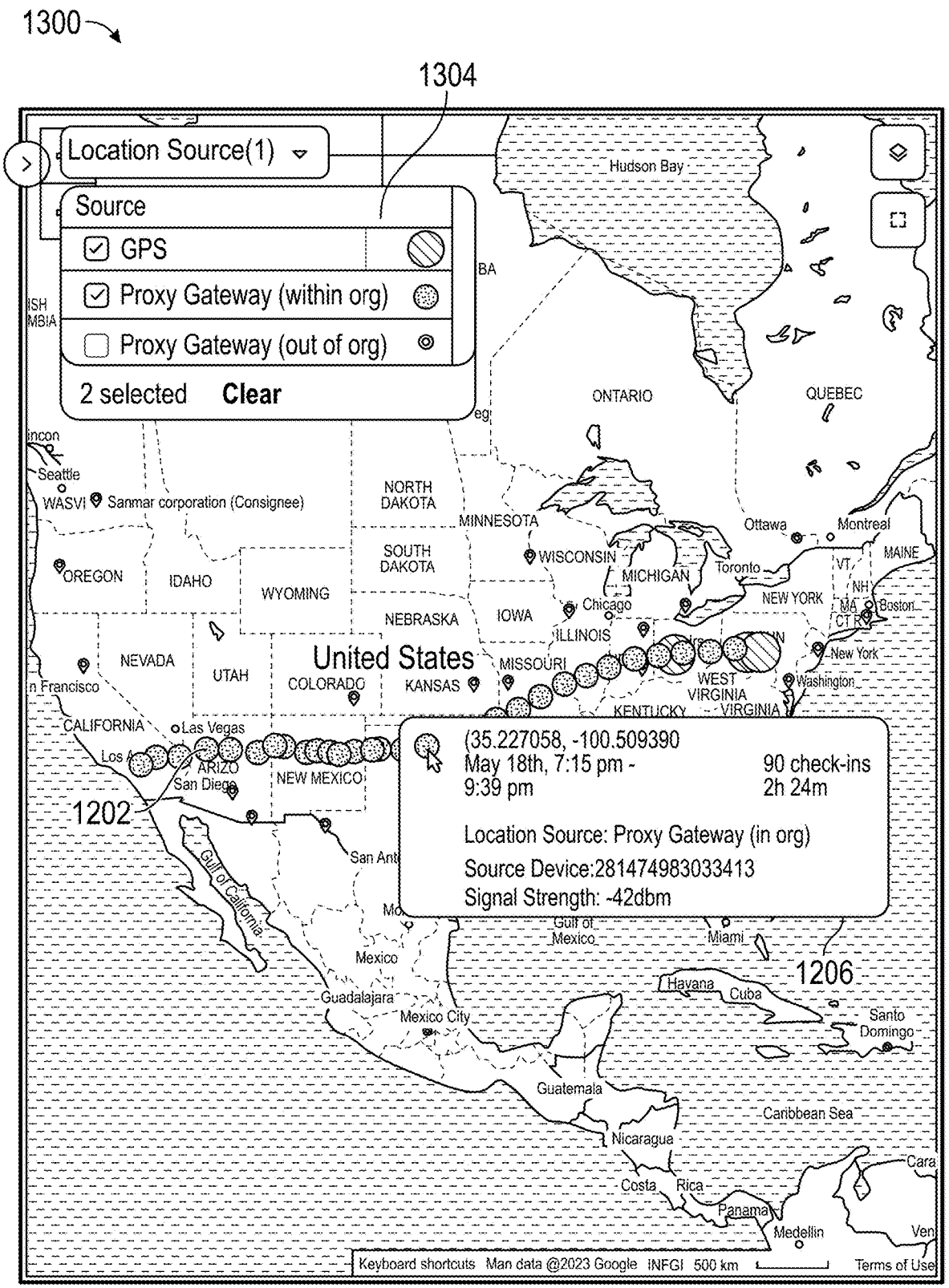
FIG. 13B illustrates another map that shows the location of a Peripheral, according to various implementations.

FIG. 13B illustrates the example user interface of FIG. 13A, now with the map updated to show locations of the Peripheral form both GPS sources and in-organization Centrals. As compared with FIG. 13A, more location information is shown, which can provide a more complete picture of the movement of the Peripheral. As shown in FIG. 13B, in some embodiments, a user interface can be configured to show an information bubble 1306 or otherwise present additional details when a user hovers and/or clicks a location on the map. The information bubble 1306 can display information such as, for example, latitude and longitude, time when the location was reported, time elapsed since the last reporting, the source of the location information (e.g., GPS, proxy gateway within the organization, proxy gateway outside the organization, and/or the like), an identifier of the source device, signal strength, number of check ins, and/or the like. In some embodiments, the information bubble 1306 may provide a link that enables a user to view information about the source device. For example, a user may click on the link to see location information about the source device. Such information may include, for example, location history, device details (e.g., serial number, model number, and/or the like), organization, and so forth.

In some embodiments, the colors of locations shown on the map can indicate a source of the location information. For example, GPS data may be a first color, Central data from within the organization may be a second color, and Central data from outside the organization may be a third color. In some embodiments, other coloring or other visualization approaches may be used. For example, GPS data may be a first color and reporter data (from both within and outside of the organization) may be a second color. In some embodiments, other differentiators may be used additionally or alternatively. For example, different shapes or sizes may be used to indicate the source of the data.

In some embodiments, the size of a point shown on the map can vary. For example, the size of the point may indicate a confidence in the location. For example, if there is relatively high confidence in the accuracy of a determined location, the point can be relatively small, and if there's relatively low confidence in the accuracy of a determined location, the point can be relatively large. In some embodiments, a point can be represented by, for example, a circle, and the radius of the circle can cover an approximate area within which the Peripheral was located.

Figure 14A:
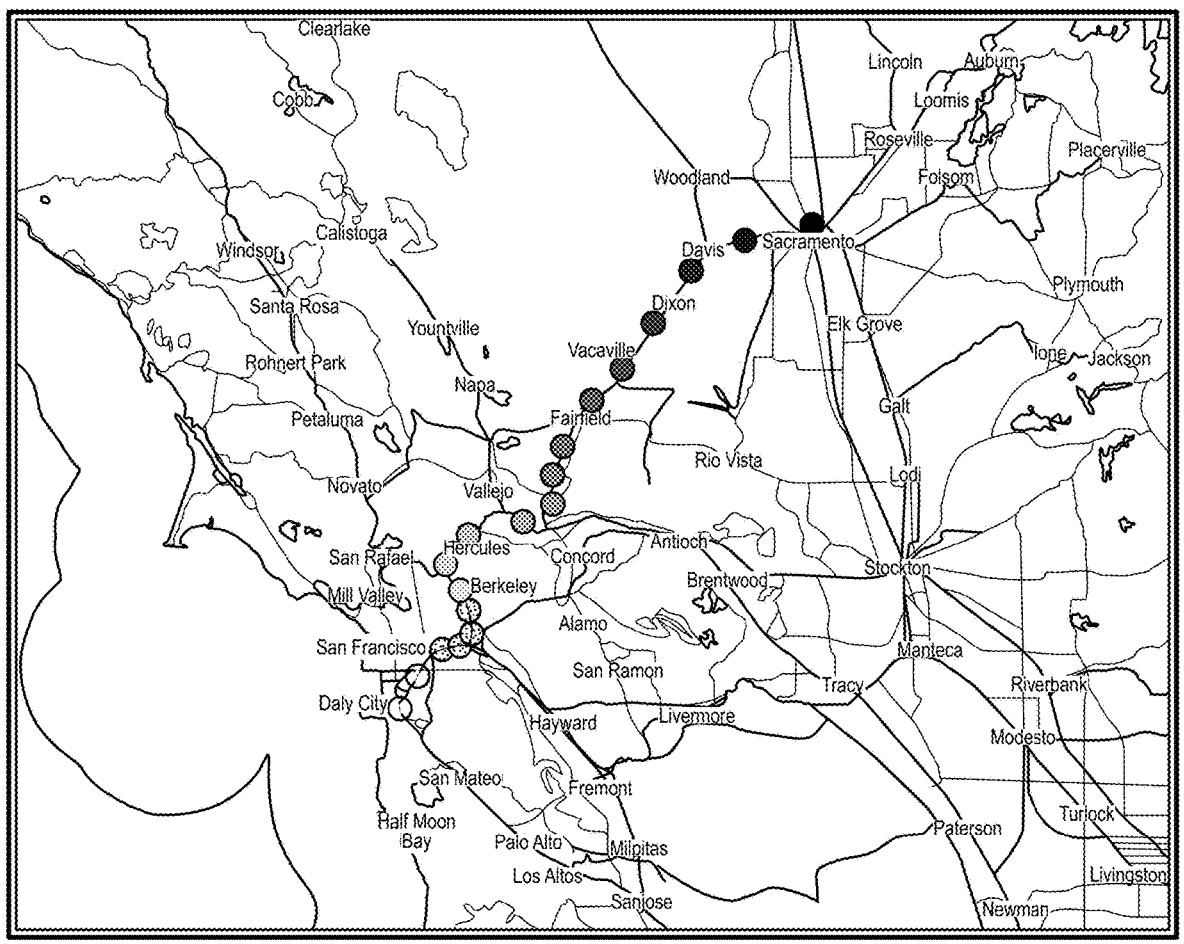
FIGS. 14A and 14B illustrate an example of trip replay, according to various implementations.
Figure 14B:
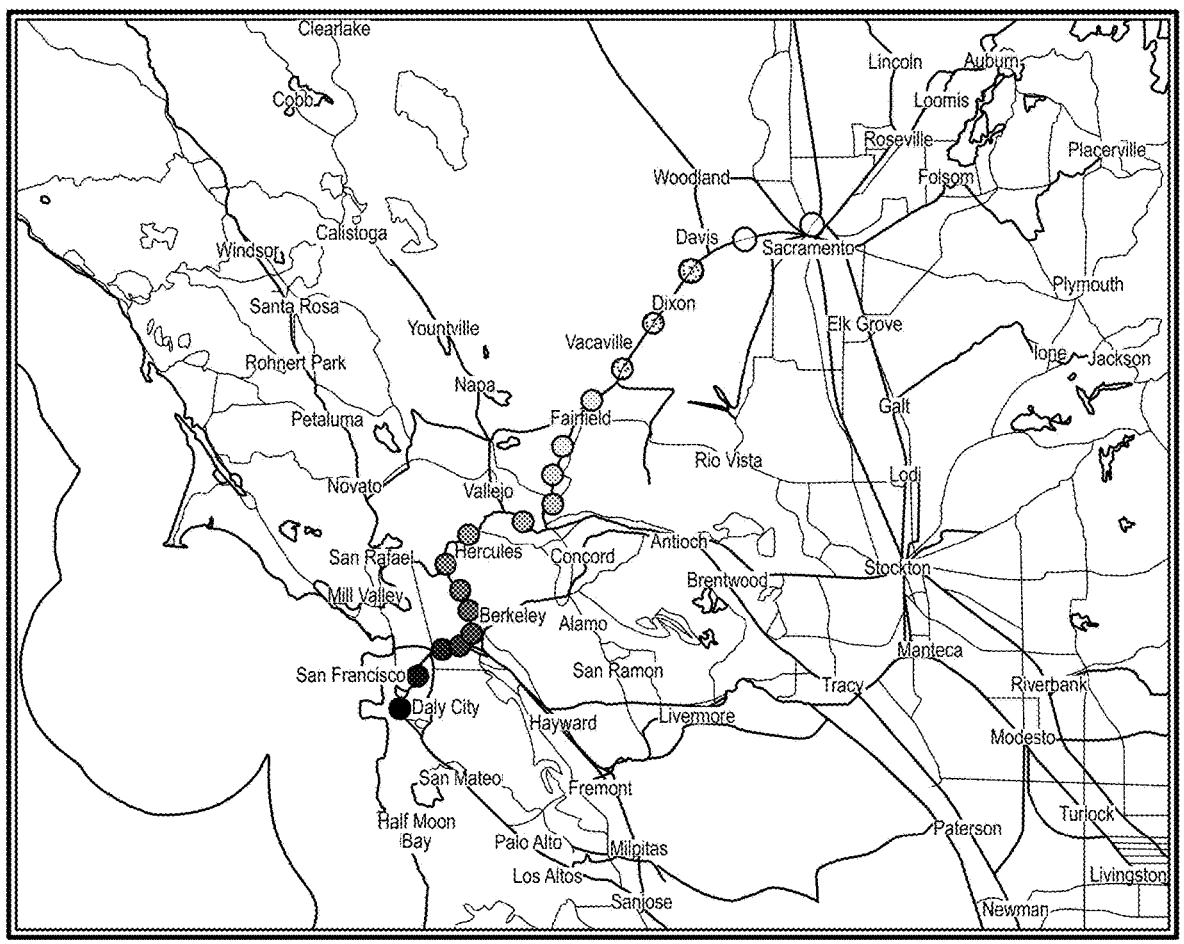

In some embodiments, a user interface can include a trip replay feature that enables a user to view a time lapse of a trip. FIGS. 14A and 14B illustrate an example of trip replay according to some embodiments. In FIG. 14A, the location points at the beginning of the trip are filled in and the opacity of later data points is reduced. As the trip replay progresses, data points from later in the trip can be filled in. In some embodiments, the opacity of earlier data points can be reduced. In other embodiments, the opacity of earlier data points can remain fixed. In FIG. 14B, location points near the end of the trip are opaque while those near the beginning of the trip have reduced opacity. In some embodiments, location points may only appear as the trip progresses.

In some cases, it can be beneficial to ensure that assets remain within a defined area. In some embodiments, geofencing can be used to define an area in which an asset is expected to remain. In some conventional geofencing applications, the geofenced area can be fixed and typically may not have a defined lifespan. However, it can be significant to provide geofencing capabilities that include one or more of expiring geofences, moving geofences, and/or the like. For example, for an asset loaded onto a vehicle, the vehicle may be a central point of a geofence. In some embodiments, an individual may be used to define a central point of a geofence. For example, an individual such as a driver, construction worker, and/or the like, may have a smartphone that can act as a BLE device to track a nearby asset.

Figure 15A:
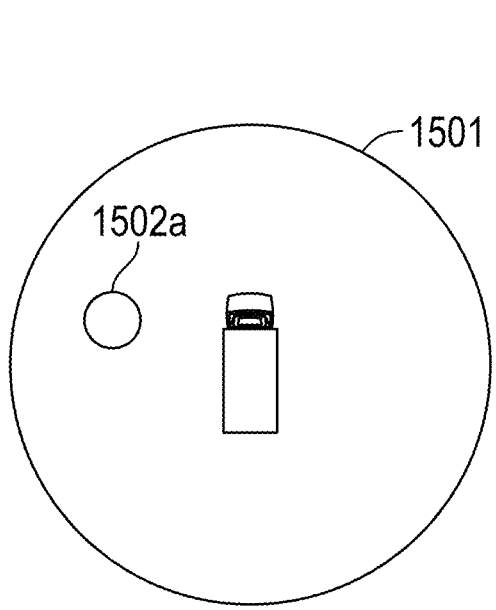
FIGS. 15A and 15B illustrate an example geofence, according to various implementations.
Figure 15B:
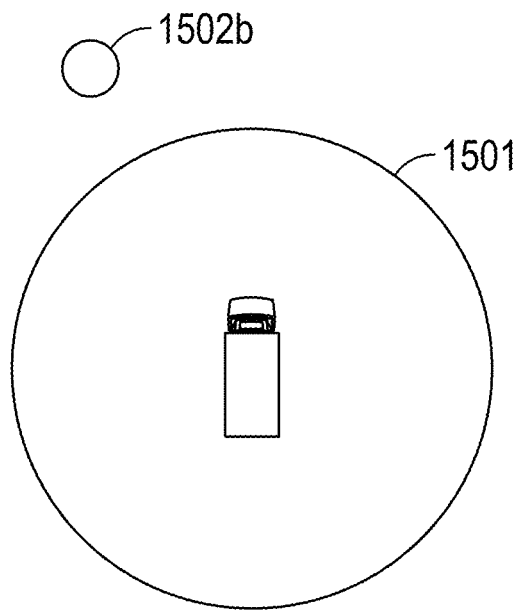
Figure 16A:
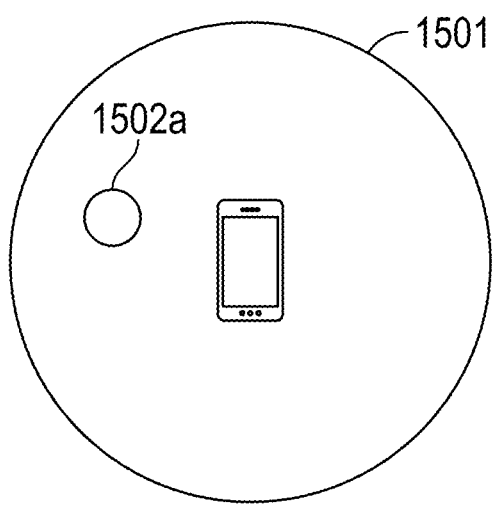
FIGS. 16A and 16B illustrate another example geofence, according to various implementations.
Figure 16B:
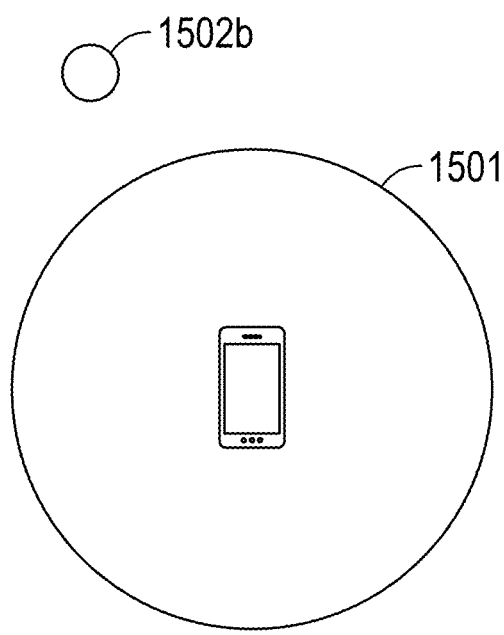

FIGS. 15A and 15B illustrate an example geofence according to some embodiments. In FIGS. 15A and 15B, a vehicle is used as the central point of the geofence. Thus, as the vehicle moves, the geofence area moves also. In FIG. 15A, the object 1502a is inside the geofence 1501. In FIG. 15B, the object 1502b is outside the geofence 1501. FIGS. 16A and 16B are similar to FIGS. 15A and 15B, except that a smartphone is used to define the geofence.

In some embodiments, a geofence may change over time. For example, an asset such as a tool may be loaded onto a first vehicle on a first day and onto a second vehicle on a second day. In some embodiments, the asset may have a default geofence, such as warehouse, a fixed facility, or a particular vehicle. In some embodiments, the geofence can be temporarily changed from the default geofence to a temporary geofence when the asset is sent out (e.g., the Peripheral communicates with a vehicle gateway after leaving the default geofence). In some embodiments, a temporary geofence can last for a short period of time, such as while a worker is out on a job, for a day, for a week, and/or the like. In some embodiments, a temporary geofence may last for a longer period of time. For example, a company that leases equipment out to others may define a temporary geofence around the location where the equipment is to be located. The equipment may remain at the location for weeks, months, or even years. Such a geofence can help the company keep track of equipment that has been leased to others, for example to identify if a piece of equipment has been moved from its designated location (for example, stolen, sent to another job site, and/or the like).

In some embodiments, a Peripheral can be determined to be outside a geofence if a signal from the Peripheral is no longer detected by a vehicle gateway, smartphone, or other device used to define the geofence. In some embodiments, a geofence may be less than the range of a vehicle gateway, smartphone, and/or the like. For example, in some embodiments, a received signal strength indicator (RSSI) can be used to determine an approximate distance from the vehicle gateway, smartphone, and/or the like, to the Peripheral. In some embodiments, a Peripheral may include in a BLE signal a transmit power indicating the power level at which the Peripheral transmitted the BLE signal. In some embodiments, the received signal strength indicator and the transmit power can be used to determine an approximate distance between the Peripheral and the receiving gateway (e.g., vehicle gateway, smartphone, and/or the like). In some embodiments, the transmit power may not be transmitted. For example, the transmit power of a particular Peripheral may be pre-determined or determined by querying a database that includes information about the Peripheral and/or the distance may be determined using an approximate transmit power.

Figure 17:
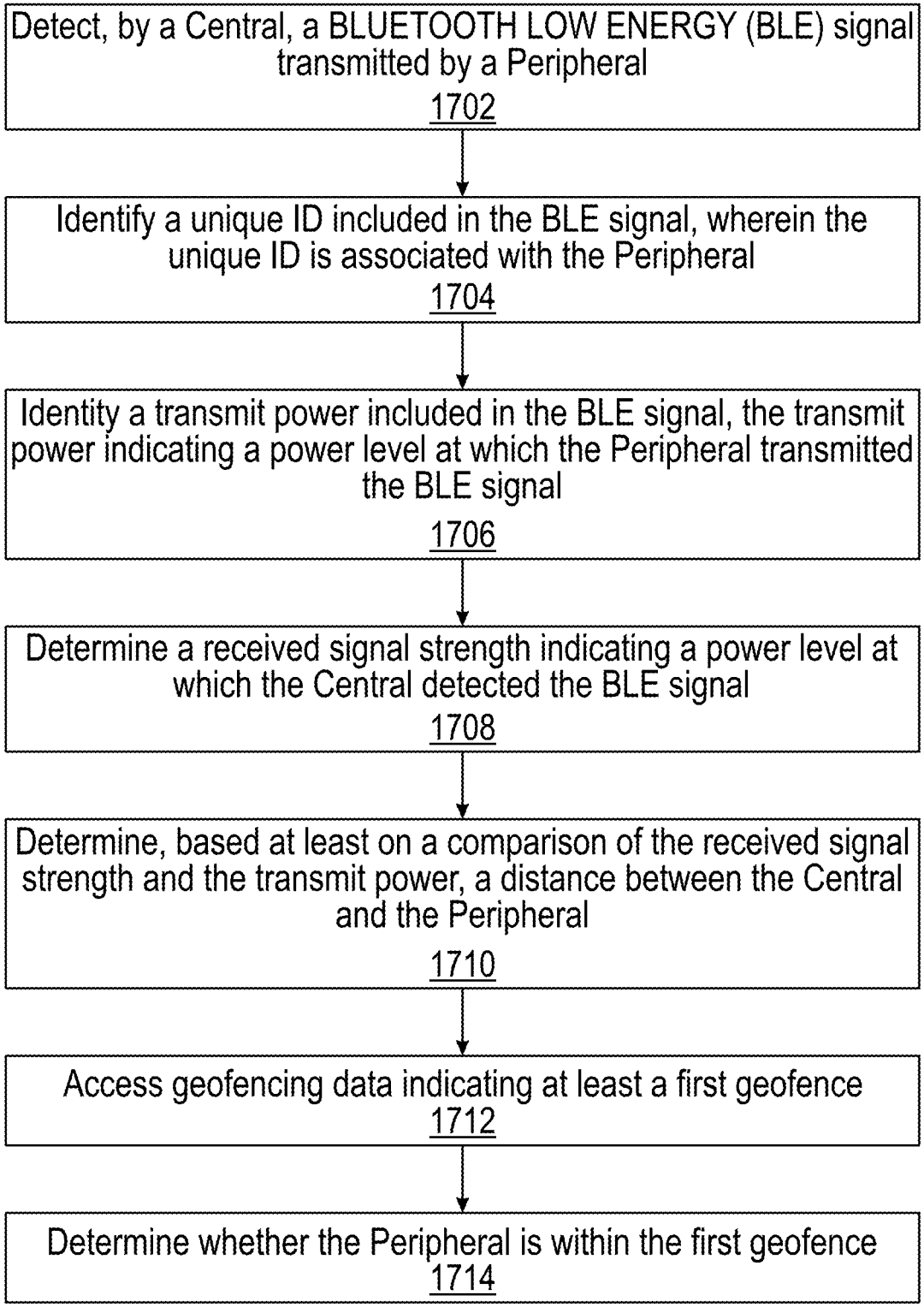
FIG. 17 is a flowchart illustrating an example of geolocation, according to various implementations.

FIG. 17 is a flowchart illustrating an example of geolocation according to some embodiments. The process shown in FIG. 17 may be executed on a gateway device (e.g., a Central) and/or on a Backend according to some embodiments. While the description below may refer to performance of various blocks by a particular device (e.g., a Central), in some implementations the blocks may be performed by another device (e.g., a Backend) and/or a combination of devices. Depending on the embodiment, the process of FIG. 17 may include fewer and/or additional blocks and/or blocks may be performed in an order different than is illustrated.

At block 1702, a Central can detect a BLE signal transmitted by a Peripheral (e.g., an asset gateway in peripheral mode, and/or another Peripheral). At block 1704, the Central can identify a unique ID included in the BLE signal, the unique ID associated with the Peripheral. At block 1706, the Central can identify a transmit power included in the BLE signal. The transmit power level may indicate a power level at which the Peripheral transmitted the BLE signal. At block 1708, the Central can determine a received signal strength indictor (RSSI). The RSSI can indicate a power level at which the Central detected the BLE signal. At block 1710, the Central can determine a distance between the Central and the Peripheral using the RSSI and the transmit power. At block 1712, the Central can access geofencing data indicating at least a first geofence. In some embodiments, there can be multiple geofences. In some embodiments, the Central may query a database or other information store to determine the first geofence. At block 1714, the Central may determine whether the Peripheral is within the first geofence.

While the above description refers to vehicle gateways and Peripherals, it will be appreciated that various implementations are possible and vehicle gateways and Peripherals are not necessarily restricted in where they can be deployed. For example, a vehicle gateway can be installed in a tractor or other vehicle. A vehicle gateway can, additionally or alternatively, be installed on other equipment, such as a trailer or even a non-moving object. A Peripheral can be installed on various items, such as cargo, tools, trailers, vehicles, and so forth.

Example Low Power Geofencing Features and Functionality

Tracking objects such as equipment, shipping containers, pallets, trailers, and so forth can provide valuable information. For example, tracking can enable users to determine if an asset has been stolen, detect when an asset is moved, and so forth. Tracking can help users locate lost or misplaced items. For example, users may use a tracking system to determine the location of a piece of equipment on a construction site, location of a package in a shipping facility or warehouse, or location of a trailer (e.g., shipping container) in transit. However, tracking systems may be difficult to deploy in some situations. For example, object tracking devices that are battery powered, such as might be used to track unpowered objects or objects where connections to a power source are limited, may require frequent charging and/or replacement of the battery.

Reliance on batteries can significantly limit the functionality of object tracking devices. An object tracking device may contain GPS, WiFi, and/or cellular hardware that can be used to determine the location of an object and to report the location of the object to a Backend over a cellular network (e.g., an LTE network or other cellular network). While this approach can provide location information, its functionality is limited because GPS and cellular operations require significant power and are often associated with additional expense. Thus, users of such an object tracking device are presented with a trade-off between longer battery life with limited information (e.g., frequency and/or quantity) and more information at the expense of significantly shorter battery life, which may necessitate frequent recharging or battery replacement. To achieve longer battery life, an object tracking device may only determine and report a location periodically, for example once per day, twice per day, and so forth. Moreover, if an object is lost, stolen, or otherwise can't be reached, frequent check-ins may result in the device being tracked for a short period of time before the battery runs out and the object can no longer be tracked. Periodic check-ins can conserve battery, but at the expense of limited and potentially stale information.

In some embodiments, object tracking may include the use of geofences. For example, a user might wish to receive a notification when an object enters or leaves an area. For example, a user might wish to know when a delivery arrives, or a construction company might want to receive a notification if a piece of equipment is removed from a job site. Periodic check-ins can be of limited utility in geofencing applications, especially if the time between check-ins is long. If the check-in frequency is increased, users can be notified more quickly if an object enters or leaves a geofenced area, but this can cause increased battery drain. As just one example, an object tracking device may be designed to operate for three years with two check-ins per day. If the check-in frequency is increased to once every thirty minutes, the battery may only last about two months. Moreover, even thirty minutes may be an unacceptably long delay to receive a notification that an object has left a geofenced area. Checking in at an acceptable rate may reduce battery life to hours, days, or weeks, which may be unacceptably short.

In some embodiments, a geofence can be a moving geofence. For example, a geofence can be defined around a moving object such as a truck. For example, it may be desirable to know if a tool was left behind at a job site, if an object fell off a truck, and so forth. In some embodiments, a geofence can be ephemeral. For example, a geofence can be defined in a location, around an object (which may be moving or fixed), and the geofence can expire after a defined period, such as one hour, two hours, four hours, eight hours, twelve hours, one day, two days, three days, one week, one month, and so forth.

As an alternative to checking in on a fixed schedule (or in addition to checking in on a fixed schedule), an object tracking device may be equipped with one or more motion sensors (e.g., an accelerometer, gyroscope, magnetometer, and/or the like). The device may check-in based on detecting motion. However, if the sensitivity of the accelerometer is too high, needless check-ins may occur. For example, it may not be desirable to receive a notification every time an object is moved a small amount. Excessive check-ins may consume energy and reduce battery life. On the other hand, if the sensitivity is not high enough, the object tracking device may not detect motion that should trigger a check-in, thereby permitting an object to leave or enter a geofence without triggering an alert, for example by accelerating the object slowly, moving at a relatively constant velocity, and so forth.

Disclosed herein are systems and methods that enable efficient object tracking, including use of geofences. An example Peripheral may be configured with low energy Bluetooth (BLE) functionality configured to periodically transmit a BLE signal (e.g., a check-in signal) at a constant rate, for example every one second, two seconds, three seconds, four seconds, five seconds, six seconds, seven seconds, eight seconds, ten seconds, thirty seconds, one minute, five minutes, and so forth. In some embodiments, the Peripheral may advertise for a period of x seconds every y minutes, for example thirty seconds every five minutes. The check-in frequency is not necessarily limited to any particular time or range of times. In some embodiments, an advertising interval can be any interval permitted by a relevant BLE specification. In some embodiments, the signal may be a non-connectable broadcast, an iBeacon broadcast, and so forth. Each broadcast may contain a unique identifier for the asset tracking device (e.g., the Peripheral). In some cases, the broadcast may also include a transmit power used for the transmission of the broadcast. A BLE receiver, such as may be included in an asset tracking device, a vehicle tracking device, and so forth may be used to detect the BLE broadcast from the Peripheral and the Peripheral identifier. In some embodiments, users of mobile devices may install an application that allows the mobile device to act as a Central for receiving the Peripheral signal. The BLE Central may be used to determine a location of the Peripheral based on the Central's location, the transmit power of the Peripheral, and/or properties of the received signal including metrics related to the received signal power such as a received signal strength indicator (RSSI). The Central may provide location information for the Peripheral to a Backend, and in some cases an alert may be generated when an asset leaves and/or enters a geofenced area.

While some embodiments of a Peripheral may use BLE to transmit signals, it will be appreciated that other communication methods are possible. For example, in some embodiments, the Peripheral may provide signals using an IEEE 802.15.4-compliant communications method, such as Zigbee, or may transmit signals using ultra-wideband technology.

Transmit power (provided by the Peripheral) and signal strength (determined by the Central) may be used to locate the Peripheral more precisely. For example, for a tag broadcasting at a particular transmit power, the RSSI will be higher if the Peripheral is close to the Central than if the Peripheral is far from the Central. The transmit power may be modulated, for example using a triangle wave, sine wave, and so forth. While in theory a single transmit packet (e.g., a single BLE broadcast from an object Peripheral) with a known transmit power and known received signal property such as a metric related the received signal power (e.g., RSSI) can be used to determine a distance between the Peripheral and the Central, RSSI readings are affected by real world conditions (e.g., atmospheric conditions, physical obstacles, reflective or absorptive materials, and so forth), and thus it may be advantageous to analyze multiple packets with differing transmit power. Moreover, modulating the transmission power of the Peripheral may reduce overall energy consumed by the Peripheral, as compared to a Peripheral configured to always broadcast at a maximum power. While lower transmit powers are possible, it may be desirable to broadcast at maximum power at least part of the time to increase detection range of the Peripheral and the likelihood that a Central will detect the signal from the Peripheral even when the Central is relatively far from the Peripheral.

A Peripheral as described above may also reduce costs compared to some other tracking systems. For example, object tracking devices may include GPS, WiFi, and/or cellular hardware. This hardware can increase costs, increase the physical size of the device, increase power requirements, and so forth. As described herein, the Peripheral may not have GPS, WiFi, or cellular hardware, and instead may communicate by broadcasting over BLE or another low energy communication protocol. Thus, the Peripheral may be significantly cheaper and/or smaller than a tracking device that includes other components, such as GPS, Wi-Fi, and/or cellular communication modules. In some embodiments, however, an asset tracking device may include any of these other communication modules (e.g., GPS, Wi-Fi, cellular, and/or the like), but those communication modules may be typically (or always) disabled and/or enabled in limited circumstances.

While the Peripheral has been discussed above in relation to geofencing, such a tag can also be used for other applications. For example, the Peripheral can be used for general purpose asset tracking, with the limitation that tracking information may only be available if the Peripheral is in proximity to a BLE Central that is listening for the Peripheral signal. The Peripheral may be used for relatively precise and frequent tracking in some scenarios, such as on highways or at pick up and drop off points, where BLE Centrals may be common, but may only provide limited information in other situations, such as when the Peripheral is loaded onto a vehicle that lacks a BLE Central or when the Peripheral is far away from major roads and highways. The simplicity and reduced cost of the Peripheral may make it attractive for use when tracking assets that are less valuable, which may render the cost of deploying a tracking device with GPS and cellular functionality prohibitively expensive.

Figure 18A:
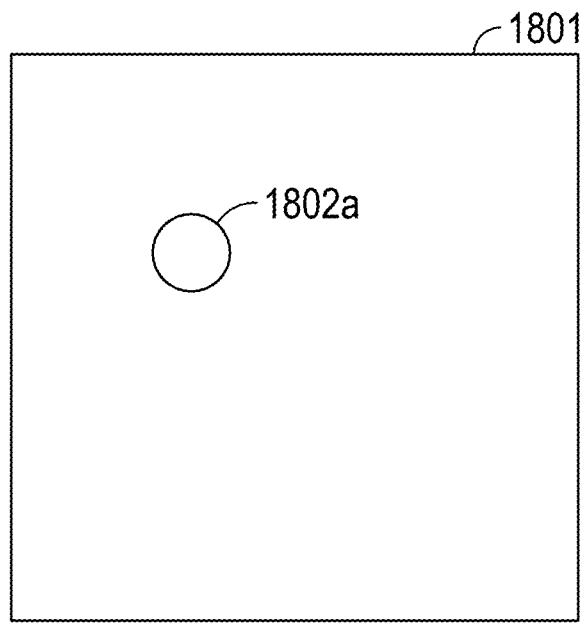
FIGS. 18A and 18B are example diagrams that illustrate geofencing, according to various implementations.
Figure 18B:
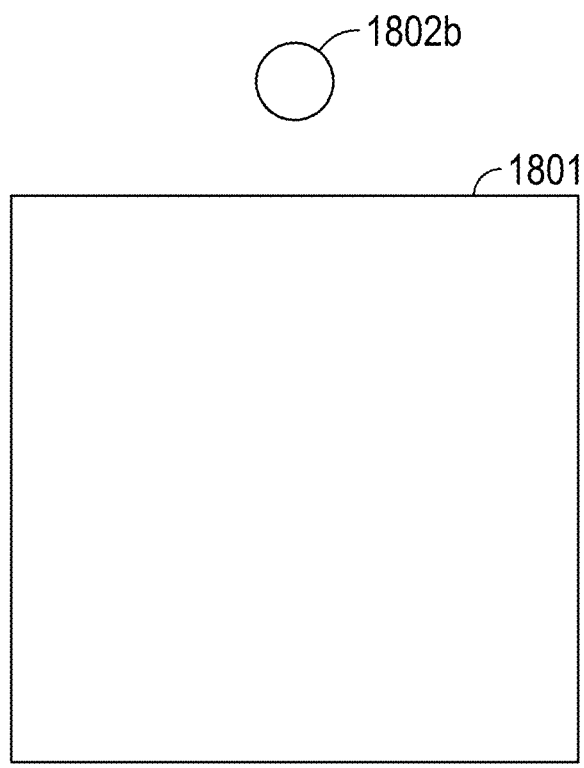

FIGS. 18A and 18B are example diagrams that illustrate geofencing according to some embodiments. In FIG. 18A, a Peripheral 1802a is located inside a geofence region 1801. The geofence region may be a physical space such as a building or job site or a virtual space corresponding to a physical area, for example a particular area within a facility or area on a map. In some embodiments, the geofence area may change over time. For example, the geofence area may be defined with respect to a moveable object such as a tractor, trailer, or other object. In some embodiments, the geofence may be defined by a distance over which a Central can detect a signal from the Peripheral. For example, a geofence may include a circular area with a radius of the expected Peripheral distance such that the Peripheral 1802a may be considered to be inside the geofence 1801 as long as a Central can receive a signal from the Peripheral 1802a. In other implementations, the geofence area could be smaller than an area covered by a Central or plurality of Centrals.

FIG. 18B depicts an example of a Peripheral 1802b outside a geofence region 1801. When the Peripheral 1802b is outside the geofence region 1801, a Backend may be configured to initiate one or more alerts or notifications to indicate that the Peripheral 1802b has left the geofence area 1801. This is but one example of how a geofencing system could work. In some embodiments, for example, rather than triggering an alert when a Peripheral leaves a geofence area, the system may be configured to generate an alert when a Peripheral enters a geofence area. For example, it may be desirable to know when an asset arrives at a facility.

Figure 19:
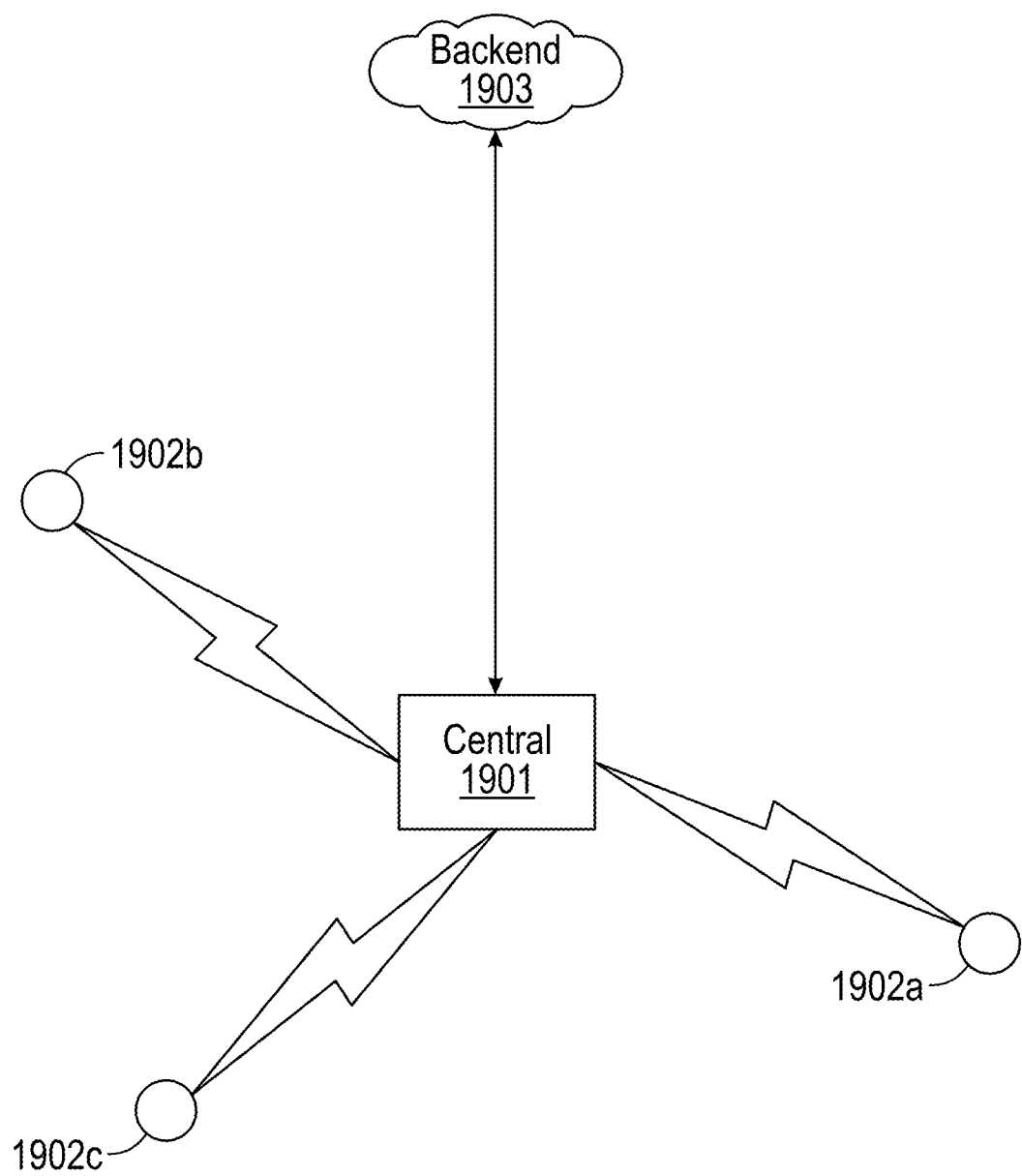
FIG. 19 is a diagram that illustrates an example of tracking Peripherals, according to various implementations.

FIG. 19 is a diagram that illustrates an example of tracking Peripherals according to some embodiments. In FIG. 19, a Central 1901 is configured with a wireless receiver (e.g., a Bluetooth low energy receiver or other wireless receiver) for receiving a signal from one or more Peripherals 1902a, 1902b, 1902c that are emitting a tracking signal. In this example, the Central 1901, which may be part of a gateway, mobile phone, or other device, includes a network communications interface (for example, a WiFi radio, a cellular or LTE radio, or a wired network connection) that enables the Central 1901 to communicate with a Backend 1903 for providing location information about the Peripherals 1902a, 1902b, 1902c. As discussed above, in some embodiments, the Central 1901 may report that it has received a signal (e.g., detected a BLE broadcast) from a Peripheral. In some embodiments, the Central 1901 may determine an approximate distance from the Central 1901 to a Peripheral from which the signal was detected. For example, in some embodiments, the Central 1901 may determine a strength of a received signal to approximate a distance to the Peripheral 1902 that transmitted the signal. In some embodiments, a transmit power is included in the signal from the Peripheral 1902 and used in more precisely determining distance from the Central 1901 to the Peripheral 1902. For example, if a Central detects BLE broadcasts from each of Peripherals 1902a and 1902b at a strength of 2 Mw, but the BLE broadcast from Peripheral 1902a indicates a transmission power of 10 Mw while the BLE broadcast from Peripheral 1902b indicates a transmission power of 4 Mw, the Central (and/or gateway, mobile device, or other device associate with the Central) may determine that Peripheral 1902b is closer to the Central 1901 than to Peripheral 1902a. In some embodiments, the Central 1901 may provide an indication to the Backend that a previously-detected Peripheral is no longer being detected.

Figure 20:
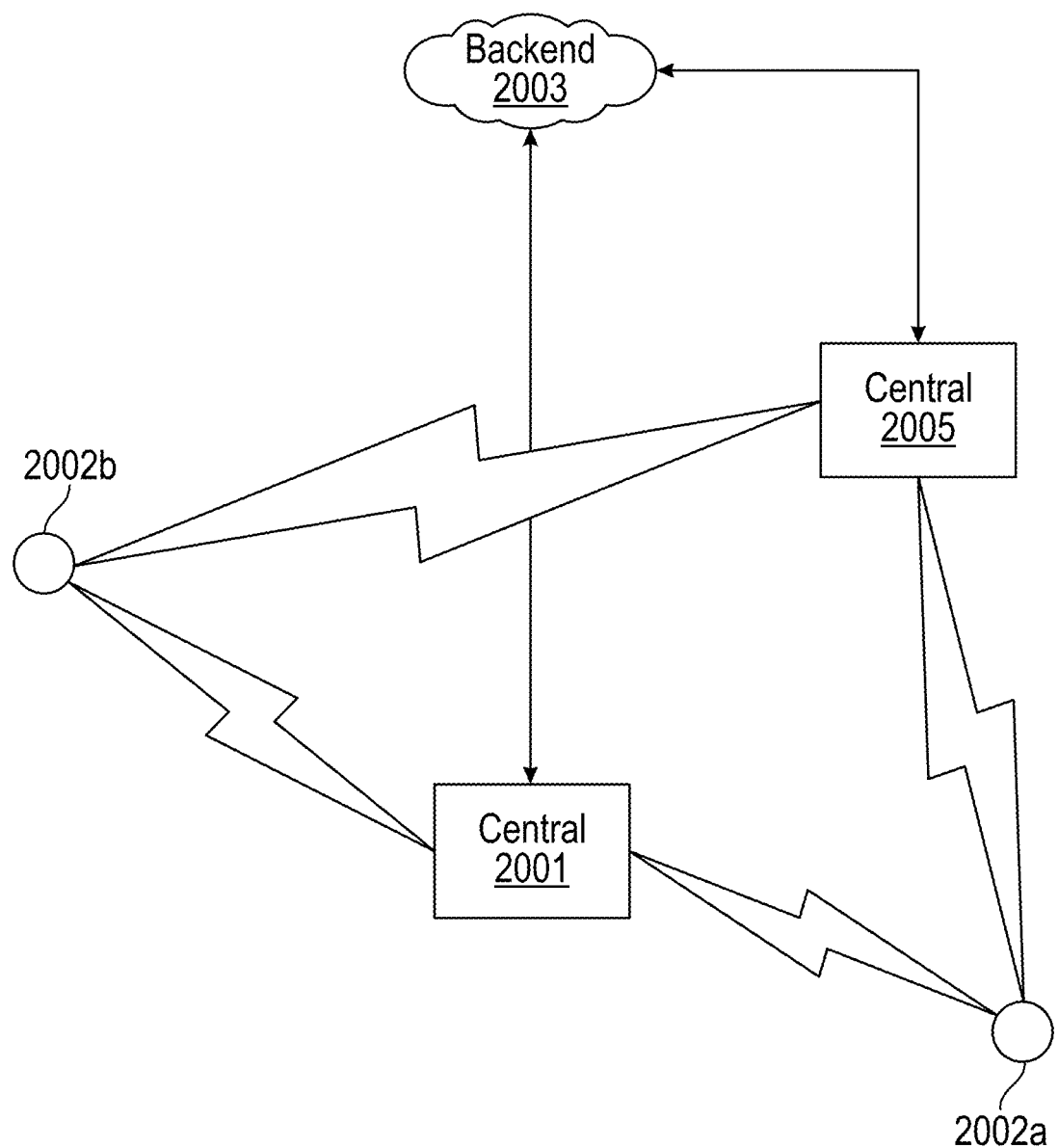
FIG. 20 is a diagram that illustrates an example of tracking Peripherals using multiple Centrals, according to various implementations.

FIG. 20 is a diagram that illustrates an example of tracking Peripherals using multiple Centrals according to some embodiments. Centrals 2001 and 2005 may be configured to receive signals from Peripherals 2002a, 2002b. Each Central 2001, 2005 may be equipped with a wireless receiver for receiving signals from Peripherals (e.g., Peripherals 2002a, 2002b) and a network interface for communicating with a Backend 2003. By deploying multiple Centrals, it may be possible to more accurately and/or precisely determine a location of a Peripheral. For example, as shown in FIG. 20, Peripherals 2002a and 2002b are closer to Central 2001 than to Central 2005. Thus, the signals received by Central 2001 may be stronger and/or at a different phase than the signals received by Central 2005. The difference in signal strength, phase, and so forth may be used to improve the determined locations of the Peripherals 2002a and 2002b. The use of multiple Centrals may also enable improved definition of a geofence area. Depending on the implementation, any quantity of Centrals may be associated with a geofence, and information from multiple Centrals may be combined to aid in determining the location of a Peripheral with reference to the geofence.

As depicted in FIG. 20, the Centrals 2001 and 2005 are in communication with the Backend 2003 but not with each other. In some embodiments, the Centrals 2001 and 2005 may be equipped with suitable communications hardware to enable them to communicate with each other. For example, the Centrals 2001 and 2005 may include Bluetooth, WiFi, infrared, or other communications hardware to enable the Centrals to communicate with each other. In some embodiments, locations of the Centrals may be determined (and/or otherwise known) by the Backend (or by another system in communication with the Backend) so that the Backend may use triangulation, trilateration, multilateration, and/or other techniques to more determine a more precise location of the Peripherals 2002. In some embodiments, however, a Central may determine the location of a Peripheral based on received signals and may provide the determined location to the Backend 2003. In some embodiments, a Central may be configured to receive information from one or more other Central for use in determining the location of a Peripheral.

In some embodiments, the Centrals may not communicate with a Backend, but may instead act as local servers. For example, the Centrals may communicate with nearby devices (e.g., laptops, desktops, smartphones, tablets, and so forth) to provide location information and notifications, for example over WiFi, Bluetooth, or another suitable communication method. Such a local configuration may be desirable in locations where there is limited or no access to an internet connection.

Figure 21:
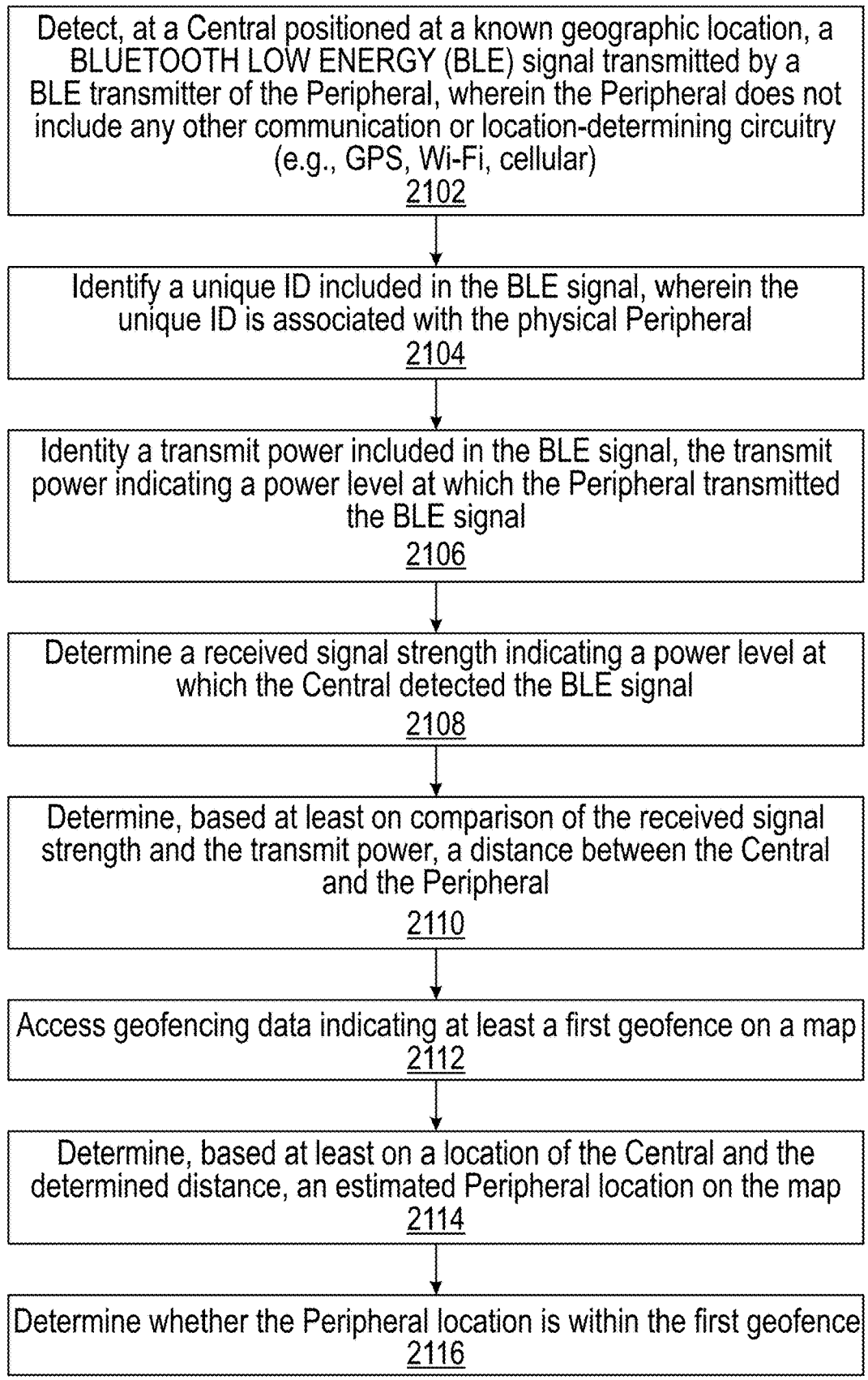
FIG. 21 is a flowchart that illustrates an example process for determining if a Peripheral is within a geofence which may be executed on a Central and/or at a Backend, according to various implementations.

FIG. 21 is a flowchart that illustrates an example process for determining if a Peripheral is within a geofence which may be executed on a Central and/or at a Backend according to some embodiments. While the description below may refer to performance of various blocks by a particular device (e.g., a Central), in some implementations the blocks may be performed by another device (e.g., the Backend) and/or a combination of devices. Depending on the embodiment, the process of FIG. 21 may include fewer or additional blocks and/or blocks may be performed in an order different than is illustrated.

In FIG. 21, a Central at a known geographic location detects a signal transmitted by a Peripheral at block 2102, for example a BLE signal. The Peripheral may not include other circuitry for communications or location determination, such as GPS, Wi-Fi, or cellular and, thus, may require a fraction of the power that would be necessary to power a Peripheral that includes these other communication circuits. At block 2104, the Central identifies a unique ID included in the BLE signal that is associated with the particular Peripheral (e.g., a serial number or MAC address of the Peripheral, such as a 48-bit value that uniquely identifies the BLE communication circuit of the Peripheral). At block 2106, the Central identifies a transmit power in the BLE signal, the transmit power indicating the power level at which the Peripheral transmitted the BLE signal. At block 2108, the Central determines a received signal strength indicating the power level at which the Central detected the BLE signal. At block 2110, the Central determines, using at least the received signal strength and the transmit power, a distance between the Central and the Peripheral. At block 2112, the Central accesses geofencing data that indicates at least a first geofence on a map. At block 2114, the Central determines, based at least in part on the location of the Central and the determined distance of the Peripheral, an estimated (or "proxy") geographic location of the Peripheral, such as, for example, coordinates (e.g., latitude and longitude or a set of latitudes and longitudes) that may be used to indicate the position on a map. At block 2116, the Central determines whether the Peripheral location is within the first geofence.

FIG. 21 is provided as one example and other embodiments of a low power geofencing system are possible. For example, in some embodiments, the Central may not perform blocks 2110, 2112, 2114, and 2116, and those blocks may instead be performed by a Backend or by a second Central that is in communication with the Central.

Example Asset Tracking and Peripheral Features and Functionality

Described below are further example implementations, features, and functionality of the system and associated components described above. These further example implementations, features, and functionality involve, consistent with the description provided above, communications among Peripherals, Centrals, and a Backend.

As generally described herein, a Central may be a device, such as a gateway (which may be powered or unpowered), that scans or observes for broadcasts from Peripherals, such as over BLE (Bluetooth Low Energy). Centrals may log identifying information of Peripherals. Combining the Central's data (on the Central and/or on the Backend), the Backend (or Central) can compute an approximate location of the Peripheral. A "Central" may also be referred to herein as a "Scanner," an "Observer," a "Crux Central," and/or the like.

As also generally described herein, a Peripheral may be a device that sends a broadcast (e.g., a BLE advertisement) that may be received by a Central. In some implementations, Peripheral's communication functionality may only include BLE communication functionality. A Peripheral's location may be determined and/or approximated by association with a Central (the location of which may be known or provided by the Central via, e.g., GPS functionality of the Central), and may be stored (e.g., at a Backend) and displayed on a user interface. A "Peripheral" they also be referred to herein as an "Advertiser," a "Broadcaster," and/or the like.

As further generally described herein, the recording of a broadcast by a Central may be referred to as an observation. Observations may be sent up to the Backend via WiFi and/or cellular communications, and then associated with the latest GPS location of the Central sent up by the Central, and finally written to a statistics ("stats") stream as the Peripheral's approximate location. In various implementations, this combined observation and location stat may be referred to as a proxy location for the peripheral. Further description and details are provided herein.

Figure 22A:
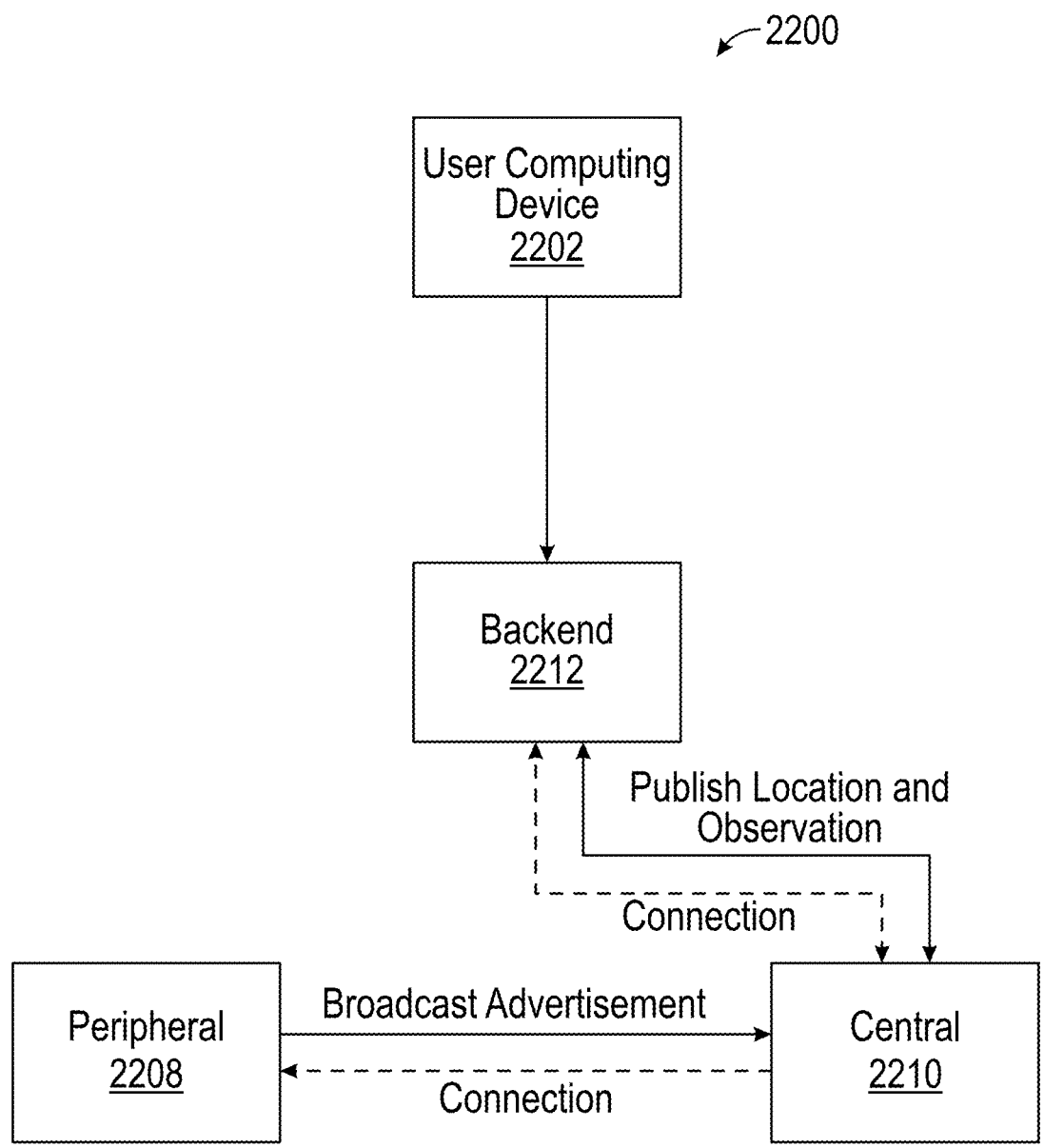
FIG. 22A is a block diagram illustrating an example operating environment of the system, according to various implementations.

FIG. 22A is a block diagram illustrating an example operating environment 2200 of the system, including example communications among Peripherals, Centrals, and a Backend. Such communications may be referred to herein as "crux communications," "crux protocol," and/or the like. The communications may include protocols or methods of communication provided, in part, via Bluetooth communications, broadcasts, observations, and/or the like. The communications may further be paired with algorithms for interpreting Bluetooth observations and converting them to accurate location data. In the illustrated example, operating environment 2200 includes one or more user computing devices 2202, one or more peripherals 2208, one or more centrals 2210, and a backend 2212.

In some implementations, user computing device 2202 may be any mobile device, such as a mobile phone, tablet, laptop, desktop, and/or the like. In some implementations, user computing device 2202 may be another system, component of a system, application programming interface (API), or other computing device that may communicate with the backend 2212. The user computing device 2202 may communicate with the backend 2212 via a web interface or standalone application, such as via an application programming interface (API) configured to communicate with the backend 2212. The user computing device 2202 may communicate with the backend 2212 via one or more networks, such as a local area network, wide area network (e.g., the internet), and/or the like. Communications may enable management of connected operations and allow users to monitor assets such as peripherals 2208.

A central 2210 may be a gateway (that may or may not be powered) that scans or observes advertisements/broadcasts from peripherals 2208, such as over BLE (Bluetooth Low Energy). A central 2210 may log identifying information of one or more peripherals 2208, which may be referred to herein as an observation stat. As discussed further below, data from a central 2210, such as observations of peripherals 2208, may be combined on the central 2210 and/or on the backend 2212. This may enable the backend 2212 to compute an approximate location of a peripheral 2208.

A peripheral 2208 may be any device that sends a broadcast that may be received by a central 2210. The communication functionality of a peripheral 2208 may include BLE communication functionality. The location of a peripheral 2208 may be determined and/or approximated by association with a central 2210 (the location of which may be known or provided by the central 2210 via, e.g., GPS functionality of the central 2210), and may be stored (e.g., at the Backend 2212) and displayed on a user interface, such as those discussed above with reference to FIGS. 6, 13A-13B, and 14A-14B.

A central 2210 may be configured to geolocate itself using, for example, Global Positioning System (GPS) functionality, and/or the like. Additionally, the central 2210 may be configured to record, or observe, broadcasts (also referred to herein as "advertisements") from a peripheral 2208. A broadcast can be a specifically formatted message. A central 2210 may send observations (e.g., received broadcasts) to the backend 2212 via a network connection such as WiFi and/or cellular communications. The observations may then be associated with the latest GPS location of the central 2210 as communicated by the central 2210. This may allow the system to infer the location of a peripheral 2208. For example, a central may report to the backend that it has received a broadcast from the peripheral 2208 and is located at location L. The backend can then associate Location L (+/- an estimated distance between the central 2210 and the peripheral 2208) with the peripheral 2208. In some cases, this inferred location may be referred to as a proxy location for the peripheral 2208. This proxy location may be written to a statistics ("stats") stream as the approximate location of the peripheral 2208.

In some implementations, the central 2210 may perform self-geolocation and observations asynchronously at a firmware level. To ascertain a proxy location for the peripheral 2208, the geolocation and observation stats may be matched based on timestamps. For example, when an observation is received at time t, a location that was collected as closely as possible to t may be associated with the peripheral 2208. The central 2210 and/or the backend 2212 may be configured to match timestamps including in the stats.

Use of proxy locations for peripherals may provide various technical improvements to an asset tracking system. For example, the use of proxy locations may enable lower power requirements, providing for increased flexibility in the size of a peripheral 2208, and the types of batteries installed, such as flight-safe batteries. Additionally, proxy locations enable simpler electronic design and a smaller form factor. Further, use of proxy locations may allow faster and/or more frequent location updates than other low-power consuming devices. Finally, proxy locations may be optimized through communication with out-of-organization centrals 2210 (e.g., a peripheral may be managed by a different organization than the central) to provide a greater range of location coverage and improved location accuracy.

Timestamp matching may be handled at either the Central or Backend. Implementing the matching at the Backend may provide certain advantages. For instance, backend implementation may enable centralization of matching logic. If done at the Central level, the matching logic may need to be written for each system-compatible device and/or firmware, which may create fragmentation. However, if performed at the Backend, the same matching logic may be used for all devices. Additionally, backend matching may simplify the system communication protocol such that the Central can simply listen for Peripheral messages (e.g., broadcasts from Peripherals) and forward them to the Backend "as is". This can minimize code changes to make a gateway "enabled" for communications in the system and/or operating environment (e.g., "Crux Enabled"). Further, code written in the Backend may be easier and faster to write, test, and deploy than firmware code for Centrals. Also, while the Centrals collect some data directly, the Backend can access even more data, giving better perspectives for feature evolution, such as for cell and/or wifi-based geolocation, or interpolated locations).

Figure 22B:
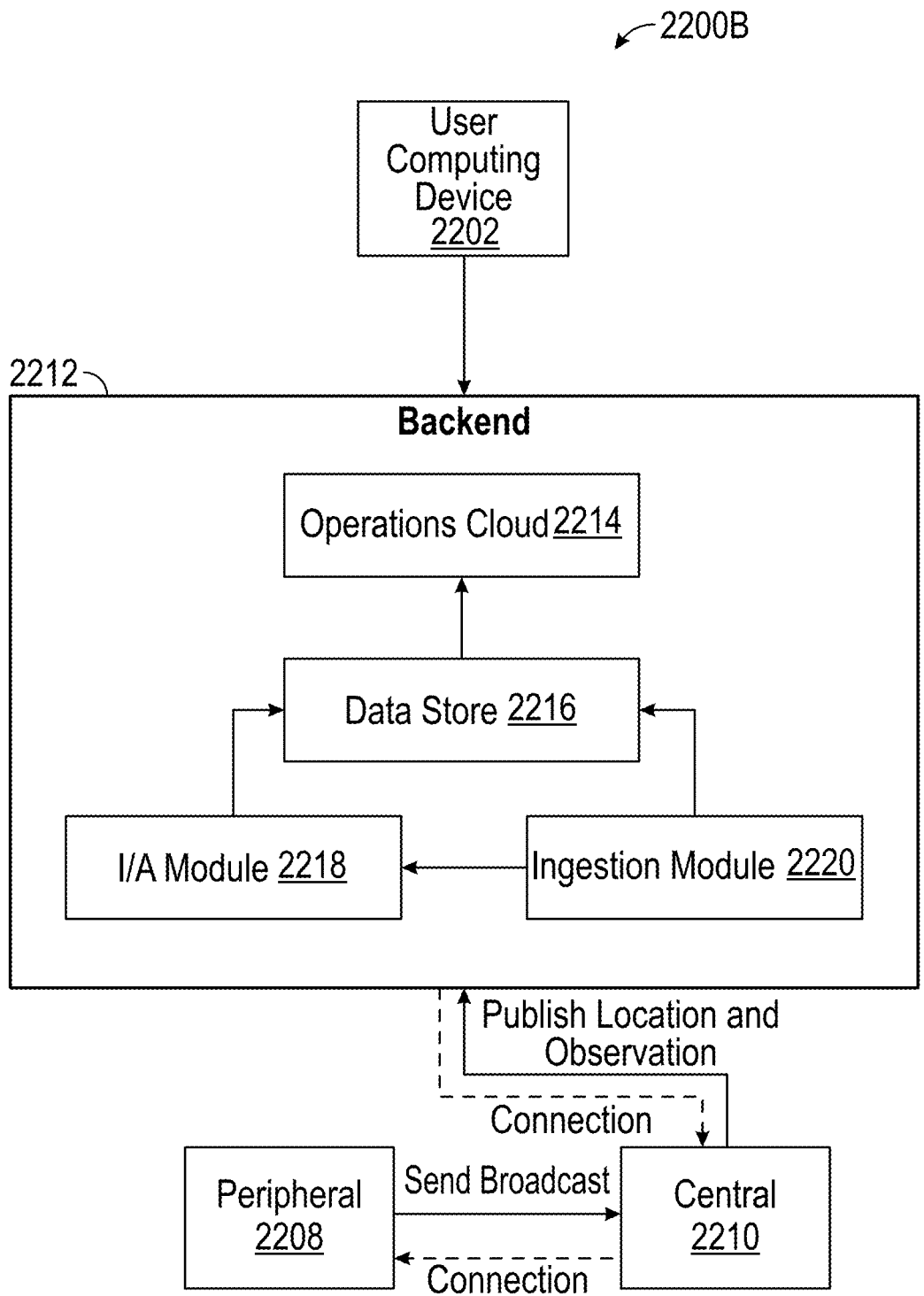
FIG. 22B is another block diagram illustrating a further example operating environment of the system, according to various implementations.

FIG. 22B is a block diagram illustrating a further example operating environment 2200B, which may be similar or the same as the operating environment of FIG. 22A, with additional details of an example backend 2212, as illustrated. In the illustrated example, operating environment 2200B also includes one or more user computing devices 2202, one or more peripherals 2208, one or more centrals 2210, and a backend 2212. In this example, the backend 2212 includes an operations cloud 2214, a data store 2216, an inference and aggregation (I/A) module 2218, and an ingestion module 2220.

The operations cloud 2214 represents a system that communicates with physical assets, such as sensors associated with a fleet of vehicles, to provide comprehensive visibility into operations across an entire organization. This operations cloud 2214 is configured to integrate with various physical operations, such as through communications with sensors and/or devices in industries such as construction, transportation and logistics, home and commercial services, food and beverage, local government, passenger transit, utilities, and/or the like. In the example of FIG. 22B, the operations cloud 2214 is shown in communication with a user computing device 2202. The user computing device 2202 may be used by a user, such as a manager, supervisor, or employee of an organization. The user computing device 2202 is configured to display interactive data to the user, including real-time dashboards that provide up-to-date information about the physical assets of the organization. This enables effective monitoring, management, and decision-making regarding physical assets.

The operations cloud 2214 may utilize advanced data processing and analytics to aggregate and analyze data from diverse sources, ensuring accurate and actionable insights. It may support scalable and secure communication protocols to ensure reliable data exchange between the cloud and the physical assets. Additionally, the operations cloud 2214 may be customized to meet specific operational needs of different industries, facilitating tailored solutions that enhance operational efficiency and productivity.

The data store 2216 may be used to store time series data (and/or non-time series data) including, for example, information relating to locations of centrals 2210 and peripherals 2208 at various times. The operations cloud 2214 may access data from the data store 2216, such as to provide location data of centrals and peripherals to, e.g., users via various user interfaces of user computing device 2202.

The details of the communications methods and processes may be encapsulated in peripheral/central firmware and an ingestion pipeline comprising the ingestion module 2220 and the inference and aggregation ("I/A") module 2218. The ingestion module 2220 may be configured to receive observation and location information from centrals 2210 as a data and/or statistics stream. The ingestion module 2220 may write data and/or statistics directly to the data store 2216 and communicate data and/or statistics to the I/A module 2218.

The I/A module 2218 may be configured to ingest data and/or statistics received from the ingestion module 2220. The I/A module 2218 may parse geolocation and observation stats to determine a timestamp for each event and match timestamps to determine proxy locations of the peripheral 2208. For example, the I/A module 2218 can record geolocation stats, each indicating locations of the Central 2210 at different times, and observation stats, each indicating specific Peripherals and times at which broadcasts were received. The I/A module 2218 can parse these location and observation stats to determine a timestamp for each. The I/A module 2218 can then match geolocation stats to observation stats, such as by determining whether timestamps of the corresponding geolocation and observation events match, e.g., an exact match or within a particular time threshold. Matched geolocation and observation stats can be used to infer a proxy location for the peripheral 2208. This proxy location can be written to the data store 2216 as the location for the peripheral 2208. In some implementations, the proxy locations are used by the operations cloud 2214 in the same manner as locations obtained via direct location determination of devices, such as via a GPS antenna. In some implementations, the operations cloud 2214 may maintain distinctions between proxy and direct locations, such as to allow a user to selectively view proxy and/or direct locations of a Peripheral on a map.

Figure 22C:
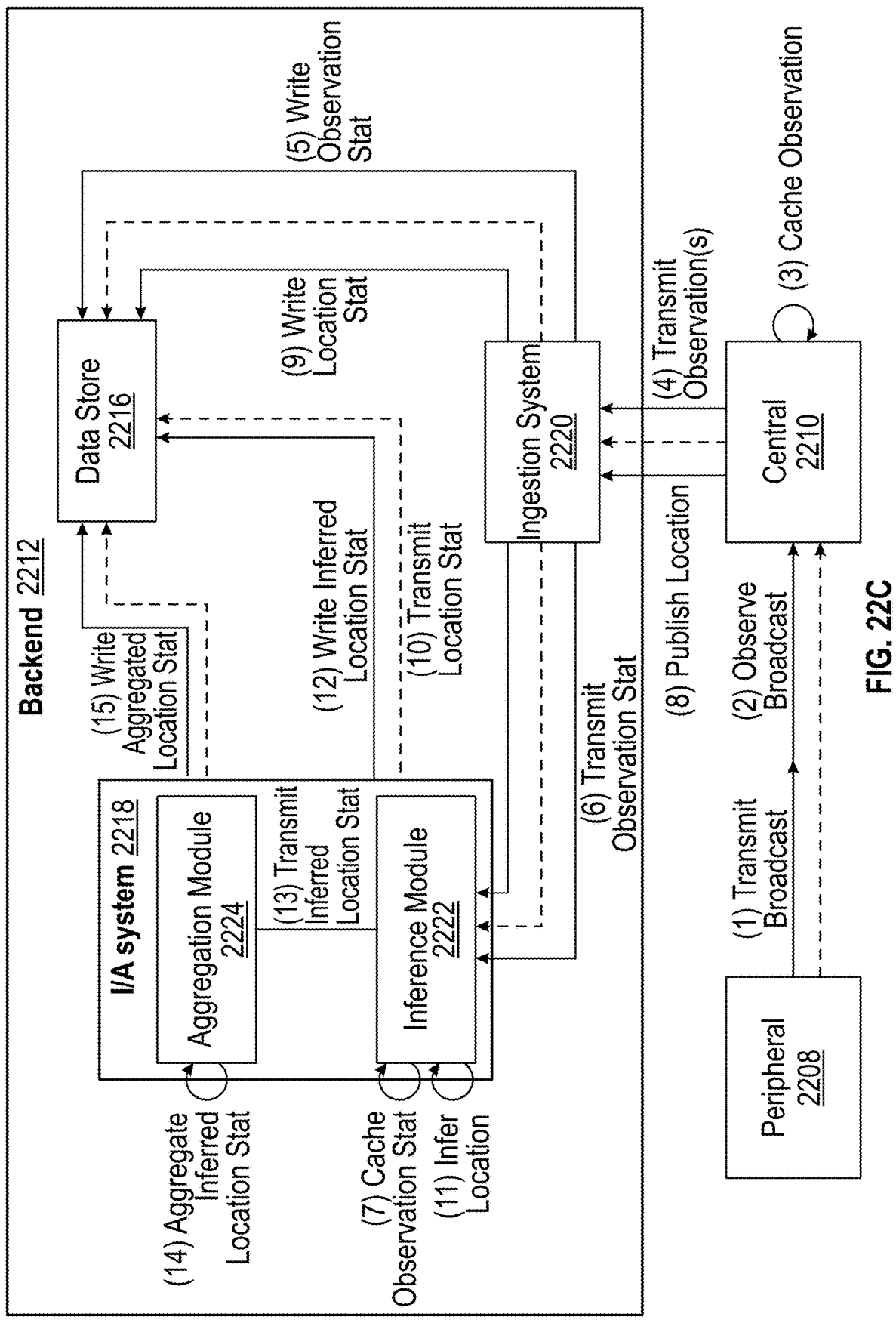
FIG. 22C is a block and data flow diagram illustrating an example operation of the system, according to various implementations.

FIG. 22C is a block and data flow diagram illustrating further example implementation details of communications among various components of the system of, e.g., FIGS. 22A-22B, according to various implementations. In the illustrated example, the I/A module 2218 includes an inference module 2222 and an aggregation module 2224. As discussed in further detail herein, the inference module 2222 can receive observation and location data and/or statistics from the ingestion module 2220, infer a location based on the received information, and write the inferred location to the data store 2216 and/or provide to the aggregation module 2224. The aggregation module 2224 can receive inferred location statistics from the inference module 2222, aggregate the received information, and write the aggregated location statistic to the data store 2216.

An example implementation of the proxy location determination and aggregation is discussed below with reference to actions 1-14 illustrated in FIG. 22C. In various implementations, the processes may be performed by fewer or additional modules, and/or the processes may be performed in an order different than is illustrated.

In the example of FIG. 22C, at action (1) the peripheral 2208 periodically broadcasts a Bluetooth broadcast. Centrals 2210, such as VGs, AGs, or mobile devices configured as centrals, can listen for and receive these broadcasts. A received broadcast may be referred to as an observation, and information associated with the observation as an observation stat. At action (2), the central 2210 observes one or more broadcasts broadcast by the peripheral 2208. At action (3), the central 2210 temporarily stores, or caches, the observation(s), which may be combined with other observations before transmitting to the Backend 2212. Caching of individual observations can allow the central 2210 to conserve cellular data that would otherwise be expended through constant or more frequent connection to the backend 2212, such as by transmitting each individual observation to the backend 2212. At action (4), the central 2210 transmits the cached observations to the backend 2212, such as to an ingestion module 2220 of the backend 2212 that performs stat ingestion operations.

At action (5), the ingestion module 2220 receives the observations from the central 2210 and writes the observations to the data store 2216. Concurrent with action (5), at action (6) the ingestion module 2220 transmits the observations to the inference module 2222. In some implementations, the observations may be transmitted at different times to the inference module and the data store. In some implementations, the inference module 2222 accesses observations from the data store 2216, such that the ingestion module 2220 may not need to separately send the observations directly to the inference module 2222. At action (7) the inference module 2222 caches the observations for association with a location of the central 2210.

At action (8), the central 2210 periodically provides its GPS location (e.g., at regular intervals or in response to a trigger, such as a change of location) to the backend 2212, using the illustrated ingestion module 2220. At action (9), the ingestion module 2220 receives the location information (also referred to herein as "locations" or "location stat") and writes the location stat to the data store 2216. Concurrent with action (9), at action (10) the ingestion module 2220 transmits the location stat to the inference module 2222. In some implementations, the locations may be transmitted at different times to the inference module and the data store. In some implementations, the inference module 2222 accesses location stats from the data store 2216, such that the ingestion module 2220 may not need to separately send the location stats directly to the inference module 2222.

At action (11), the inference module 2222 uses the location and observation stats to infer a location of the peripheral 2208. For example, the inference module 2222 may use the timestamp matching processes described above with reference to FIG. 22A, matching timestamps of location and observation stats to determine proxy locations of the peripheral 2208. At action (12), the inference module 2222 writes the inferred location to the data store 2216.

At action (13), the inference module 2222 transmits the inferred location to the aggregation module 2224. Alternatively, the aggregation module 2224 may access the inferred location from the data store 2216. At action (14), the aggregation module 2224 aggregates inferred locations of Peripherals. For example, the aggregation module 2224 may identify multiple inferred locations of a peripheral 2208 that may be triangulated to generate a more precise inferred location of the peripheral 2208. For example, the ingestion module 2220 may receive observations and location stats from a plurality of centrals 2210 that correspond to a single peripheral 2208. The inference module 2222 may initially access this information and generate a plurality of inferred locations for the peripheral 2208, such as one for each central 2210. These inferred locations may then be accessed by the aggregation module 2224, which may attempt to triangulate a location of the peripheral 2208 based on the inferred locations.

In some implementations, the aggregation module 2224 may receive information about the Bluetooth heuristics of the central 2210 associated with each inferred location, such that for each inferred location a circular range in which the peripheral 2208 may be located may be generated. The aggregation module 2224 can utilize an algorithm and the generated ranges to triangulate a location of the peripheral 2208. The aggregation module 2224 may not use all inferred locations associated with the peripheral 2208. For example, the aggregation module may use only inferred locations associated with a particular time range and discard any outside that range. For example, inferred locations for a peripheral with timestamps that are all within a time range of x seconds (e.g., 1, 2, 3, 4, 5, 10, 20, 30, or 60 seconds) may be used to determine an updated inferred location of the peripheral. In some implementations, the aggregation module 2224 may use machine learning to determine which inferred locations to utilize in triangulation and in performing the actual triangulation of the peripheral 2208 location. If an updated inferred location is determined for a peripheral, the aggregation module 2224 may, at action (15), write the location stat to the data store 2216.

Example Peripheral Security Features and Functionality

Implementations of the present disclosure can advantageously leverage a large network of BLE-capable devices (e.g., Centrals) to detect broadcasts from Peripherals and log their location. Since broadcasts have short range, Centrals can be sure that a Peripheral is near its location and log it to the Backend. This allows customers to track unpowered assets easily and economically, since there is no GPS or WiFi geolocation required. Broadcasts may be detected and/or detectable by Centrals from any organization, which allows for a large network of Centrals to service Peripherals. However, broadcasts are sent over open air without any form of encryption or security. This means that any BLE network listening to broadcasts can detect broadcasts and log them. Additionally, if an observer sees an broadcast, it may be easy to copy the contents of the packet and broadcast it at a later time or at another location (e.g., generate a spoof broadcast). This can result in incorrect location tracking for customers, or disrupted operations in case of a targeted attack. It also allows for a bad actor with a similar BLE network to track devices (e.g., Peripherals) themselves by identifying broadcasts coming from possibly high-profile assets that customers would like to track.

These and additional potential security concerns can include, for example privacy threats, forgery threats, and/or disruption threats (which are described in additional detail below). Various technical solutions to those security concerns can be provided by the systems and methods of the present disclosure (which are described in additional detail herein).

In the case of a privacy threat, a bad actor may have a BLE network that can track Peripherals by using identifying information in the advertisement/broadcast packet (e.g., media access control (MAC) address, Peripheral ID, and/or the like). This threat may be minimized by anonymizing Peripherals. Thus, any identification of a Peripheral by another device acting as a central would not be able to identify a specific Peripheral and track their movement. Additionally, the device's MAC address may be encrypted and decrypted by the Backend.

In the case of a forgery threat, a bad actor may create a fake Peripheral and broadcast/send advertisements/broadcasts pretending to be another device. This threat may be minimized by using Backend authentication of broadcasts. For example, a Peripheral may sign messages with a private key and the Backend may verify the signature with the public key.

In the case of a disruption threat, a bad actor may observe broadcasts from a Peripheral and replay them at another location in the future. This threat may be minimized by the Peripheral using a message counter to prevent the same message from being replayed in the future. Additionally, as described in additional detail below, the system can protect against an attacker spoofing location of a Peripheral.

As described further herein, one or more of these and other security concerns may be addressed using authentication and encryption techniques. In various embodiments, one or more encryption keys may be established on each Peripheral that are usable to, for example, authenticate the Peripherals (e.g., by Centrals and/or the Backend) and/or anonymize the Peripherals. For example, anonymization may be accomplished via a shared encryption key (herein referred to as "global encryption key," or the like) established between a Backend and each Peripheral (e.g., tracked asset), in which the shared encryption key may be used to encrypt Peripheral identifiers (e.g., MAC addresses). The encryption process may utilize, e.g., advanced encryption standard (AES) algorithm to protect the Peripheral ID, ensuring that it cannot be detected or traced by competing BLE networks. Authentication may be accomplished via Peripheral device-specific signing keys (herein referred to as "Device-Specific Keys," or the like) that may be used to sign and authenticate Peripheral broadcasts. Authentication can help maintain the integrity of the BLE broadcast signals, preventing unauthorized devices from sending or receiving sensitive information related to the tracked assets. Further, as described below, the system may use rolling changes to the encryption and/or signature to further enhance security. The Backend Key can be used to authenticate the Backend and communicate securely with it, and the device-specific keys can be used to authenticate each Peripheral device.

Rolling Peripheral Identifier Encryption

In some implementations, an encryption key may be common to all Peripherals and used to encrypt any Peripheral identifying information (e.g., MAC Address, Peripheral ID, serial, and/or the like). The encryption key may be tied to a broadcast packet protocol version, for example, and may be updateable as part of device firmware updates (DFUs).

In some implementations, rolling interval encryption for the device identifier associated with each Peripheral (tracked asset) is employed. By changing the encryption on a predetermined rolling interval, such as every 30 minutes (or shorter or longer depending on specific requirements), the security and anonymity of the Peripherals (and associated assets) can be improved. The MAC address that is advertised alongside the broadcast can be fully randomized every rolling interval. The encryption process may ensure that even if unauthorized parties intercept the BLE broadcast signals, they would not be able to trace or decipher the encrypted device identifier since the key is constantly changing. This rolling interval encryption can help maintain the integrity and security of the asset tracking system by preventing any potential breaches that could reveal sensitive information about the assets' location and identity.

Rolling interval encryption of the device identifier may be accomplished, for example, by periodically rolling/changing a salt to an encryption algorithm (that uses the encryption key) that is used to encrypt the identifier.

In some embodiments, only the device identifying information is encrypted, which allows the Central, without encryption, to still estimate Peripheral location based on signal strength, for example. In some embodiments, only the Backend is able to decrypt the MAC address to identify the device. This encryption verification increases anonymity of broadcasts and decreases ability to identify a specific device beyond the 30-minute window.

In some implementations, the use of an AES hash-based message authentication code (HMAC) algorithm for generating signatures and authenticating messages between a Backend, Centrals, and/or Peripherals is employed. The application of this advanced encryption standard adds an additional layer of security to the system, ensuring that messages cannot be tampered with or forged by unauthorized parties during transmission. Use of encryption allows the system (e.g., the Backend) to verify the authenticity and integrity of messages exchanged between the Backed, Centrals, and Peripherals, thereby preventing any attempts at message manipulation or injection.

The encryption scheme may use a global encryption key with an advanced encryption standard (AES) block cipher comprised of an initialization vector (IV) and an encrypted MAC Address/Peripheral ID. In some cases, the IV may have a size of 6 bytes (or another size) and comprise a nonce, a counter, and a known value. In some cases, the IV may be smaller or larger. In some cases, the encrypted MAC Address/Peripheral ID may have a size of 6 bytes (or another size) and act as the device identifier. In some cases, encrypted MAC Address/Peripheral ID may be smaller or larger. In some cases, the system may use (AES Counter Mode) AES-CTR for encryption as it uses a nonce plus counter model.

In some cases, when the Backend receives a broadcast, it may first decrypt the encrypted device identifier (MAC/Peripheral ID). Once complete, the Backend may locate a signing key and authenticate the packet contents.

Rolling Authentication

As described above, the Device-Specific Keys (which may also be referred to herein as Crux keys), can be unique to each Peripheral and may be derived when the Peripheral device is first set up. In some cases, a device-specific key may be a special symmetric key. The device-specific key may be an AES-128 key (having a size of 16 bytes) that is derived using ECIES/ECDH during manufacturing and is valid for the lifetime of a counter. A signing key may be used to sign the broadcasts to ensure that the packets were generated by an authentic Peripheral device, preventing spoofing.

To further enhance security and prevent replay attacks, the broadcasts may include a rolling authentication mechanism that changes every 30 minutes (or at a shorter or longer interval). This rolling authentication mechanism may include a counter, a nonce/RNG Data, and/or a rolling signature. In some cases, the counter may have a size of 2.5 bytes (or another size), and track the number of steps of the rolling authentication that have passed. The counter may be sized to never overflow. In some cases, the nonce/RNG Data may have a size of 3.5 bytes (or another size) and be a random number used for an interval of authenticating information. In some cases, the rolling signature may have a size of 4 bytes (or another size) and be a signature generated by the signing key using the nonce, counter, and other fields as source data. The rolling authentication algorithm may use hash-based message authentication code (HMAC) with Secure Hash Algorithm 256 (SHA256), resulting in a 32-byte signature that is then truncated to 4 bytes (or another size).

In some cases, when a Central detects a Peripheral, it sends the above described authenticating information, including the rolling signature, up to the Backend for verification. The Backend can then verify that this authenticating information was generated by the proper key to authenticate the device. In some cases, the counter value is important as it may only increment upward. If the Backend receives a counter value below an already seen counter value, it may discard that reading as it is possible it was a replay attack from a bad actor. In some cases, the rolling signature may be generated from a MAC Address, that may have a size of 6 bytes (or smaller or larger size); flag bytes, that may have a size of 2 bytes (or smaller or larger size); a counter that may have a size of 2.5 bytes (or smaller or larger size); a nonce that may have a size of 3.5 bytes (or smaller or larger size); and/or a protocol version that may have a size of 1 byte (or smaller or larger size).

In some embodiments, a broadcast "rolls" every 30 minutes and an internal counter is increased. In some cases, a new HMAC signature is generated every interval using the counter, the packet contents, and optionally some random number generator (RNG) data. RNG data provides unpredictable and non-repeating values to ensure the security and integrity of the data being transmitted. In some cases, once a new counter value is seen, old counter values become invalid. Use of signature verification and counter acceptance increases integrity of data, authenticity of data, and non-replayability of data beyond the 30-minute window (or other time interval length).

Care can be taken for broadcasts/packets observed by Centrals that do not have Backend connectivity. Centrals may hold on to broadcasts and send them up at a later time. This can present a problem because the Backend may automatically discard packets uploaded with counter values below the latest observed counter. To account for this, according to an implementation: (1) Centrals can attach UTC time seen to each observed broadcast packet; (2) the Backend can store the last counter seen along with time seen; (3) if the Backend receives a packet with a counter value below the last seen counter, it can calculate the time seen by rewinding the difference between the last counter value and the uploaded counter value using the rolling authentication interval (for example, 30 minutes). If the calculated time matches the uploaded time, the packet can be accepted. There may be an acceptance window of, e.g., +/−1 (or another number) rolling interval from the calculated value. Reasons for an extended acceptance window can include: (1) the calculated value is not based on the first packet of the window, so the time could be somewhere between 0-30 minutes from window start; (2) Peripherals may not have perfect clocks, so the system can provide allowance for some clock drift; (3) Centrals also may not have perfect clocks and could potentially be off by a few seconds. Extending the acceptance window means that the opportunity for replay attacks is larger depending on the circumstance but can provide an acceptable functionality tradeoff.

Example Security-Related Implementations and Features

Figure 23A:
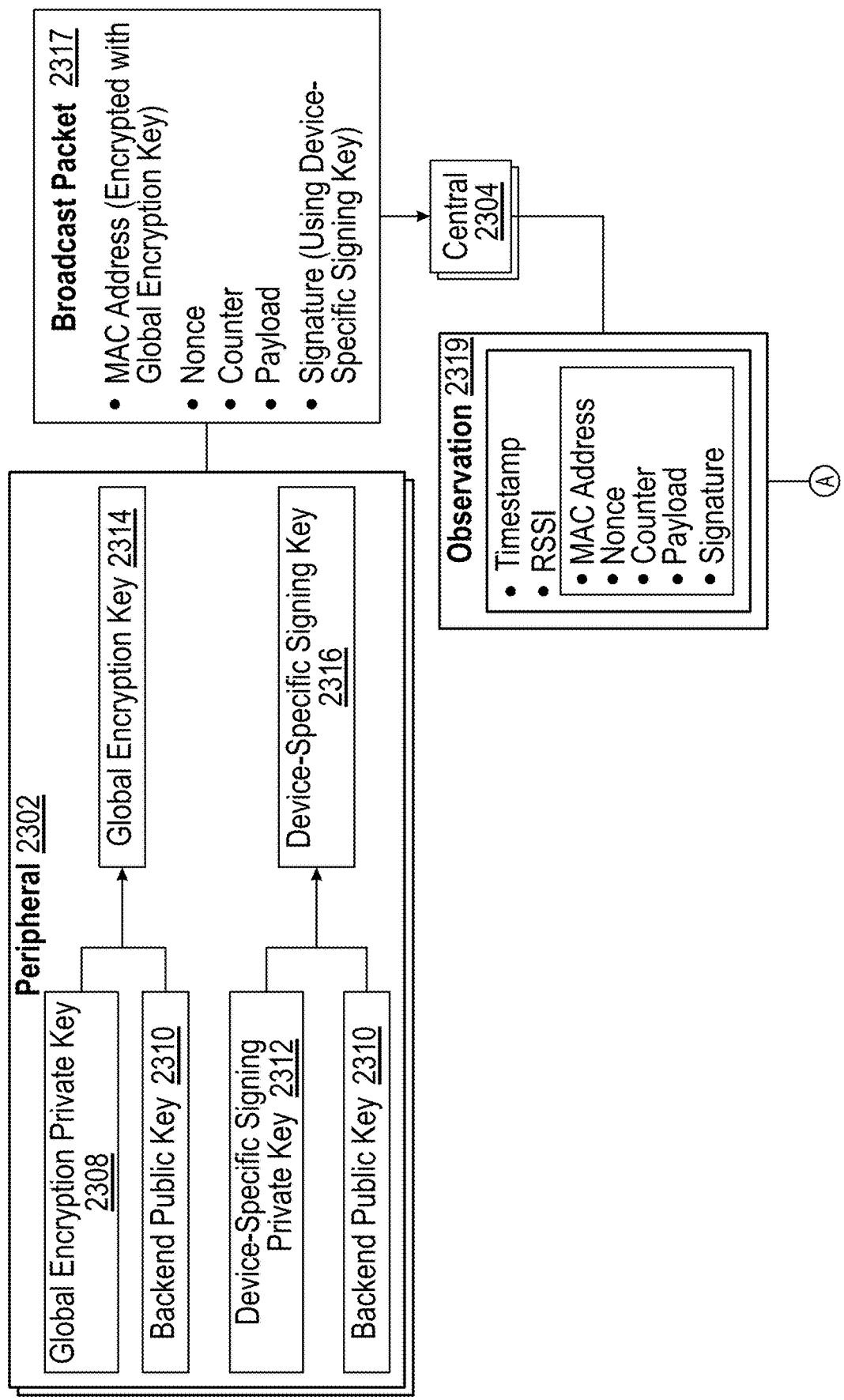
FIG. 23A illustrates an example security architecture of the system, according to various implementations.
Figure 23A:
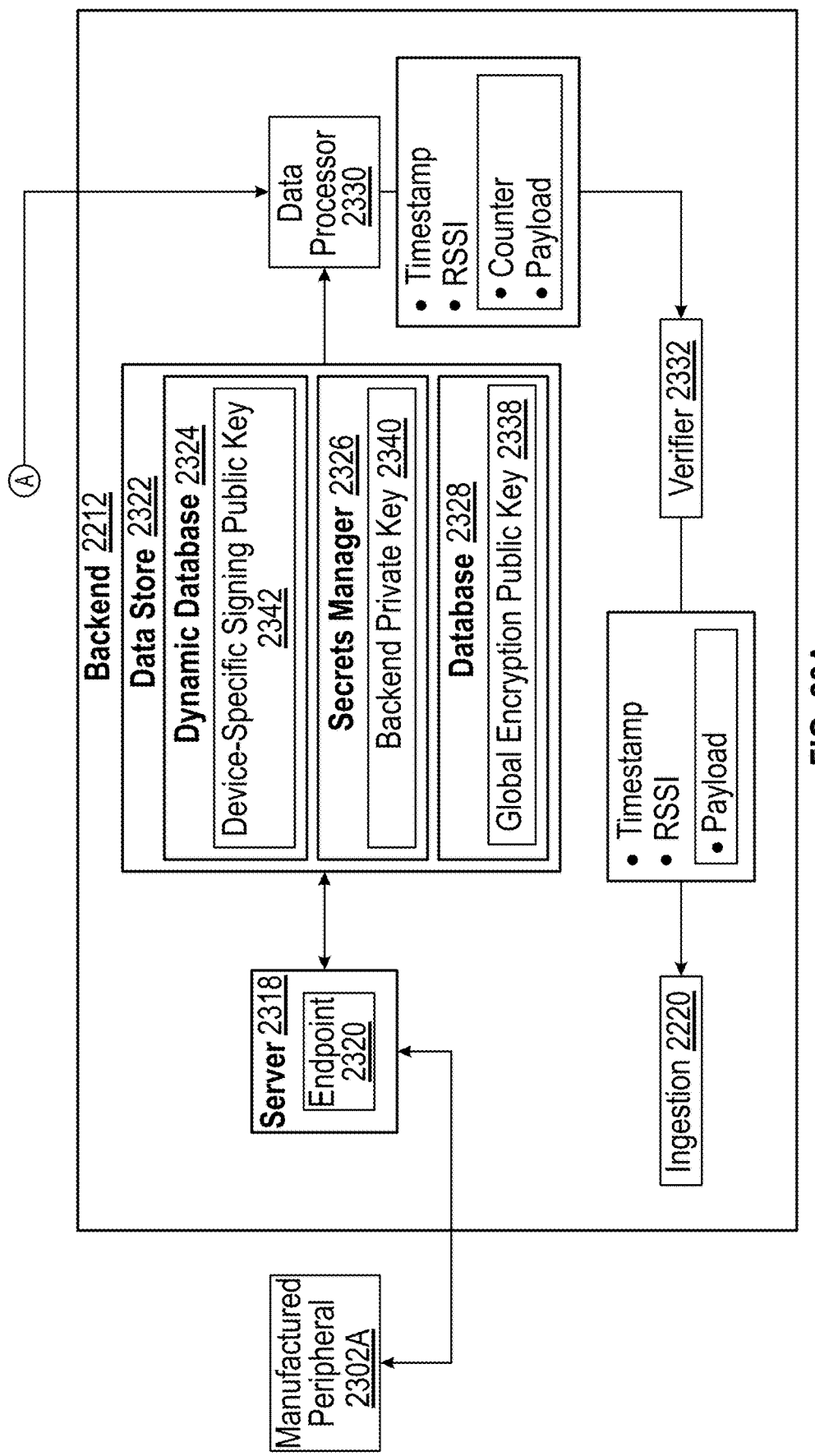
Figure 23B:
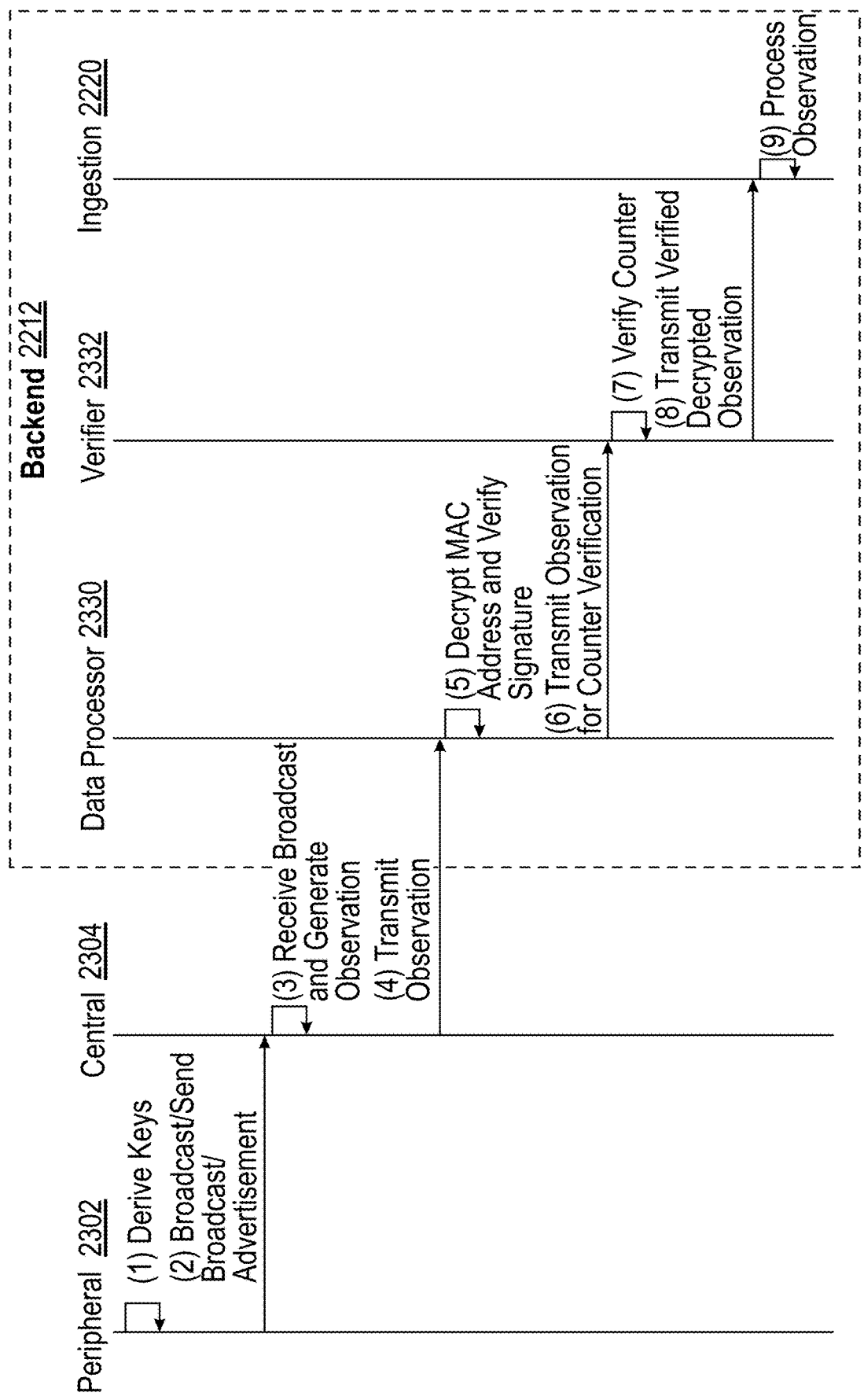
FIG. 23B is a flow diagram illustrating an example of communications among various computing devices and systems, according to various implementations.

FIGS. 23A-23B illustrate an example security architecture of the system, including various Peripherals, Centrals, and the Backend and communications among the various components. As illustrated, each of the Peripherals may include a global encryption key (used for encrypting the Peripheral identifiers (e.g., MAC addresses)) and a device-specific signing private key (used for signing broadcasts for authentication purposes). As further illustrated, the keys may be distributed using public key exchange and/or during manufacture of the Peripherals.

Additionally, as illustrated in FIGS. 23A and 23B, the Backend, upon receiving broadcasts/observations (as communicated to the Backend via a Central), can decrypt the MAC addresses and verify signatures for authentication of the Peripherals. Further, the decrypted and verified broadcasts/observations can go to a verify counter (to protect against replays), and then finally be ingested for further analysis (as described herein). In some cases, the system may not be able to rely on Peripherals to have synchronized time, and may rely on a rolling counter in order to prevent spoofing/replay attacks.

As illustrated in FIG. 23A, the system can include one or more Peripherals 2302, one or more Centrals 2304, the backend 2212, and a manufactured Peripheral 2302A. The manufactured Peripheral 2302A may be a newly manufactured Peripheral 2302.

Peripheral 2302 includes a global encryption private key 2308, a backend public key 2310 (also referred to herein as a backend public encryption key), a device-specific signing private key 2312, a global encryption key 2314, and a device-specific signing key 2316. The global encryption private key 2308 may be an "ephemeral" private key, such that it may only be used for deriving the global encryption key 2314. The backend public key 2310 may be an encryption key used to authenticate and enable secure connection to the backend 2212. The backend public key 2310 may be provisioned to Peripherals 2302 through device firmware updates (DFUs) or as part of firmware flashed to the Peripherals 2302. The backend public key 2310 may be paired with the backend private key 2340 stored securely in the backend 2212.

The system may implement an elliptic curve integrated encryption scheme (ECIES). As part of the scheme, the system may use an Elliptic-Curve Diffie-Hellman (ECDH) key agreement protocol to generate the global encryption key 2314. For example, the global encryption private key 2308 and the global encryption key 2314 may be generated by a firmware system. The global encryption private key 2308 may be provided to the Peripheral 2302 through a DFU, and the global encryption public key 2338 corresponding to the global encryption private key 2308 may be provided to the backend by the firmware system. The Peripheral 2302 may calculate a secret key T using the global encryption private key 2308 and the backend public key 2310. The Peripheral 2302 may then derive the global encryption key 2314 using the secret key T and Secure Hash Algorithm 256 (SHA-265). The backend 2212 can implement the same method to calculate the global encryption key 2314 but unlike the peripheral 2302, the backend 2212 can use the global encryption public key 2338 and the backend private key 2340.

The device-specific signing private key 2312 may be an ephemeral key created by the peripheral 2302 at time of manufacture. The device-specific signing private key 2312 may correspond to the device-specific signing public key 2342 shared with the backend 2212. The Peripheral 2302 may use ECDH, as described above, to derive the device-specific signing key 2316 from the device-specific signing private key 2312 and the backend public key 2310. The backend 2212 may use ECDH, as described above, to derive the device-specific signing key 2316 from the device-specific signing public key 2342 and the backend private key 2340.

In various implementations, other suitable encryption schemes and/or key exchange schemes may be used by the system.

The Peripheral 2302 can broadcast a broadcast packet 2317 containing a MAC address, a nonce, a counter, a payload, and a signature. The MAC address may be encrypted using the global encryption key 2314. The nonce may be a random number used for a specific interval of authentication information. The counter may be an integer. The counter may increment/increase based on a rolling encryption/authentication mechanism that changes at a set time interval. The counter may increase one unit after every time interval. For instance, if the time interval is 30 minutes, the counter may increase every 30 minutes. The time interval may be 30 minutes, or a shorter or longer amount of time. To protect against spoofing, the counter value may be configured such that it can only increase. Additionally, the counter may be configured to be an integer large enough to last the lifetime of the Peripheral without overflowing. To facilitate this, in some cases, if the rolling time interval decreases, the counter size may be increased to ensure the counter lifespan remains constant. The payload may include status information about the Peripheral 2302 for instance, the payload may include information relating to the battery power, temperature, advertising interval, time since last reset, transmit power, or firmware version of the peripheral 2302. As described herein, the signature may be an HMAC generated by the device-specific signing key 2316 using the counter, the nonce, and other fields using, e.g., SHA256. In some cases, the signature may be generated using a different hash-function such as SHA-1, SHA-3, or the like.

Central 2304 may receive the broadcast packet and generate an observation 2319 by attaching a timestamp corresponding to when the central received the broadcast packet as well as an associated RSSI. The central 2304 may attach additional information such as the GPS location of the Central 2304. The central 2304 can communicate the observation to the backend 2212.

In the illustrated example, the backend 2212 includes a data store 2322, a data processor 2330, a verifier 2332, the ingestion module 2220, and a server 2318. The data store 2322 includes a dynamic database 2324, a secrets manager 2326, and a database 2328. The dynamic database 2324 may store device-specific public keys, such as the device-specific signing public key 2342. The dynamic database 2324 may organize device-specific public keys by an associated MAC Address. The secrets manager 2326 may store the backend private key 2340. The database 2328 may store the global encryption public key 2338.

The data processor 2330 may receive the observation from the central 2304 (e.g., via one or more wired or wireless networks, receivers/transceivers, and/or the like, and as described herein). The data processor 2330 may decrypt the MAC address and verify the signature included in the observation by a process described herein with reference to FIG. 24A. Once the MAC address is decrypted and the signature verified, the data processor 2330 can forward a truncated version of the observation to the verifier 2332. The truncated version of the observation may have the MAC Address, nonce, and signature stripped out. The verifier 2332 can verify that the message is not spoofed by checking whether the counter value in the truncated observation has already been seen by the backend 2212. As described above, the verifier 2332 can verify messages with counter values below the latest observed counter value using the timestamp in the observation. Once the packet has been verified, the verifier 2332 may strip out the counter and forward the packet to the ingestion module 2220.

The manufactured Peripheral 2302A may be a newly manufactured Peripheral. During manufacture, manufactured Peripheral 2302A may be flashed with firmware containing the backend public key 2310. Additionally, the manufactured Peripheral 2302A may generate the device-specific signing private key 2312 and the device-specific signing public key 2342. The manufactured Peripheral 2302A may transmit device-specific signing public key 2342 to the backend 2212. This may be accomplished by sending a networked message (e.g., HTTP/HTTPS message) to the server 2318 via a secure channel. The server 2318 may include an endpoint 2320. The networked message may be directed to the endpoint 2320. The server may transmit the device-specific signing public key 2342 to the data store 2322 for storage in the dynamic database 2324.

FIG. 23B is a flow diagram illustrating an example of communications among various computing devices and systems described herein to secure advertisement/broadcast packets broadcast by Peripherals. Although steps are illustrated in a particular order, steps may be performed multiple times, the order of the steps can be changed, and/or one or more steps can be performed concurrently. Additionally, fewer, more, or different steps can be performed. Furthermore, for the purposes of illustrating a clear example, one or more particular systems or system components are described in the context of performing various operations during each of the flow stages. However, other system arrangements and distributions of the processing steps across systems or system components may be used.

At (1), the peripheral 2302 derives the global encryption key 2314 and the device-specific signing key 2316 as described above. The peripheral 2302 then generates the broadcast packet. The peripheral 2302 may use the global encryption key 2314 to encrypt the MAC Address and include the encrypted MAC Address in the broadcast packet. Additionally, as described above, the peripheral 2302 may generate and include in the broadcast packet a signature for the broadcast packet using the device-specific signing key 2316, the nonce, the counter, and other data included in the broadcast packet. At (2), the peripheral 2302 broadcasts the broadcast packet for receipt by a Central.

At (3), the central 2304 receives the broadcast packet and generates an observation by attaching to the broadcast packet, the time of receipt of the broadcast packet by the central 2304 and the RSSI associated with the receipt of the broadcast packet. At (4), the central 2304 transmits the observation to the data processor 2330.

At (5), the data processor 2330 receives the observation from the central 2304. The data processor 2330 then uses a process as described herein with reference to FIG. 24A to decrypt the MAC Address and verify the signature included in the observation. At (6), the data processor 2330 transmits the observation to the verifier 2332.

At (7), the verifier 2332 verifies that the broadcast packet from the peripheral 2302 was not spoofed by an unauthorized device. The verifier 2332 stores the value of the counter provided in the broadcast packet in the data store 2322 as the last counter seen along with the timestamp from the observation. The verifier 2332 conducts verification using the counter by a process described herein with reference to FIG. 24B. At (8), the verifier 2332 transmits the verified and decrypted observation to the ingestion module 2220. At (9), the ingestion module receives and processes the observation as described herein with reference to FIG. 22C.

Figure 24A:
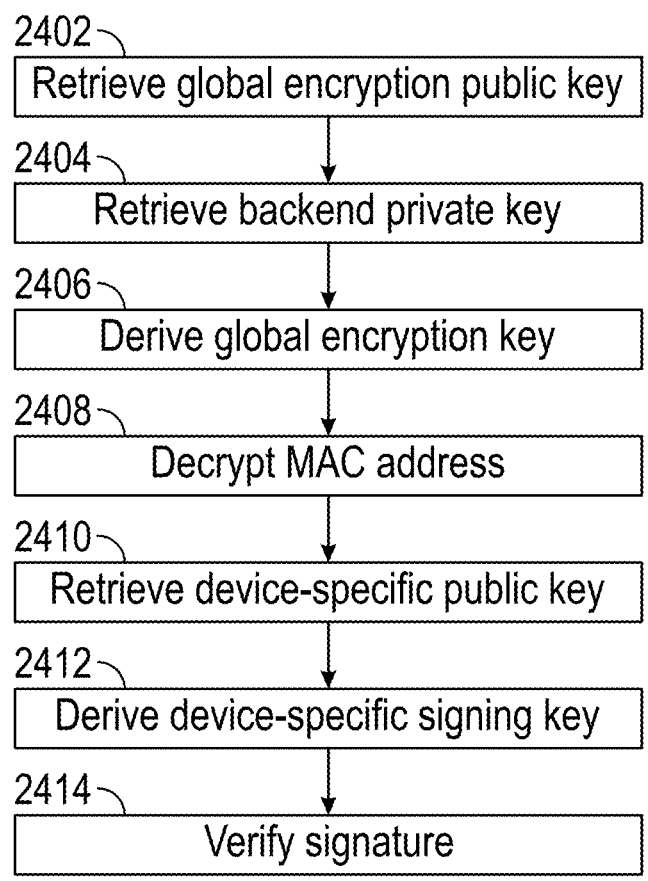
FIGS. 24A-24C are flowcharts illustrating example processes performed by various components of the system, according to various implementations.
Figure 24B:
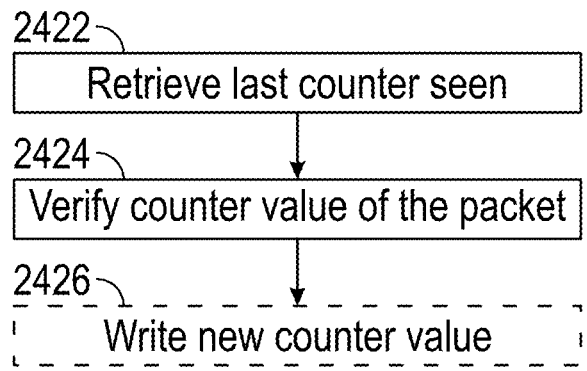
Figure 24C:
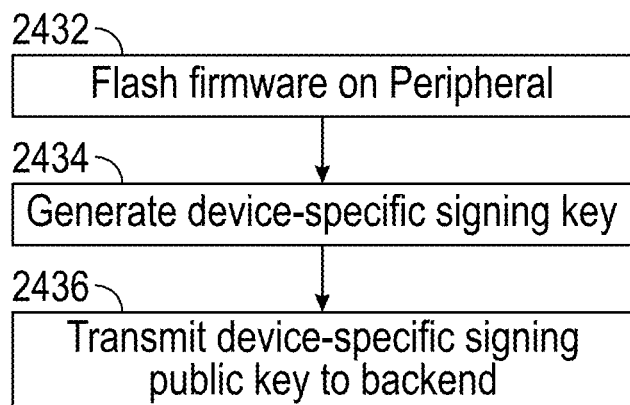

FIGS. 24A-24C are flowcharts illustrating example processes performed by components of the backend 2212 (as illustrated in FIG. 23A) to secure broadcast packets broadcast by Peripherals. Although steps are illustrated in a particular order, steps may be performed multiple times, the order of the steps can be changed, and/or one or more steps can be performed concurrently. Additionally, fewer, more, or different steps can be performed. Furthermore, for the purposes of illustrating a clear example, one or more particular systems or system components are described in the context of performing various operations during each of the data flow stages. However, other system arrangements and distributions of the processing steps across systems or system components may be used.

FIG. 24A is a flow diagram illustrating an example process for decrypting a MAC Address and verifying a signature contained in an observation received by the backend 2212 from the central 2304. As illustrated in FIG. 24A, the Backend, upon receiving broadcasts/observations (as communicated to the Backend via a Central), can decrypt the MAC addresses and verify signatures for authentication of the Peripherals. This process may comprise: (1) retrieving a global encryption public key; (2) retrieving a backend private key; (3) deriving a global encryption key using ECDH on the global encryption key and backend private key; (4) decrypting a MAC address using the global encryption key, a nonce, and a counter; (5) retrieving a device-specific signing public key by HardwareID (for example, MAC address); (6) deriving a device-specific signing key using ECDH on the device-specific signing public key and backend private key; and (7) verifying a packet signature (HMAC) using the device-specific signing key.

In additional details, at block 2402, the data processor 2330 retrieves the global encryption public key 2338 from the dynamic database 2324. At block 2404, the data processor 2330 retrieves the backend private key 2340 from the secrets manager 2326. At block 2406, the data processor 2330 uses ECIES as described above to derive the global encryption key 2314 from the global encryption public key 2338 and the backend private key 2340. At block 2408, the data processor 2330 utilizes the global encryption key 2314 along with the nonce and counter included in the broadcast packet to decrypt the MAC Address included in the broadcast packet.

At block 2410, the data processor 2330 retrieves the device-specific signing public key 2342 from the dynamic database 2324 using the decrypted MAC Address. At block 2412, the data processor 2330 uses ECIES as described above to derive the device-specific signing key 2316 from the device-specific signing public key 2342 and the backend private key 2340. At block 2414, the data processor 2330 uses the device-specific signing key 2316 to verify the signature included in the broadcast packet. To verify the signature, the data processor 2330 may use the payload, counter, and nonce, included in the broadcast packet along with the device-specific signing key 2316 to generate an expected signature. The data processor 2330 may compare the expected signature to the signature included in the broadcast packet. If the signatures match, it can indicate that the packet information was not tampered with during broadcast from the Peripheral or transmit from the Central and that the message came from an authorized device. Additionally, it can indicate that the message came from the device associated with the decrypted MAC address.

FIG. 24B is a flow diagram illustrating an example process for verifying the source of a broadcast packet using a rolling encryption/authentication interval. As described above, the peripheral 2302 can comprise a counter and can increase the value of the counter after each interval. At block 2422 the verifier 2332 retrieves the last counter seen from the data store 2322.

At block 2424, the verifier 2332 compares the counter value contained in the observation (observed counter) with the last counter seen. In the illustrated example, the counter value can only increase. The verifier 2332 can compare the observed counter to the last counter seen to determine whether the observed counter has a higher value than the last counter seen. If the observed counter has a higher value than the last counter seen, then the verifier may transmit the observation to the ingestion module 2220.

As described herein, in some cases, the central 2304 stores several observations before sending them to the backend 2212, such as when a network connection to the backend 2212 is unavailable. When the central 2304 sends these observations, the included counter values may be lower than the last counter seen. If the observed counter has a lower value that the last counter seen, the 2332 may use the timestamp associated with the last counter seen to determine whether the observation is valid. The verifier 2332 may calculate an expected upload time for the observation using the difference between the observed counter and the last counter seen along with the interval for the rolling encryption/authentication mechanism. For example, if the observed counter value is 5, the last counter seen is 10, the timestamp associated with the last counter seen is 11:30 am, the counter increases 1 unit every interval, and the interval is 30 minutes, the verifier 2332 may calculate an expected timestamp for the observed counter as 9:00 am ((10−5)*30 minutes=150 minutes, and 11:30 am−150 minutes=9:00 am). If the expected timestamp matches the timestamp associated with the observation, the verifier may transmit the observation to the ingestion module 2220.

There may be an acceptance window of +/−1 (or another number) rolling interval from the calculated value to account for clock drift in Peripherals and Centrals as well as scenarios including when the calculated value is not based on the first packet of the window. For example, if the observed counter value is 5 with a timestamp of 9:01 am, the last counter seen is 10 with a timestamp of 11:38 am, the counter increases 1 unit every interval, the interval is 30 minutes, and the interval rolls over at the top of and every half hour, the verifier 2332 may calculate an expected timestamp for the observed counter as 9:08 am. The acceptance window enables the verifier 2332 to accept the packet even though there is a mismatch between the observed counter timestamp of 9:01 am and the expected timestamp of 9:08 am, since the observed timestamp falls within the acceptance window.

At block 2426, the verifier 2332 may write a new counter value to the data store 2322. If the observed counter is lower than the last seen counter, the verifier 2332 may determine not to write a new counter value to the data store 2322. If the observed counter is higher than the last seen counter, the verifier 2332 may write the observed counter value and its associated timestamp to the data store 2322 as the last seen counter.

FIG. 24C is a flow diagram illustrating an example process for setting up encryption and authorization protocols on a Peripheral at time of manufacture. At block 2432, firmware is flashed on to the manufactured Peripheral 2302A. The firmware may contain the backend public key 2310.

At block 2434, the manufactured Peripheral 2302A generates the device-specific signing private key 2312 and the device-specific signing public key 2342. The device-specific signing private key 2312 may be a randomly generated number. The device-specific signing private key 2312 may have a size of 32 bytes (or may be smaller or larger). In some cases, the device-specific signing private key 2312 may be stored in non-volatile memory in secure storage on the manufactured Peripheral 2302A. In some cases, the device-specific signing private key 2312 may be stored off-chip and encrypted at rest using a randomly generated key stored on the device. The device-specific signing public key 2342 may be a point on an elliptic curve calculated using the device-specific signing private key 2312.

At block 2436, the manufactured Peripheral 2302A transmits the device-specific signing public key 2342 to the backend 2212. In some cases, the manufactured Peripheral 2302A assembles a key container with the device-specific signing public key 2342, MAC address, and signature, and transmits the container to the backend 2212. In some cases, the container may be part of a networked message transmitted to the server 2318.

Figure 25:
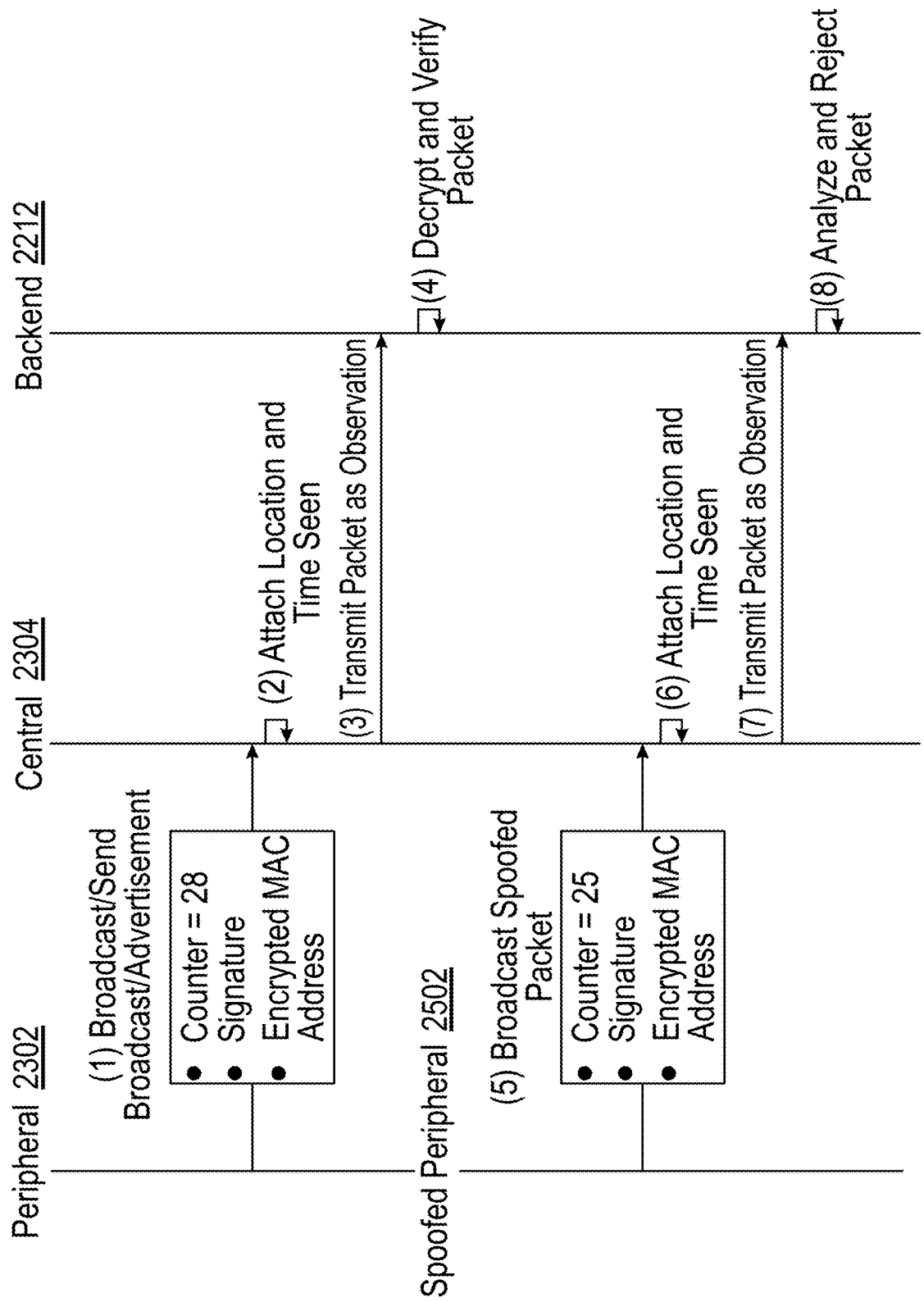
FIG. 25 is a flow diagram illustrating an example of communications among various computing devices and systems, according to various implementations.

FIG. 25 is a flow diagram illustrating an example of communications between various computing devices and systems described herein to, e.g., authenticate and verify broadcast packets from Peripherals to protect against spoofed broadcasts. Although steps are illustrated in a particular order, steps may be performed multiple times, the order of the steps can be changed, and/or one or more steps can be performed concurrently. Additionally, fewer, more, or different steps can be performed. Furthermore, for the purposes of illustrating a clear example, one or more particular systems or system components are described in the context of performing various operations during each of the flow stages. However, other system arrangements and distributions of the processing steps across systems or system components may be used.

The environment illustrated in FIG. 25 comprises a spoofed peripheral 2502. The spoofed peripheral 2502 may be a device capable of intercepting broadcast packets broadcast by a non-spoofed Peripheral, such as peripheral 2302. The spoofed peripheral 2502 may be capable of rebroadcasting the intercepted broadcast packet. In some cases, the spoofed peripheral 2502 may be capable of replicating the received broadcast packet and broadcasting the replica (spoofed broadcast packet).

At (1), the peripheral 2302 broadcasts a broadcast packet. The packet may comprise a counter, signature, and encrypted MAC Address. At (2), the central 2304 receives the packet. As described above, the central 2304 can append the location of the central 2304 and the timestamp associated with receipt of the broadcast packet to the broadcast packet to generate an observation. At (3) the central 2304 transmits the observation to the backend 2212. At (4), as described above with reference to FIGS. 24A and B, the backend decrypts the MAC Address, verifies the signature, and verifies the counter, including setting the counter value in the broadcast packet as the last seen counter.

At (5) a spoofed peripheral 2502 broadcasts a spoofed broadcast packet, which may be a broadcast packet broadcast by the peripheral 2302 that was intercepted by the spoofed peripheral 2502. Since the spoofed broadcast packet is a packet re-broadcast at a later time than originally broadcast, the counter value in the spoofed broadcast packet may have a lower value than the counter value in the broadcast packet broadcast at (1). As illustrated, the counter value at (1) was 28, but the counter value at (5) is 25. At (6) the central receives the spoofed packet. As described above, the central 2304 can append the location of the central 2304 and the timestamp associated with receipt of the spoofed packet to the spoofed packet to generate an observation. At (7) the central 2304 can transmit the spoofed packet to the backend 2212. At (8), the backend 2212 can analyze and reject the packet. Since the spoofed packet contains a copy of the encrypted MAC address and signature, the backend 2212, by the data processor 2330, may be able to decrypt the MAC address and verify the signature. However, since the counter value is lower than the last seen counter, which was set at (1), the backend 2212, by the verifier 2332, can reject and discard the packet.

Example Anonymization and Organization-Related Features and Functionality

As shown in the example of FIG. 13B, described above, a particular Peripheral may be tracked on a map displayed to users. To increase privacy of Centrals and their associated organizations, Peripheral locations inferred from Centrals that are outside an organization may be excluded from display to users within the organization. For example, in some embodiments, the locations of Peripherals that have been determined by Centrals associated with a particular organization may not be available as options for selection by users of other organizations.

In the example of FIG. 13B, the user has the option to display proxy locations of the Peripheral from a second organization on the map along with proxy locations of the Peripheral from Centrals within the organization by selecting the check box next to "Central (out of org)". In this case, the Centrals associated with the second organization may have been authorized to share with other organizations to improve location tracking of Peripherals that are near Centrals associated with the second organization. In some implementations, organizations are provided an opportunity to opt-in or opt-out of sharing their Centrals' locations as proxy locations of Peripherals associated with other organizations.

In some implementations, organizations are provided an option of sharing their Centrals' locations as proxy locations of Peripherals associated with other organizations without providing any identifying information about the specific Centrals (or the organization) to users of other organizations. For example, Centrals of an organization can be configured to determine whether Peripherals from which broadcast packets are received are in or out of network (e.g., associated with the same organization and/or have other specified characteristics). For those Peripherals that are outside of the organization, a limited amount of information may be provided to users, such as by not including (or otherwise anonymizing) identity information of the Centrals and/or the organization when displaying Peripheral location information (and/or when Centrals provide information to the Backend).

Figure 26A:
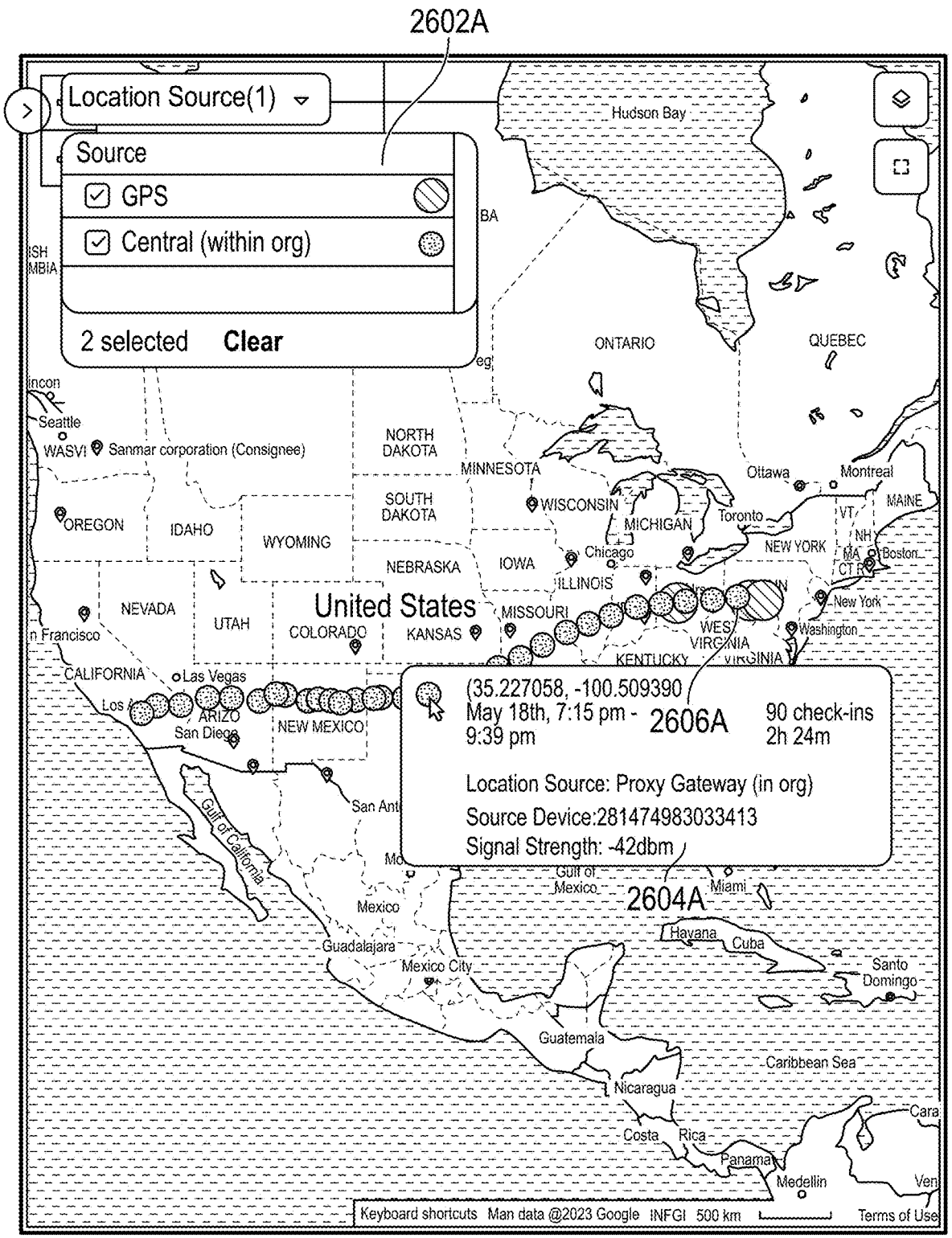
FIGS. 26A-26B illustrate example interactive graphical user interfaces of the system, according to various implementations.
Figure 26B:
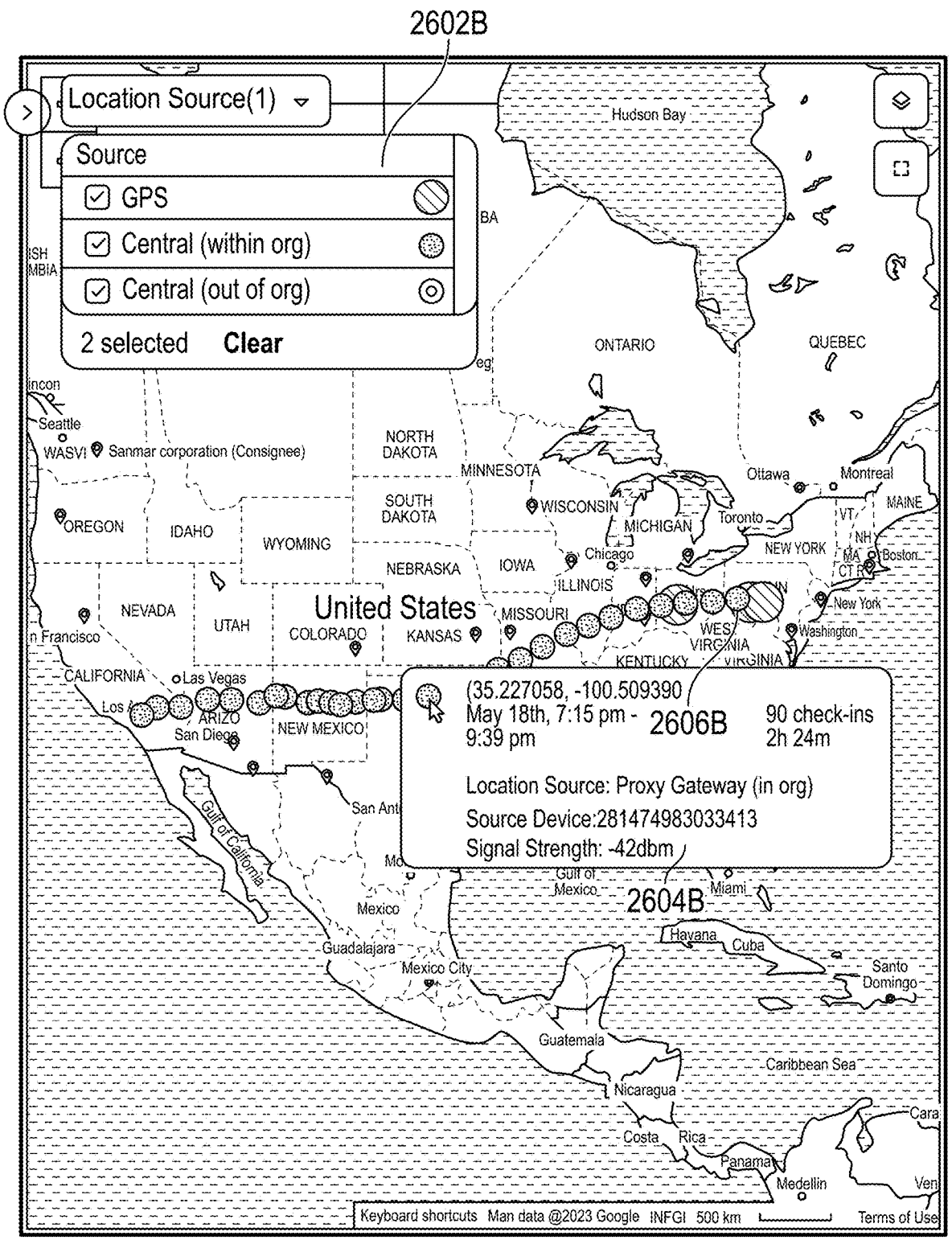

FIGS. 26A and 26B illustrate further example interactive graphical user interfaces of the system, including a map that shows the location of a Peripheral, according to various embodiments. The map can include indicators 2606 (also referred to as "markers") that show the location of the Peripheral over time, a dropdown 2602 that can allow a user to select which location points to show on the map (e.g., by filtering based on organization attributes of one or more Centrals), and an information bubble 2604 that can display information about a specific location point. In some implementations the information bubble 2604 may be hidden until and/or unless a corresponding marker is selected by a user, at which point it can become visible. For example, selecting a marker may comprise clicking on, hovering over, or otherwise interacting with the marker.

FIG. 26A illustrates an example implementation in which only peripheral locations associated with in-org centrals are available for display on the map to an in-org user. As illustrated, dropdown 2602A includes an option to select GPS and in-org centrals as sources but does not include an option to select out-of-org centrals as sources. As illustrated, the user has selected an indicator 2606A associated with an in-org central. Because the selected indicator corresponds to an in-org central, the information bubble 2604A can include identification information about the central including that the location source is in-org, the source identifier, time elapsed since the last reporting, number of check ins, and/or the like. The information bubble 2604A can also include observation information such as latitude and longitude, time when the location was reported, and signal strength. In some cases, more, less, or different information may be displayed.

FIG. 26B illustrates an example implementation in which peripheral locations associated with both in-org and out-of-org centrals are available for display on the map to an in-org user. In the illustrated example, an out-of-org organization, Organization B, has permitted using its centrals for location tracking and has authorized sharing anonymized data with users unassociated with Organization B. As illustrated, dropdown 2602B includes an option to select GPS, and both in-org and out-of-org centrals as sources, and all three options are selected. The map includes indicators 2606B associated with both in-org and out-of-org centrals. As illustrated, the user has selected an indicator 2606B associated with an out-of-org central. Because the selected indicator corresponds to an out-of-org central, the information bubble 2604B may include observation information such as latitude and longitude, time when the location was reported, and signal strength. But the information bubble 2604B may anonymize identification information about the central by not including Central information such as the source identifier, time elapsed since the last reporting, number of check ins, and/or the like. Additionally, the location source may be anonymized to just indicate that the location came from a proxy gateway. In some cases, more, less, or different information may be displayed.

In some implementations, the Backend can determine whether to include Peripheral location information from a particular Central in the user interface based on whether the Peripheral is included on an "allow list" for the Central, and/or whether the Central is on an "allow list" for the organization. Inclusion on the "allow list" can indicate that the Organization associated with the Central has opted-in to sharing anonymized location information with the Organization associated with the Peripheral and vise-versa.

Allow List for Peripheral Connections

Figure 27A:
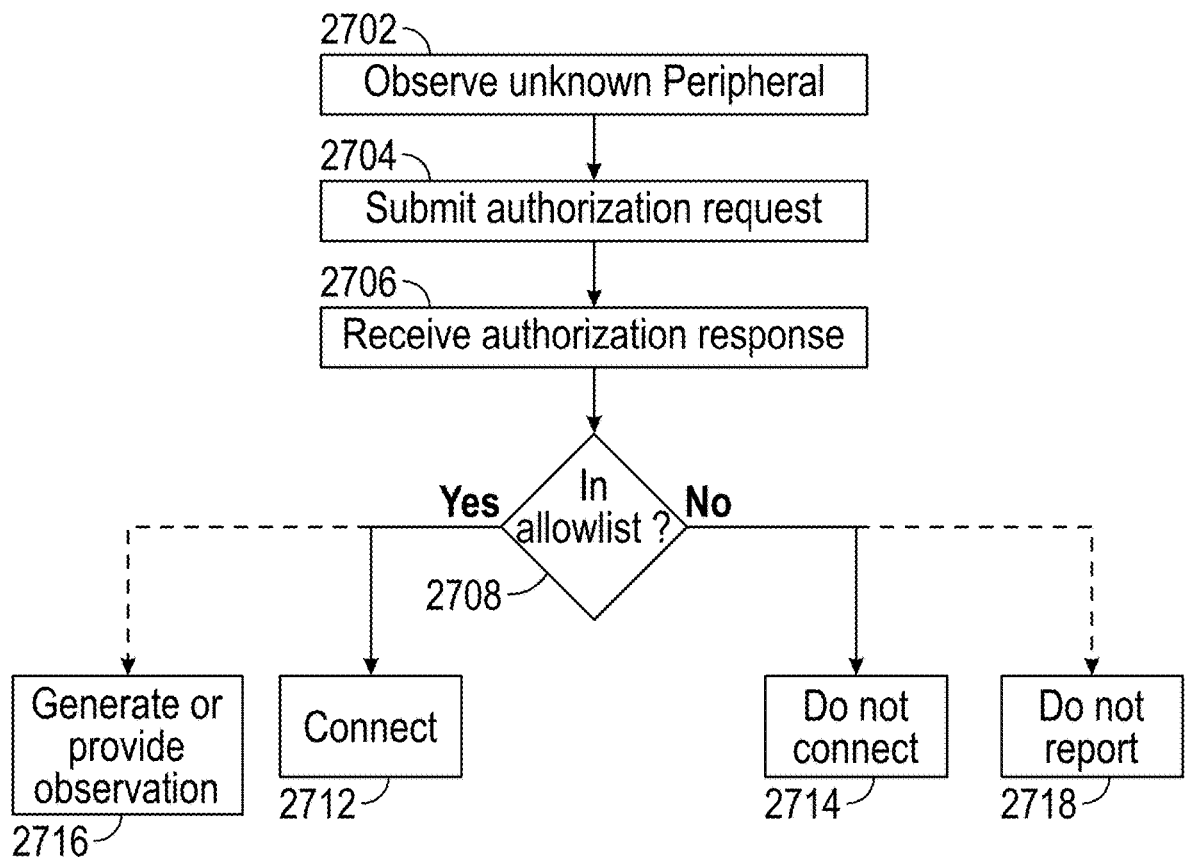
FIGS. 27A-27B are flowcharts illustrating example processes of the system, according to various implementations.

FIG. 27A is a flowchart illustrating an example of how a Central determines whether to communicate with a Peripheral, such as based on whether the Peripheral is included on an "allow list" maintained by the Backend. Although steps are illustrated in a particular order, steps may be performed multiple times, the order of the steps can be changed, and/or one or more steps can be performed concurrently. Additionally, fewer, more, or different steps can be performed. Furthermore, for the purposes of illustrating a clear example, one or more particular systems or system components are described in the context of performing various operations during each of the flow stages. However, other system arrangements and distributions of the processing steps across systems or system components may be used.

In some implementations, broadcasts from Peripherals may include a MAC address that is encrypted and the organization associated with the Peripheral may not be known. The allow list may be accessed to determine whether a connection to individual Peripherals is allowed, such as based on determination of an organization associated with a decrypted MAC address at the Backend. In this context, a "connection" generally refers to bi-directional communication (or bi-directional connection) between the Central and Peripheral, allowing for setting configurations (e.g., transmit power or advertising interval) and/or updating the Peripheral's firmware. In contrast, a broadcast is generally a one-way transmission from a Peripheral.

As shown in FIG. 27A, when a Central identifies an advertising packet from a new or unknown Peripheral, it may send a request to the Backend to determine if a connection to the Peripheral is authorized. The request may include an encrypted Peripheral ID, which the Backend decrypts and checks against the allow list. If the Peripheral is on the allow list, the Central can connect to it.

In certain implementations, the allow list is maintained on the Backend and the Central caches allow list information (e.g., allowed and/or disallowed Peripherals), such as for a specific period (e.g., 30 minutes) before allowing it to be deleted or overwritten. Thus, the Central may first check the cache before sending a request to the Backend to determine if a connection is authorized. If rolling authentication information of Peripherals is included in broadcasts, cached allow list information may only be valid for the rolling time period (e.g., 30 minutes). In some cases, the cache is assigned a predetermined size and purges older entries in a first-in-first-out manner. In some implementations, the Backend endpoint that is used for determining whether connections are allowed with a Peripheral may be different than an endpoint that is used to receive location information (of the Central and associated Peripherals) at the Backend. This separation of concerns may improve privacy and security.

The system may support "opt out" functionality as some customers/orgs may be sensitive to their peripherals' data flowing through other organizations' gateways and vice versa. In various implementations, in a public network, any central may upload any peripheral's stat, regardless of in-org or out-of-org. The central can thus upload any public peripherals it sees. Thus, a customer may benefit from all organizations' centrals reporting Peripherals locations. In various implementations, private centrals may only upload peripherals which are in its organization. In this case, the central must check the allow list before uploading a stat for it. On the peripheral side, there may be a flag to indicate it is a private peripheral. Centrals may check the allow list for any private peripheral they see.

To avoid saturating nearby Centrals when, e.g., there is a pallet of Peripherals nearby to be connected to, when Peripherals leave the factory, they may be configured to advertise at a less frequent rate and at lower power. For example, they may periodically advertise as connectable, and a field of the broadcast packet may contain a particular value to communicate they are in shipping mode. For example, the broadcast packet broadcast by a Peripheral may contain a "days_since_connection" field, which may be set to 1 (or some other indicator of flag) to communicate that the Peripheral is in shipping mode. Centrals may have to check the allowlist to determine whether or not they can connect to the Peripheral and until a customer activates, the Peripheral may not show up in any allowlist. Once the Peripheral is activated and appears in the allowlist, an in-org Central may connect, configure (and possibly update), the Peripheral. At this point, the Peripheral can resume customer mode with normal TX power and advertising interval.

The example process illustrated in FIG. 27A may be performed with reference to components in FIG. 23A. In the illustrated example of FIG. 27A, the central 2304 may be associated with Organization A. At block 2702, the central 2304 receives a broadcast packet from the peripheral 2302. The central 2304 may not recognize the peripheral 2302. This may be because the central has not previously received a broadcast packet from the peripheral 2302, the central 2304 has cleared its cache since it previously received a broadcast packet from the peripheral 2302, the encrypted MAC address of the peripheral 2302 has changed since the central 2304 previously received a broadcast packet from the peripheral 2302, or a different reason.

At block 2704, the central 2304 submits an authorization request to the backend 2212. The request may include an encrypted MAC address (peripheral identifier) included in the broadcast packet received from the peripheral 2302. The request may also be directed at an endpoint of the server 2318 associated with allowlist verification. The backend 2212 may receive the request from the central 2304, decrypt the MAC address and compare the peripheral identifier against the allowlist associated with Organization A. In some implementations, the authorization request may be sent for authorization to perform actions related to the peripheral 2302, such as to connect to the peripheral 2302, to report the broadcast from the peripheral 2302, or both.

At block 2706, the central receives a response from the backend 2212 informing the central 2304 whether or not it is authorized to perform actions related to the peripheral 2302. The central 2304 may cache the information received from the backend 2212 for a period of time, for example 30 minutes (or some other period of time). If the central 2304 receives another broadcast packet from the peripheral 2302 before the cache is cleared, the central can check its internal cache for authorization instead of transmitting a request to the backend 2212.

At block 2708, the central 2304 analyzes the response and determines whether to perform an action related to the peripheral 2302. If the central 2304 determines to connect, at block 2712, the central 2304 establishes a connection with the peripheral 2302. If the central 2304 determines not to connect, the process may end at block 2714 and no connection is established. As described above, such connections can include bi-directional communication between the Central and Peripheral, allowing for setting configurations (e.g., transmit power or advertising interval) and/or updating the Peripheral's firmware.

If the Central 2304 determines to report the broadcast received from the Peripheral 2302, at block 2716, the Central 2304 can generate an observation of the broadcast received from the Peripheral 2302 at block 2702 and transmit the observation to the Backend 2212. In some implementations, the Central 2304 may be configured to automatically generate an observation for any broadcast received. Accordingly, at block 2716, the Central 2304 may determine to provide the automatically generated observation to the Backend 2212. If the Central 2304 determines not to report the broadcast received from the Peripheral 2302, the process may end at block 2718 and no observation is transmitted to the Backend 2212.

In some implementations, the Central 2304 may determine to connect to the Peripheral 2302 and report the broadcast received by the Peripheral 2302. In some implementations, the Central 2304 may determine to report the broadcast received by the Peripheral 2302 but not connect to the Peripheral 2302. In some implementations, the Central 2304 may determine to connect to the Peripheral 2302 but not report the broadcast received by the Peripheral 2302. In some implementations, the Central 2304 may determine not to connect to the Peripheral 2302 or report the broadcast received by the Peripheral 2302.

Figure 27B:
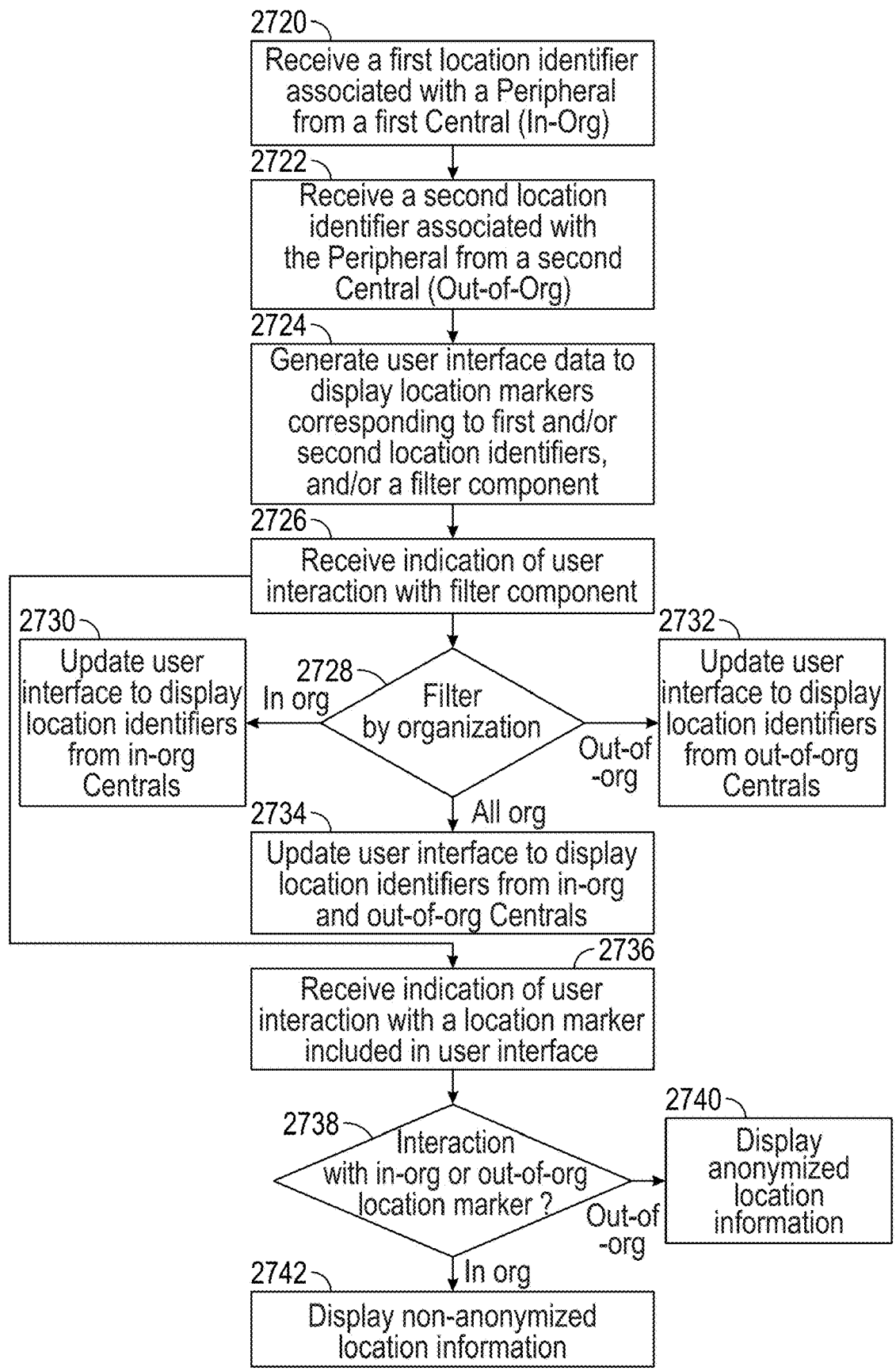

FIG. 27B is a flowchart illustrating example processes of the Backend associated with, e.g., interactive graphical user interface functionality. Some example interactive graphical user interfaces of the system, including the Backend, are described with reference to FIGS. 26A and 26B. Such user interface functionality can relate to interaction with an in-org Peripheral with Peripheral locations from an out-of-org Central. Referring to FIG. 27B, although steps are illustrated in a particular order, steps may be performed multiple times, the order of the steps can be changed, and/or one or more steps can be performed concurrently. Additionally, fewer, more, or different steps can be performed. Furthermore, for the purposes of illustrating a clear example, one or more particular systems or system components are described in the context of performing various operations during each of the flow stages. However, other system arrangements and distributions of the processing steps across systems or system components may be used.

The example process illustrated in FIG. 27B may be performed with reference to components in FIG. 23A. In the illustrated example of FIG. 27B, the Central 2304 may be associated with Organization A, and the Peripheral 2302 may be associated with Organization B. At block 2720, the Backend 2212 receives a first location identifier associated with a Peripheral from a first Central. In the illustrated example, the first Central is associated with the same organization as the Peripheral. The location identifier may correspond to a location of the first Central at or near the time of receipt by the first Central of a broadcast packet from the Peripheral.

At block 2722, the Backend 2212 receives a second location identifier associated with the Peripheral from a second Central. In the illustrated example, the second Central is associated with a different organization than the Peripheral. The location identifier may correspond to a location of the second Central at or near the time of receipt by the second Central of a broadcast packet from the Peripheral.

At block 2724, the Backend 2212 generates user interface data to display location markers (also referred to herein as "markers") corresponding to the first and/or second location identifier, and/or a filter component. The user interface data may be used to generate a user interface such as that illustrated with reference to FIGS. 26A and 26B. For example, the user interface may comprise a geographic map including markers of the first and/or second location identifier. For example, the filter component may correspond to dropdown 2602A or dropdown 2602B. Additionally, the location identifiers may correspond to location markers on the map, such as indicator 2606B.

In some implementations, a user may determine to interact with the filter component. Accordingly, at block 2726, the Backend can receive indication of user interaction with the filter component. This may be by selecting or deselecting a selection box next to one or more sources displayed in the filter component.

At block 2728, the Backend can determine to filter by organization. For example, a user may have selected in-org Centrals. In such case, at block 2730, the Backend can update the user interface to display location markers corresponding to observations received/reported by in-org centrals. In another example, a user may have selected out-of-org Centrals. In such case, at block 2732, the Backend can update the user interface to display location markers corresponding to observations received/reported by out-of-org Centrals. In another example, a user may have selected both in-org and out-of-org centrals. In such case, at block 2734, the Backend can update the user interface to display location markers corresponding to observations received/reported by in-org and out-of-org Centrals. In some implementations, the user interface may display location markers corresponding to both in-org and out-of-org centrals by default.

In some implementations, the user may determine not to interact with the filter component, and the process may continue from block 2724 to block 2736. At block 2736, the Backend can receive an indication of a user interaction with a location marker, such as such as indicator 2606B, included in the user interface. This may include the user clicking on, hovering over, or otherwise interacting with a marker. In response, the Backend may determine to display a detail information indicator, such as information bubble 2604A or information bubble 2604B.

At block 2738, the Backend can determine whether the user interaction corresponds to a marker associated with a location identifier corresponding to an in-org or out-of-org Central. If the Central is out-of-org, at block 2740, the Backend can determine to populate the detail information indicator with anonymized location information of the Central, such as that illustrated by information bubble 2604B. For example, the Backend may determine to include location information about the Peripheral but may determine not to include Central information such as source identifier, time elapsed since last reporting, number of check-ins, and/or the like. If the Central is in-org, at block 2742, the Backend can determine to populate the detail information indicator with non-anonymized location information of the central, such as that illustrated by information bubble 2604A. For example, the Backend may determine to include location information about the Peripheral and Central information such as source identifier, time elapsed since last reporting, number of check-ins, and/or the like.

Example Broadcast Packet Structure Features and Functionality

As noted above, broadcasts may include information that enables a Central or Backend to determine a location (e.g., a proxy location) of a Peripheral. In some implementations, broadcast/advertising packets may be transmitted at intervals (e.g., every 8 seconds, or some other interval). Each broadcast packet may have a specific format containing information such as: version information, product ID, transmit power level, connection timer, firmware version, status information, security data, and the like. In some implementations, the version information indicates a data structure of the broadcast packet. A product ID can help differentiate handling by the Central. Transmit power may be embedded in the broadcast for ranging purposes. The transmit power can represent the Peripheral's transmission power level. This transmit power may be used in conjunction with RSSI (Received Signal Strength Indicator) readings at the Central to approximate distance between the Central and the Peripheral, e.g., by calculating a difference between the measured transmit power and received signal strength, taking into account path loss and other factors. A connection timer, as discussed above, can indicate time since a last connection of the Peripheral to a Central. Firmware version can allow tracking of firmware updates and changes. Status information can provide information on the Peripheral such as the temperature and battery life of the Peripheral. Status information may also include debugging information such as a number of attempts the Peripheral has made to boot up. Security data may include information used for authentication purposes such as a nonce, counter, and/or signature, as described above.

In various implementations, the BLE standard for a broadcast packet structure may not be strictly followed for the broadcasts. The BLE standard permits broadcasting a certain number of bytes along with a header that includes the device identifier or MAC address (e.g., in a "BLE_ADDR" field). In some cases, certain devices (e.g., iOS devices) do not expose a MAC address field (e.g., the "BLE_ADDR" field) of the BLE broadcast packet. Thus, that MAC address field can be used for other purposes by other Centrals. For example, the MAC address field may be used store other information, such as battery status, remaining capacity, temperature, and other debugging information. The MAC address, or other ID of the Peripheral or asset (e.g., the Peripheral ID), may be included in the broadcast data in a different field.

FIG. 28 illustrates an example of at least a portion of a broadcast packet structure of Peripherals, according to various implementations. Certain of the elements of the broadcast packet structure are described herein in further detail.

A protocol version 2802 can be used to inform the Central and Backend about the structure of the packet and allows graceful changes to that structure at a later date if needed.

A product ID 2804 may be included in the broadcast packet. While the combination of Universally Unique Identifier (UUID)+protocol version may be shared across all products that use a particular UUID, including the product ID 2804 in the broadcast enables the option to deviate from this paradigm if needed, and for Centrals to act on broadcasts on a per-product basis. For example, by including the product ID 2804, the Central may not need to check the allowlist to determine whether to connect to certain Peripherals, such as Peripherals of particular types or organizations.

A flag indicator 2806 may be a bitmask that can be used to denote something about the broadcast or state/feature of the device. For example, the flag indicator 2806 may be used to denote whether the MAC address is in the broadcast and/or whether the MAC address has been encrypted.

A transmit power (TX power) indicator 2808, can be used to determine RSSI. Higher TX power can typically correspond to higher RSSI. To determine an accurate distance approximation, Centrals can use TX power. The TX power indicator 2808 may be in the form of a simple integer value, which may be translated to a particular dBm using a lookup table, which may be specific to a Peripheral type. For example, the lookup table may consist of two columns, one including index values represented by the TX power indicator 2808 in the broadcast packet, and the other indicating corresponding output power values in dBm. The lookup table may have a plurality of rows (e.g., 2, 5, 10, 30, 50, etc.) each associated with an index value and corresponding output power value or value range. In some implementations, the index values and output power values may correspondingly increase and/or decrease. In some implementations, the index values and output power values may inversely increase and/or decrease. In some implementations, the index values may be associated with output power values according to a different coordination scheme. The lookup table may have more or different columns. The lookup table may be used by the Peripherals, the Central, and/or the Backend.

A time since connection indicator 2810 can be used to communicate to Centrals how long it has been since a Peripheral has been connected to. The value can be a simple integer, which may be translated to a particular range of time using a lookup table. For example, the lookup table may consist of two columns, one including a count represented by the connection indicator 2810 in the broadcast packet, and the other indicating time periods since last connection corresponding to count values. For example, time periods may comprise specific amounts of time (e.g., 1 minute, 1 day, 1 hour, 1 week, etc.) or ranges of time (e.g., 1-10 minutes, 1-2 hours, 1-2 days, less than 1 hour, more than 3 weeks, etc.). Time periods may be measured in various units (e.g., minutes, hours, days, weeks, months, etc.). In some implementations, one or more values of the time periods columns may indicate that a Peripheral has never been connected to, or that the time since last connection is unknown. The lookup table may have a plurality of rows (e.g., 2, 5, 10, 30, 50, etc.) each associated with a count value and corresponding time period indicator. The lookup table may have more or different columns. The lookup table may be used by the Peripherals, the Central, and/or the Backend.

An error indicator 2812 can be used to indicate errors. For example, errors may include whether a Peripheral is malfunctioning, whether the Peripheral's software has thrown an error, whether the Peripheral failed to connect to a Central, or the like.

A firmware version 2814 can be compared against the firmware image the Central has to help the Central determine whether or not it should attempt to connect to perform an update. For example, if the firmware version 2814 does not match the firmware image of the Central, the Central may determine that the Peripheral requires an update and that it should connect to it.

In some cases, a MAC address 2816 (e.g., a peripheral identifier) can be included in the packet. As mentioned above, certain devices (e.g., iOS devices) do not expose a MAC address field (referred to herein as "BLE_ADDR" field) of the BLE broadcast packet. By separately including the MAC address in the broadcast packet in a location other than BLE_ADDR, such devices can still be used with the Peripherals. For example, the devices can execute an application for Peripheral detecting, finding, RSSI metering, and/or the like. In some implementations, a Backend can receive a broadcast packet, identify that the peripheral identifier is in the broadcast packet in a location other than BLE_ADDR, and extract the peripheral identifier from the broadcast packet. As described here, the peripheral identifier may be encrypted. Similarly, the broadcast packed may be include a signature, as also described herein.

Since, in some cases, the MAC address is included in the broadcast packet in a different location than BLE_ADDR, the BLE_ADDR can be repurposed for other uses, such as for additional Peripheral monitoring information and/or debugging information, such as device temperature or battery level, or a boot count. In some cases where certain devices (e.g., iOS devices) do not expose the MAC address field, the device monitoring information and/or debugging information may be included in the broadcast packet rather than the MAC address field.

Monitoring information may include a temperature indicator 2818 and a battery health indicator 2820 to facilitate battery health monitoring. Operational ranges of interest related to the temperature indicator 2818 and/or battery health indicator 2820 can be determined and reported. The monitoring information may include more, less, or different fields.

Debugging information may include a boot count indicator 2822 to facilitate corrective action if a Peripheral is unable to boot normally after several attempts. The boot count indicator 2822 can track how many times a Peripheral has booted or attempted to boot. In some implementations, the boot count indicator 2822 is a running counter and may reset at a predetermined value.

The security data 2824 may include information used to authenticate a Peripheral to the Backend. For example, the security data 2824 may comprise a nonce, counter, and signature as described above. In some implementations, the security data variable 2824 may comprise more, less, or different security information.

In some implementations, an example broadcast packet can include: a MAC Address (gateway ID), Protocol Version, TX Power, Product ID, Battery Level & Temperature, Connection Metrics, Firmware Version, Configuration Version, Connection Scheme (including, e.g., shipping mode to customer mode transition), Boot Count, UUID and/or the like.

In general, the Central can log some combination of: 1. The verbatim contents of the broadcast packet (which can include an encrypted MAC address); 2. BLE Service UUID; 3. BLE_ADDR, which may contain monitoring data as described herein; 4. RSSI; and 5. Other supportive information like how many observations were made in batching period (as described herein).

In general, while Centrals are primarily configured to communicate Peripheral information to the Backend, they can also understand a portion of the advertisement/broadcast. This can allow the Central to throttle the frequency at which it requests Peripheral data in the allowlist (as described above). With this approach, the Central may only ping the allowlist when it detects that a Peripheral wants to be connected to (as opposed to constantly pinging the allowlist). In an implementation, the Central may understand the following broadcast information: protocol version (to understand which structure is being used); firmware version; configuration version; connection scheme (including, e.g., shipping mode to customer mode transition); and/or TX power (used for distance approximation).

In some cases, the broadcast may have two UUID's, such that one of the UUID's can be reserved for future use. The system may use protocol version 2802 for changes about the packet, and the flag indicator 2806 to denote connectable vs. non-connectable and encrypted vs. non-encrypted.

Example Broadcast Batching and Aggregation Features and Functionality

Figure 29:
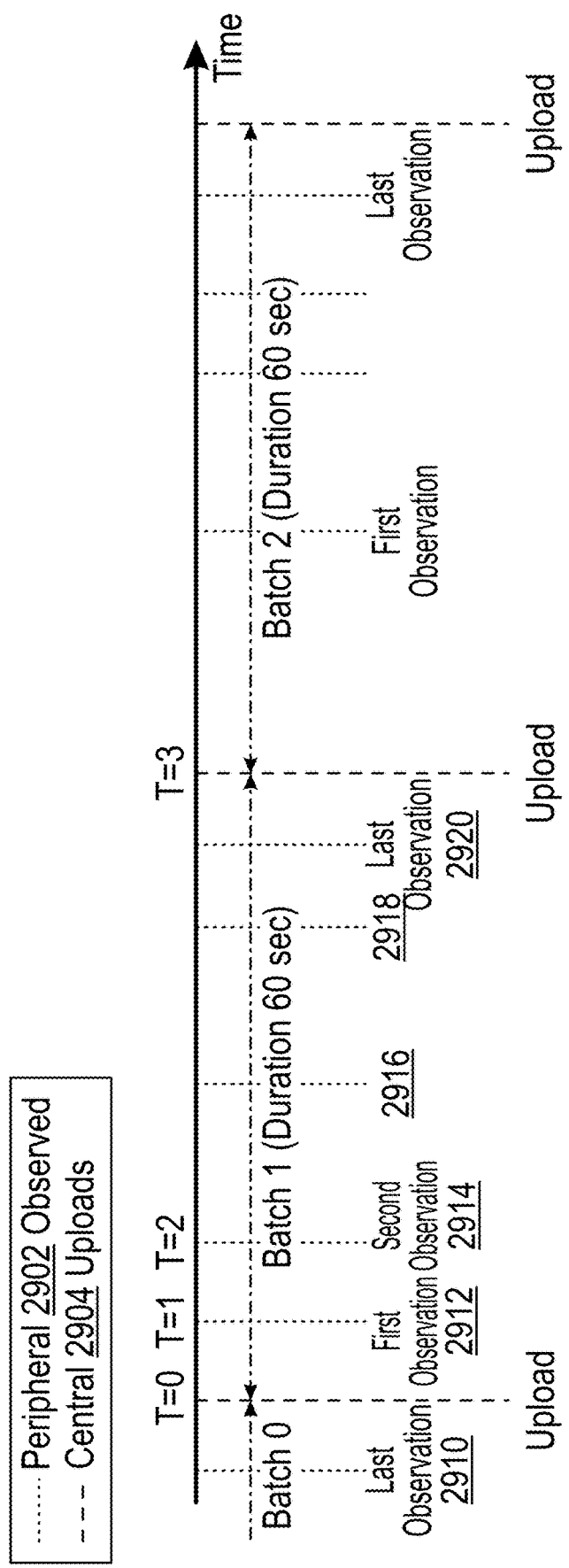
FIG. 29 is a diagram illustrating example batching functionality, according to various implementations.

FIG. 29 is diagram illustrating example observation batching and aggregation by a Central. As illustrated in FIG. 29, a Central (e.g., a vehicle gateway (VG)) may be configured to report its location to the Backend periodically (e.g., every minute, or some other interval). However, the Central may observe a Peripheral (or multiple Peripherals) quite frequently. Accordingly, the Central may be configured to aggregate and store the observations and upload aggregations of observations periodically, e.g., every minute (or some other interval, e.g., every hour, every half hour, every 30 seconds, etc.) along with reporting the location of the Central. In various implementations, all broadcasting data for a batch of broadcasts (from a same Peripheral) may not be stored and uploaded for every observation. Rather, within the, e.g., 1 minute, interval, the Central may aggregate observations by storing and/or uploading a Peripheral identifier, TX power (and/or RSSI), and/or timestamp for every observation, but a full set of broadcast data only for the last observation within the interval. Alternatively, within the, e.g., 1 minute, interval, the Central may aggregate observations by storing and/or uploading only a numeric value corresponding to the number of Broadcasts received (from a same Peripheral) during the interval, and a full set of broadcast data only for the last observation within the interval. These approaches may advantageously save processing power, data, and bandwidth.

In the illustrated example, the Central 2904 is an example Central and is configured to upload batches every 60 seconds. The Peripheral 2902 is an example Peripheral and is configured with an broadcasting interval of 8 seconds. If the Peripheral 2902 remains in observation range of the Central 2904 during the batch interval, the Central 2904 may receive several broadcast packets from the Peripheral 2902. The number of packets received during a batch interval may be influenced by several factors, including whether the Peripheral 2902 moves out of range the Central 2904 during the interval, or whether the Peripheral 2902 connects to a different Central 2904.

As illustrated, during Batch 1, the Central 2904 observes the Peripheral 2902 5 times. The Central 2904 may be configured to aggregate batch observations by storing a Peripheral identifier, TX power indicator and/or RSSI, and timestamp for each broadcast packet received, but only storing the broadcast packet of a single observation of the peripheral 2902 during a batch. As such, when the Central 2904 receives a broadcast packet from the Peripheral 2902 the Central 2904 may overwrite any previously stored broadcast information received from the Peripheral 2902 with the latest received broadcast packet information. The Central 2904 may be configured to store the information in a cache. The Central 2904 may clear the cache after each upload.

For example, at T=0, the Central 2904 uploads the last observation 2910 of Batch 0 to the Backend 2212 and clears the cache. At T=1, the Central 2904 receives a broadcast packet from the Peripheral 2902 (first observation 2912). The Central 2904 stores the broadcast packet in entirety and separately stores the peripheral identifier and TX power of the peripheral 2902, the RSSI, and the timestamp of receipt of the broadcast packet in the cache. At T=2, the Central 2904 receives another broadcast packet from the Peripheral 2902 (second observation 2914). The Central 2904 replaces the broadcast packet received at T=1 with the broadcast packet received at T=2 in the cache. The Central 2904 also separately stores the peripheral identifier and TX power of the peripheral 2902, the RSSI, and the timestamp of receipt of the broadcast packet in the cache. For the broadcast packets received by the Central 2904 from the Peripheral 2902 between T=2 and T=3 (observations 2916 and 2918, and last observation 2920), the Central 2904 performs the same operations as performed at T=2. At T=3, the batch interval concludes and the Central 2904 uploads, to the Backend 2212, the contents of the cache as an aggregation, which comprises the last observation 2920 along with the peripheral identifier, TX power, RSSI, and timestamp of receipt for each broadcast packet received during Batch 1 (observations 2912-2920). Upon upload, the Central 2904 clears the cache.

In some cases, the Central 2904 may also track how many times it observes the Peripheral 2902 during a batch interval. The Central 2904 may report this number to the Backend 2212 with the aggregation during an upload. In some cases, the Central 2904 may report an aggregation only comprising the last observation (the broadcast packet, peripheral identifier and TX power of the Peripheral 2902, the RSSI, and the timestamp) along with the number of times the Central 2904 observed the Peripheral 2902 during a batch interval. In some cases, the Central 2904 may aggregate observations by storing every broadcast packet it receives from the Peripheral 2902 during a batch interval in the cache and uploading all cached broadcast packets to the Backend 2212 at the end of the interval as an aggregation. In some cases, the broadcasting interval of the Peripheral 2902 may be shorter or longer. In some cases, the batch interval of the Central 2904 may be shorter or longer.

Figure 30:
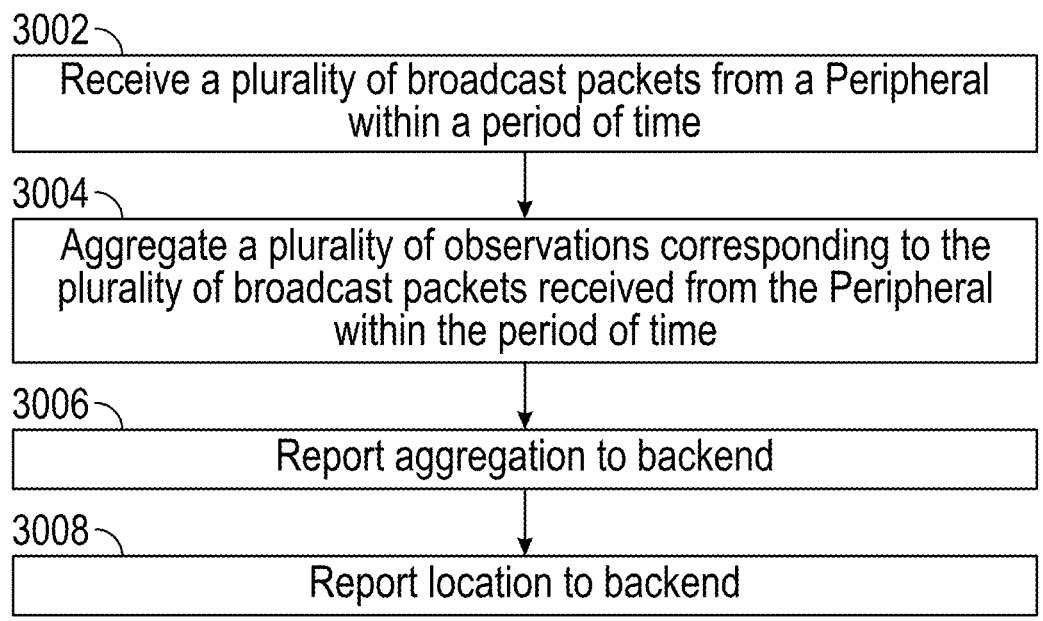
FIG. 30 is a flowchart illustrating an example process of the system, according to various implementations.

FIG. 30 is a flow diagram illustrating an example of communications among various computing devices and systems described herein to efficiently report, by a Central, broadcast packets broadcast by Peripherals, according to various implementations. Although steps are illustrated in a particular order, steps may be performed multiple times, the order of the steps can be changed, and/or one or more steps can be performed concurrently. Additionally, fewer, more, or different steps can be performed. Furthermore, for the purposes of illustrating a clear example, one or more particular systems or system components are described in the context of performing various operations during each of the flow stages. However, other system arrangements and distributions of the processing steps across systems or system components may be used.

The example process illustrated by FIG. 30 may be performed with reference to, e.g., features of FIG. 29. At block 3002, a Central, such as Central 2904, receives a plurality of broadcast packets from a peripheral, such as peripheral 2902, within a period of time. The period of time can correspond to a batch interval, such as batch 1 of FIG. 29. The Peripheral may be configured to broadcast at an interval shorter than the batch interval, such that multiple broadcast packets can be broadcast by the Peripheral and received by the Central during the period of time.

At block 3004, the Central can generate an aggregation by aggregating observations corresponding to the plurality of broadcast packets received from the Peripheral within the period of time. The Central may use the processes and/or methods described with reference to FIG. 29 to aggregate observations. For example, in one implementation, aggregating may comprise, for each broadcast packet received during the batch interval, receiving a broadcast packet, storing the broadcast packet in the cache of the central or overwriting a previously received broadcast packet stored in the cache of the Central with the received broadcast packet, and additionally storing partial details for the received broadcast packet corresponding to an observation, such that for the last received broadcast packet, full details of the observation (the received broadcast packet and partial details corresponding to an observation) are stored and eventually uploaded. The partial details may include a peripheral identifier, transmit power, RSSI, and/or timestamp corresponding to receipt of the broadcast packet by the Central.

In another implementation, aggregating may comprise for each broadcast packet received during the batch interval, receiving a broadcast packet, generating an observation of the broadcast packet, storing the observation in the cache of the Central or overwriting the previously generated observation stored in the cache of the Central with the generated observation, and updating a counter tracking a number of broadcasts received within the batch interval.

In another implementation, aggregating may comprise storing full details of some broadcast packets received during the batch interval, but partial details of others. For example, aggregating may comprise storing full details of the last received broadcast packet, and partial details (or no details) for other broadcast packets received during the interval. In another implementation, aggregating may comprise counting a number broadcast packets received during the batch interval, this may or may not be in addition to storing full and/or partial details about all or some of the receive broadcast packets. In another implementation, aggregating may comprise storing full details for all broadcast packets received during the batch interval. In another implementation, aggregating may comprise storing only partial details for all broadcast packets received during the batch interval. In another implementation, aggregating may comprise only storing full and/or partial details for some, but not all, of the broadcast packets received during the batch interval.

At block 3006, upon conclusion of the period of time, the Central can report the aggregation to a Backend, such as the Backend 2212. This may comprise uploading the contents of the cache to the Backend. This may also comprise clearing the cache after uploading the cache contents. At block 3008, the Central can report the location of the Central to the Backend. For example, this can be a GPS location of the Central determined by the Central. Such location reporting may be performed with every period of time/interval associated with aggregations of observations, or at some other period of time, frequency, or interval.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Java, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression, or decryption prior to execution) that may then be stored on a computer readable storage medium. Such computer readable program instructions may be stored, partially or fully, on a memory device (e.g., a computer readable storage medium) of the executing computing device, for execution by the computing device. The computer readable program instructions may execute entirely on a user's computer (e.g., the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (e.g., a solid state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such as application-specific processors (e.g., application-specific integrated circuits (ASICs)), programmable processors (e.g., field programmable gate arrays (FPGAs)), application-specific circuitry, and/or the like (any of which may also combine custom hard-wired logic, logic circuits, ASICs, FPGAs, and/or the like, with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (e.g., Windows XP, Windows Vista, Windows 7, Windows 8, Windows 10, Windows Server, and/or the like), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

As described above, in various embodiments certain functionality may be accessible by a user through a web-based viewer (such as a web browser), or other suitable software program. In such implementations, the user interface may be generated by a server computing system and transmitted to a web browser of the user (e.g., running on the user's computing system). Alternatively, data (e.g., user interface data) necessary for generating the user interface may be provided by the server computing system to the browser, where the user interface may be generated (e.g., the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments may not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, and/or the like, may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

Example Clauses

Examples of the implementations of the present disclosure can be described in view of the following example clauses (and the example clauses provided above). The features recited in the below example implementations can be combined with additional features disclosed herein. Furthermore, additional inventive combinations of features are disclosed herein, which are not specifically recited in the below example implementations, and which do not include the same features as the specific implementations below. For sake of brevity, the below example implementations do not identify every inventive aspect of this disclosure. The below example implementations are not intended to identify key features or essential features of any subject matter described herein. Any of the example clauses below, or any features of the example clauses, can be combined with any one or more other example clauses, or features of the example clauses or other features of the present disclosure.

Clause 1. A system comprising: a peripheral having first one or more hardware computer processors and first one or more computer readable storage mediums storing first software instructions that, when executed by at least one of the first one or more hardware computer processors cause the peripheral to: during a particular time interval, generate an encrypted device identifier utilizing at least a device identifier associated with the peripheral, a first shared encryption key, a counter value associated with the particular time interval, and a nonce associated with the particular time interval; during the particular time interval, generate a signature utilizing at least a second shared encryption key, the counter value associated with the particular time interval, the nonce associated with the particular time interval, and a broadcast payload; generate a broadcast packet including at least the encrypted device identifier, the signature, the counter value, and the broadcast payload; and broadcast the broadcast packet; and a backend having second one or more hardware computer processors and second one or more computer readable storage mediums storing second software instructions that, when executed by at least one of the second one or more hardware computer processors cause the backend to: receive an observation comprising the broadcast packet; decrypt the encrypted device identifier included in the broadcast packet; and verify the signature included in the broadcast packet.

Clause 2. The system of Clause 1, wherein the broadcast packet is broadcast by the peripheral via a Bluetooth protocol.

Clause 3. The system of Clause 1, wherein the observation is received from a central, wherein the broadcast packet is received by the central from the peripheral, and wherein the central is configured to generate the observation including at least the broadcast packet.

Clause 4. The system of Clause 3, wherein the observation further includes a timestamp, wherein the timestamp corresponds to a time the central received the broadcast packet.

Clause 5. The system of Clause 1, wherein the first shared encryption key is derived using a global encryption private key and a backend public encryption key, wherein the global encryption private key is associated with each peripheral of a plurality of peripherals, and wherein the backend public encryption key is associated with the backend.

Clause 6. The system of Clause 5, wherein the global encryption private key is included in firmware flashed on to the peripheral.

Clause 7. The system of Clause 5, wherein the second shared encryption key is derived using a device-specific signing private key and the backend public encryption key, and wherein the device-specific signing private key is associated with the peripheral.

Clause 8. The system of Clause 7, wherein the device-specific signing private key is generated by the peripheral.

Clause 9. The system of Clause 7, wherein the device-specific signing private key is associated with a device-specific public key, and wherein the device-specific public key is provided to the backend when the peripheral is manufactured.

Clause 10. The system of Clause 1, wherein the peripheral is configured to broadcast a plurality of broadcast packets, wherein in each broadcast packet of the plurality of broadcast packets includes a counter value and a nonce based on a rolling time interval, wherein each time interval has a predetermined length of time, and wherein for each time interval, the peripheral increases the counter value and generates a new nonce.

Clause 11. The system of Clause 1, wherein the encrypted device identifier is generated further utilizing an Advanced Encryption Standard Counter Mode (AES-CTR) hash-based message authentication code algorithm.

Clause 12. The system of Clause 1, wherein the signature comprises a Hash-based Message Authentication Code (HMAC).

Clause 13. A computerized method, performed by a computing system configured as a peripheral and having one or more hardware computer processors and one or more computer readable storage mediums storing software instructions executable by the computing system, the computerized method comprising: during a particular time interval, generating an encrypted device identifier utilizing at least a device identifier associated with the peripheral, a first shared encryption key, a counter value associated with the particular time interval, and a nonce associated with the particular time interval; during the particular time interval, generating a signature utilizing at least a second shared encryption key, the counter value associated with the particular time interval, the nonce associated with the particular time interval, and a broadcast payload; generating a broadcast packet including at least the encrypted device identifier, the signature, the counter value, and the broadcast payload; and broadcasting the broadcast packet via Bluetooth Low Energy (BLE).

Clause 14. The computerized method of Clause 13, wherein the peripheral is configured to broadcast a plurality of broadcast packets, wherein in each broadcast packet of the plurality of broadcast packets includes a counter value and a nonce based on a rolling time interval, wherein each time interval has a predetermined length of time, and wherein for each time interval, the peripheral increases the counter value and generates a new nonce.

Clause 15. The computerized method of Clause 13, wherein the particular time interval has a predetermined length of time.

Clause 16. A computerized method, performed by a computing system configured as a backend and having one or more hardware computer processors and one or more computer readable storage mediums storing software instructions executable by the computing system, the computerized method comprising: receiving an observation comprising a broadcast packet generated by a peripheral, wherein the broadcast packet includes at least an encrypted device identifier, a signature, a counter value, and a broadcast payload, wherein the encrypted device identifier is generated based at least in part on a backend public encryption key associated with the backend, and wherein the signature is generated based at least in part on the backend public encryption key; decrypting the encrypted device identifier included in the broadcast packet; and verifying the signature included in the broadcast packet.

Clause 17. The computerized method of Clause 16 further comprising: storing the counter value included in the broadcast packet as a last seen counter value; receiving a second observation, wherein the second observation includes a second broadcast packet; comparing the counter value included in the second broadcast packet with the last seen counter value; determining that the counter value included in the second broadcast packet is higher than the last seen counter value; and based on the determining, storing the counter value included in the second broadcast packet as the last seen counter value and ingesting the second broadcast packet.

Clause 18. The computerized method of Clause 17 further comprising: receiving a third observation, wherein the third observation includes a third broadcast packet, and wherein: the third broadcast packet was received by a second central during a first time interval, the second broadcast packet was received by a first central during a second time interval, and the first time interval is earlier than the second time interval; comparing a counter value included in the third broadcast packet with the last seen counter value; determining that the counter value included in the third broadcast packet is lower than the last seen counter value; based on determining that the counter value included in the third broadcast packet is lower than the last seen counter value, calculating an expected timestamp for the third broadcast packet based on the last seen counter value, a timestamp attached to the second broadcast packet, and a length of time associated with a rolling time interval; comparing the expected timestamp with a timestamp attached to the third broadcast packet; determining that the timestamp attached to the third broadcast packet is within +/− one rolling time interval of the expected timestamp; and based on determining that the timestamp attached to the third broadcast packet is within +/− one rolling time interval of the expected timestamp, ingesting the third broadcast packet.

Clause 19. The computerized method of Clause 16 further comprising: storing the counter value included in the broadcast packet as a last seen counter value; receiving a second observation, wherein the second observation includes a replayed broadcast packet, wherein the replayed broadcast packet is a copy of a second broadcast packet of a plurality of broadcast packets, and wherein the replayed broadcast packet was broadcast by a device unassociated with the backend; comparing a counter value included in the replayed broadcast packet with the last seen counter value; determining that the counter value included in the replayed broadcast packet is lower than the last seen counter value; based on determining that the counter value included in the replayed broadcast packet is lower than the last seen counter value, calculating an expected timestamp for the replayed broadcast packet based on the last seen counter value, a timestamp attached to the replayed broadcast packet, and a length of time associated with a rolling time interval; comparing the expected timestamp with the timestamp attached to the replayed broadcast packet; determining that the timestamp attached to the replayed broadcast packet is not within +/− one rolling time interval of the expected timestamp; and based on determining that the timestamp attached to the replayed broadcast packet is not within +/− one rolling time interval of the expected timestamp, rejecting the replayed broadcast packet.

Clause 20. The computerized method of Clause 16, wherein the observation is received from a central, wherein the broadcast packet is received by the central from the peripheral, and wherein the central is configured to generate the observation including at least the broadcast packet.

Clause 21. A computerized method, performed by a computing system configured as a central and having one or more hardware computer processors and one or more computer readable storage mediums storing software instructions executable by the computing system, the computerized method comprising: receiving a broadcast packet from a peripheral; sending a request to a backend to determine whether the central is authorized to connect to the peripheral, wherein the request includes an encrypted device identifier associated with the peripheral; receiving a response from the backend indicating whether the central is authorized to connect to the peripheral; and in response to the response indicating that the central is authorized to connect to the peripheral, establishing a bi-directional connection with the peripheral.

Clause 22. The computerized method of Clause 21, wherein the bi-directional connection is usable to allow the central to at least one of: provide configuration settings to the peripheral, or update firmware of the peripheral.

Clause 23. The computerized method of Clause 21, wherein the backend is configured to decrypt the encrypted device identifier and compare the decrypted device identifier to an allow list maintained by the backend.

Clause 24. The computerized method of Clause 23, wherein the central is indicated as authorized to connect to the peripheral in response to the decrypted device identifier being on the allow list.

Clause 25. The computerized method of Clause 21 further comprising: caching authorization information received from the backend in a cache of the central; and checking the cache before sending the request to the backend to determine whether the bi-directional connection between the central and the peripheral is authorized.

Clause 26. The computerized method of Clause 25 further comprising: purging older entries from the cache in a first-in-first-out manner when the cache reaches a predetermined size.

Clause 27. The computerized method of Clause 25, further comprising clearing the cache based on a predetermined interval.

Clause 28. The computerized method of Clause 21, wherein the encrypted device identifier is encrypted based at least in part on a public encryption key of the backend, and wherein the encrypted device identifier is decryptable by the backend but not the central.

Clause 29. The computerized method of Clause 21, wherein the response from the backend includes information for use in establishing the bi-directional connection between the central and the peripheral.

Clause 30. The computerized method of Clause 21, wherein the peripheral is a newly manufactured peripheral.

Clause 31. The computerized method of Clause 21, wherein the broadcast packet is a first broadcast packet received by the central from the peripheral.

Clause 32. The computerized method of Clause 21, wherein a first endpoint of the backend that receives requests for connection authorizations from centrals is different from a second endpoint of the backend that received location information from centrals.

Clause 33. A computerized method, performed by a computing system configured as a central and having one or more hardware computer processors and one or more computer readable storage mediums storing software instructions executable by the computing system, the computerized method comprising: receiving a broadcast packet from a peripheral; sending a request to a backend to determine whether the central is authorized to generate observations associated with the peripheral, wherein the request includes an encrypted device identifier associated with the peripheral; receiving a response from the backend indicating whether the central is authorized to generate observations associated with the peripheral; and in response to the response indicating that the central is authorized to generate observations associated with the peripheral: generating an observation associated with the peripheral and based on the broadcast packet received from the peripheral; and sending the observation to the backend.

Clause 34. The computerized method of Clause 33, wherein the backend is configured to decrypt the encrypted device identifier and compare the decrypted device identifier to an allow list maintained by the backend.

Clause 35. The computerized method of Clause 34, wherein the central is indicated as authorized to generate observations associated with the peripheral in response to the decrypted device identifier being on the allow list.

Clause 36. The computerized method of Clause 33 further comprising: caching authorization information received from the backend in a cache of the central; and checking the cache before sending the request to the backend to determine whether generate observations associated with the peripheral is authorized.

Clause 37. The computerized method of Clause 36 further comprising: purging older entries from the cache in a first-in-first-out manner when the cache reaches a predetermined size.

Clause 38. The computerized method of Clause 36, further comprising clearing the cache based on a predetermined interval.

Clause 39. A computerized method, performed by a computing system configured as a backend and having one or more hardware computer processors and one or more computer readable storage mediums storing software instructions executable by the computing system, the computerized method comprising: receiving at least one first location identifier from a first central, wherein the first central is associated with a first organization, wherein the at least one first location identifier is associated with a peripheral, and wherein the peripheral is associated with the first organization; receiving at least one second location identifier from a second central, wherein the second Central is associated with a second organization, and wherein the at least one second location identifier is associated with the peripheral; generating user interface data configured to render: a geographic map including markers of the at least one first location identifier and the at least one second location identifier; a first detail information indicator visible upon selection by a user of a marker of the at least one first location identifier, wherein the first detail information indicator comprises location information of the peripheral and identification information of the first central; and a second detail information indicator visible upon selection by a user of a marker of the at least one second location identifier, wherein the second detail information indicator comprises location information of the peripheral and anonymized identification information of the second central; and transmitting the user interface data to a user device configured to render the geographic map with markers associated with the at least one first location identifier and the at least one second location identifier.

Clause 40. The computerized method of Clause 39, wherein: the user interface data is further configured to render: a selection interface configured to receive user input usable to filter location identifiers included on the geographic map based on organization attributes; and the computerized method further comprises: in response to a user input to the selection interface, filtering location identifiers indicated on the geographic map to only include location identifiers associated with observations received from centrals associated with one or more selected or deselected organizations.

Clause 41. A computerized method, performed by a computing system configured as a central and having one or more hardware computer processors and one or more computer readable storage mediums storing software instructions executable by the computing system, the computerized method comprising: receiving a plurality of broadcast packets from a peripheral within a period of time; aggregating a plurality of observations corresponding to the plurality of broadcast packets received from the peripheral within the period of time; and upon conclusion of the period of time, reporting, to a backend, an aggregation of the plurality of observations, wherein the aggregation of the plurality of observations includes at least a last observation corresponding to a last broadcast packet received within the period of time.

Clause 42. The computerized method of Clause 41, wherein the aggregation of the plurality of observations includes full details associated with the last observation, and partial details associated with others of the plurality of observations.

Clause 43. The computerized method of Clause 42, wherein the aggregation of the plurality of observations includes an indication of a number of the plurality of observations and/or the plurality of broadcast packets.

Clause 44. The computerized method of Clause 42, wherein the partial details include at least one of: a peripheral identifier, a transmit power, a received signal strength indicator (RSSI), or a timestamp.

Clause 45. The computerized method of Clause 41, wherein the aggregation of the plurality of observations includes the last observation but does not include others of the plurality of observations.

Clause 46. The computerized method of Clause 45, wherein the aggregation of the plurality of observations includes an indication of a number of the plurality of observations and/or the plurality of broadcast packets.

Clause 47. The computerized method of Clause 41, wherein the aggregation of the plurality of observations is stored in a cache of the central.

Clause 48. The computerized method of Clause 47, wherein the cache is cleared or overwritten with each subsequent period of time.

Clause 49. The computerized method of Clause 41, wherein aggregating the plurality of observations comprises: for each subsequent broadcast packet, after an initial broadcast packet, received within the period of time, overwriting a previously received broadcast packet and/or an observation corresponding to the previously received broadcast packet and storing the subsequent broadcast packet and/or an observation corresponding to the subsequent broadcast packet.

Clause 50. The computerized method of Clause 41, wherein at least one broadcast packet of the plurality of broadcast packets includes a peripheral identifier in a dedicated field other than a default media access control (MAC) address field of a Bluetooth Low Energy (BLE) broadcast packet, wherein the default MAC address field is used for other peripheral information.

Clause 51. The computerized method of Clause 50, wherein at least one broadcast packet further includes an indication of a transmit power.

Clause 52. The computerized method of Clause 50, wherein at least one broadcast packet further includes an indication of a time since last connection.

Clause 53. The computerized method of Clause 50, wherein the peripheral identifier is encrypted.

Clause 54. The computerized method of Clause 50, wherein the other peripheral information includes at least one of: a battery level of the peripheral, or temperature of the peripheral.

Clause 55. The computerized method of Clause 50 further comprising: for each broadcast packet of the plurality of broadcast packets: determining whether the peripheral identifier is stored in a dedicated field or the default MAC address field based on a flag in the broadcast packet; based on determining that the peripheral identifier is stored in the dedicated field, extracting the peripheral identifier from the broadcast packet; and storing the peripheral identifier with broadcast packet information corresponding to the broadcast packet.

Clause 56. The computerized method of Clause 41 further comprising: further upon conclusion of the period of time, reporting, to the backend, a location of the central.

Clause 57. A system comprising: one or more computer readable storage mediums having program instructions embodied therewith; and one or more processors configured to execute the program instructions to cause the system to perform the computerized method of Clause 41.

Clause 58. The system of Clause 57, wherein the aggregation of the plurality of observations includes full details associated with the last observation, and partial details associated with others of the plurality of observations, and wherein the aggregation of the plurality of observations includes an indication of a number of the plurality of observations and/or the plurality of broadcast packets.

Clause 59. The system of Clause 57, wherein the aggregation of the plurality of observations includes the last observation but does not include others of the plurality of observations, and wherein the aggregation of the plurality of observations includes an indication of a number of the plurality of observations and/or the plurality of broadcast packets.

Clause 60. A computer program product comprising one or more computer-readable storage mediums having program instructions embodied therewith, the program instructions executable by one or more processors to cause the one or more processors to perform the computerized method of Clause 41.

What is claimed is:

1. A computerized method, performed by a computing system configured as a central and having one or more hardware computer processors and one or more computer readable storage mediums storing software instructions executable by the computing system, the computerized method comprising:
   receiving a broadcast packet from a peripheral;
   determining whether a cache comprises authorization information for the peripheral indicating that bi-directional connection between the central and the peripheral is authorized, wherein the cache comprises authorization information received from a backend;
   based on determining that the cache does not include authorization information for the peripheral, sending a request to the backend to determine whether the central is authorized to connect to the peripheral, wherein the request includes an encrypted device identifier associated with the peripheral;
   receiving a response from the backend indicating whether the central is authorized to connect to the peripheral; and
   in response to the response indicating that the central is authorized to connect to the peripheral, establishing a bi-directional connection with the peripheral.

2. The computerized method of claim 1, wherein the bi-directional connection is usable to allow the central to at least one of:
   provide configuration settings to the peripheral, or
   update firmware of the peripheral.

3. The computerized method of claim 1, wherein the backend is configured to decrypt the encrypted device identifier and compare the decrypted device identifier to an allow list maintained by the backend.

4. The computerized method of claim 3, wherein the central is indicated as authorized to connect to the peripheral in response to the decrypted device identifier being on the allow list.

5. The computerized method of claim 1 further comprising:
   purging older entries from the cache in a first-in-first-out manner when the cache reaches a predetermined size.

6. The computerized method of claim 1, further comprising clearing the cache based on a predetermined interval.

7. The computerized method of claim 1, wherein the encrypted device identifier is encrypted based at least in part on a public encryption key of the backend, and wherein the encrypted device identifier is decryptable by the backend but not the central.

8. The computerized method of claim 1, wherein the response from the backend includes information for use in establishing the bi-directional connection between the central and the peripheral.

9. The computerized method of claim 1, wherein the peripheral is a newly manufactured peripheral.

10. The computerized method of claim 1, wherein the broadcast packet is a first broadcast packet received by the central from the peripheral.

11. The computerized method of claim 1, wherein a first endpoint of the backend that receives requests for connection authorizations from centrals is different from a second endpoint of the backend that received location information from centrals.

12. A computerized method, performed by a computing system configured as a central and having one or more hardware computer processors and one or more computer readable storage mediums storing software instructions executable by the computing system, the computerized method comprising:
   receiving a broadcast packet from a peripheral;
   determining whether a cache comprises authorization information for the peripheral indicating that bi-directional connection between the central and the peripheral is authorized, wherein the cache comprises authorization information received from a backend;
   based on determining that the cache does not include authorization information for the peripheral, sending a request to the backend to determine whether the central is authorized to generate observations associated with the peripheral, wherein the request includes an encrypted device identifier associated with the peripheral;
   receiving a response from the backend indicating whether the central is authorized to generate observations associated with the peripheral; and
   in response to the response indicating that the central is authorized to generate observations associated with the peripheral:
      generating an observation associated with the peripheral and based on the broadcast packet received from the peripheral; and
      sending the observation to the backend.

13. The computerized method of claim 12, wherein the backend is configured to decrypt the encrypted device identifier and compare the decrypted device identifier to an allow list maintained by the backend.

14. The computerized method of claim 13, wherein the central is indicated as authorized to generate observations associated with the peripheral in response to the decrypted device identifier being on the allow list.

15. The computerized method of claim 12, further comprising:
   purging older entries from the cache in a first-in-first-out manner when the cache reaches a predetermined size.

16. The computerized method of claim 12, further comprising clearing the cache based on a predetermined interval.

* * * * *